(12) United States Patent
Hodjat et al.

(10) Patent No.: US 7,558,819 B1
(45) Date of Patent: Jul. 7, 2009

(54) DISTRIBUTED DIALOGUING WITH AN AGENT-ORIENTED SOFTWARE ARCHITECTURE

(75) Inventors: Siamak Hodjat, San Jose, CA (US); Masahiko Funaki, Ichikawa (JP); Mitsuru Shiratori, Chofu (JP); Junichi Ito, Setagaya-ku (JP)

(73) Assignee: Sybase, Inc., Dublin, CA (US)

( * ) Notice: Subject to any disclaimer, the term of this patent is extended or adjusted under 35 U.S.C. 154(b) by 769 days.

(21) Appl. No.: 10/361,724

(22) Filed: Feb. 10, 2003

Related U.S. Application Data

(60) Provisional application No. 60/355,254, filed on Feb. 8, 2002.

(51) Int. Cl.
*G06F 15/16* (2006.01)
*G06F 3/00* (2006.01)
(52) U.S. Cl. ...................................... 709/202; 719/317
(58) Field of Classification Search ........................ None
See application file for complete search history.

(56) References Cited

U.S. PATENT DOCUMENTS

| 6,144,989 | A  | * | 11/2000 | Hodjat et al. | 709/202 |
| 6,484,155 | B1 | * | 11/2002 | Kiss et al. | 706/46 |
| 6,742,021 | B1 | * | 5/2004  | Halverson et al. | 709/218 |
| 6,851,115 | B1 | * | 2/2005  | Cheyer et al. | 719/317 |

OTHER PUBLICATIONS

Zhong et al. ("Software Agent Evolution in Adaptive Agent Oriented Software Architecture", IWPSE 99 Proceedings, 1999).*

Barbara Grosz, Discourse and Dialogue, Chpt. 6 of R. Cole, et al., "Survey of the State of the Art in Human Language Technology," Cambridge University Press and Giardini, 1997.

Office Action mailed Sep. 13, 2005, in U.S. Appl. No. 10/133,580, filed Apr. 24, 2002.

Response A to Office Action, filed in the USPTO on Nov. 14, 2005, in U.S. Appl. No. 10/133,580, filed Apr. 24, 2002.

Office Action mailed Jan. 24, 2006, in U.S. Appl. No. 10/133,580, filed Apr. 24, 2002.

Response B to Office Action, filed in the USPTO on Apr. 20, 2006, in U.S. Appl. No. 10/133,580, filed Apr. 24, 2002.

Final Office Action mailed Jul. 19, 2006, in U.S. Appl. No. 10/133,580, filed Apr. 24, 2002.

(Continued)

*Primary Examiner*—David R Hudspeth
*Assistant Examiner*—Samuel G Neway
(74) *Attorney, Agent, or Firm*—Edell, Shapiro & Finnan, LLC

(57) ABSTRACT

Roughly described, a natural language interpretation system develops its interpretation in response to user input, and also in dependence upon the interpretation, rather than the claims, made in response to prior input. In policy conditions, an agent can check whether any specified agent contributed to the prior interpretation and adjust its claiming of the present input accordingly. In policy actions, a policy or agent can reference the prior interpretation both for conditioning the policy's or agent's contribution to the current interpretation, and also for incorporating part or all of the prior interpretation in the policy's or agent's contribution to the current interpretation. The resulting system thus implements dialoging in a distributed manner as part of the various agents in the interpretation network, and allows much more flexibility to better respond in accordance with users' expectations.

28 Claims, 7 Drawing Sheets

OTHER PUBLICATIONS

Response C to Final Office Action, filed in the USPTO on Sep. 11, 2006, in U.S. Appl. No. 10/133,580, filed Apr. 24, 2002.
Response D to Final Office Action, filed in the USPTO on Oct. 19, 2006, in U.S. Appl. No. 10/133,580, filed Apr. 24, 2002.
Advisory Action mailed Sep. 25, 2006, in U.S. Appl. No. 10/133,580, filed Apr. 24, 2002.
Office Action mailed Nov. 2, 2006, in U.S. Appl. No. 10/133,580, filed Apr. 24, 2002.
Response E to Office Action, filed in the USPTO on Feb. 2, 2007, in U.S. Appl. No. 10/133,580, filed Apr. 24, 2002.
Office Action mailed Apr. 17, 2007, in U.S. Appl. No. 10/133,580, filed Apr. 24, 2002.
Response F to Office Action, filed in the USPTO on Jul. 17, 2007, in U.S. Appl. No. 10/133,580, filed Apr. 24, 2002.
Substance of Interview mailed Jul. 24, 2007, in U.S. Appl. No. 10/133,580, filed Apr. 24, 2002.
Jurafsky D. et al., "Speech and Language Processing," Chap. 19, Prentice Hall, N.J., 2000, pp. 717-761.
Office Action mailed Oct. 9, 2007, in U.S. Appl. No. 10/133,580, filed Apr. 24, 2002.

* cited by examiner

```
Input: Please change the television channel to discovery
Output: changing channel to discovery.
Input: change the VCR channel
Output: Which channel?
Input: ESPN
Output: Changing the VCR channel to ESPN
```

Policy reference
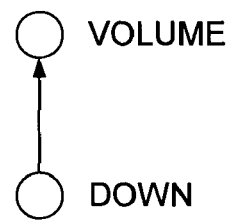
Figure 7
Agent reference
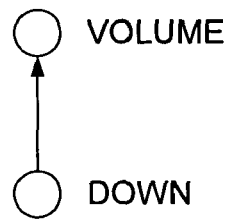
Figure 8
Figure 9

US 7,558,819 B1

DISTRIBUTED DIALOGUING WITH AN AGENT-ORIENTED SOFTWARE ARCHITECTURE

CLAIM OF PRIORITY

This application claims the benefit of U.S. Provisional Application No. 60/355,254, filed 8 Feb. 2002, which is incorporated herein by reference in its entirety.

REFERENCE TO COMPUTER PROGRAM LISTING AND TABLE APPENDICES

Computer program listings and Table appendices comprising duplicate copies of a compact disc, named "DEJI 1011-2-CPLA," accompany this application and are incorporated by reference. The discs are in IBM-PC/MS-Windows format and have a total content size of 384 kB. The appendices include the following text files:

| File | Size | Created |
|---|---|---|
| AASAPAgent.java | 38 KB | created 2/5/2003 |
| Actuation.java | 1 KB | created 2/5/2003 |
| ActuationAgent.java | 10 KB | created 2/5/2003 |
| addressBook.opal.txt | 193 KB | created 2/5/2003 |
| AddressbookActuationAgent.java | 4 KB | created 1/30/2003 |
| addressBookPolicies.txt | 24 KB | created 2/5/2003 |
| Agent.java | 17 KB | created 2/5/2003 |
| BaseActuation.java | 10 KB | created 2/5/2003 |
| BasePriority.java | 312 B | created 2/5/2003 |
| CheckPropertyCondition.java | 3 KB | created 2/5/2003 |
| Context.java | 2 KB | created 1/30/2003 |
| FollowupActuation.java | 25 KB | created 2/5/2003 |
| FollowupPriority.java | 5 KB | created 2/5/2003 |
| NLTPCondition.java | 1 KB | created 2/5/2003 |
| Priority.java | 199 B | created 2/5/2003 |
| StandardAgent.java | 27 KB | created 2/5/2003 |
| TerminalCondition.java | 1 KB | created 2/5/2003 |
| XMLFollowupActuation.java | 13 KB | created 2/5/2003 |

COPYRIGHT DISCLAIMER

A portion of the disclosure of this patent document contains material which is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND

Natural language conversations often involve multiple exchanges when discussing a single topic, thereby creating a dialogue. Dialogues basically involve: setting a context, asking and verifying, and managing follow-ups and continuations. Human-Computer-Interaction is no different. Background information summarizing some of the work done to date on the topic of dialoguing in natural language processing can be found in Barbara Grosz, "Discourse and Dialogue," Chap. 6 of R. Cole, J. Mariani, H. Uszkoreit, G. B. Varile, A. Zaenen, A. Zampolli, V. Zue, eds., "Survey of the State of the Art in Human Language Technology," Cambridge University Press and Giardini (1997), incorporated herein by reference.

U.S. Pat. No. 6,144,989, incorporated by reference herein, describes an adaptive agent oriented software architecture (AAOSA), in which an agent network is developed for the purpose of interpreting user input in a distributed manner as commands and inquiries for a back end application, such as an audiovisual system or a financial reporting system. An AAOSA agent network is a network of agents, each (or most) of which contain one or more "interpretation policies" that describe the agent's function in the distributed parsing operation. An interpretation policy includes, among other things, a policy condition and a policy action. When an agent receives a message from another agent to attempt to interpret an input string, it compares the input string to each of the agent's policy conditions in sequence. If a condition does apply to the input string, or to part of the input string, then the policy makes a "claim" on the applicable portion of the input string, and returns the claim to the agent that requested the interpretation. A claim identifies (among other things) the agent and policy which is making the claim, the portion of the input string to which the claim applies (called the claim "focus"), the priority number of the policy, and also a confidence level which indicates how well the input matches the policy condition. The priority and confidence levels, and the focus, all can be used subsequently by upchain agents for comparing all claims made by the agent, so as to permit the agent to select a "best" one among competing claims.

Policy conditions in AAOSA are typically written as expressions made up from operators and operands. The various operators include unary operators such as <exists>, <exact>, <substring>, <accent>, <accent-substring>, REPEAT and PLUS. They also include binary operators such as OR, AND, ORDERED, ADJACENT and AMBIGUITY. The operands on which an operator can act include tokens (words, strings, numbers, symbols, delimiters), text files, databases, and claims made by other policies. If a first policy condition (the "referencing policy condition") refers to a second policy (the "referenced policy") previously evaluated in the same agent, then any claim made by the referenced policy can be figured into the evaluation of the referencing policy condition in the manner specified by the operators. If a policy condition refers to another agent (the "referenced agent") downchain of the current agent (the "referring agent"), then the claim or claims returned by the referenced downchain agent are figured into the evaluation of the referencing policy condition in the manner specified by the operators. Note that a policy condition that references a downchain agent cannot be completely resolved until the input string is passed to that other agent for comparing to its own policy conditions. In one embodiment, the referencing agent passes the input string to each downchain agent only upon encountering the agent's name while evaluating a policy condition. In a typical embodiment, however, the referencing agent passes the input string to all downchain agents mentioned in any policy condition in the referencing agent, before the referencing agent begins evaluating even its first policy condition.

Thus it can be seen that in a typical AAOSA network, interpretation of the user's intent takes place in an agent network in a distributed manner. Each of the agents in the agent network can be thought of as having a view of its own domain of responsibility, as defined by its interpretation policies. Typically the application domain is organized by the designer into a hierarchy of semantic sub-domains, and individual agents are defined for each node in the semantic hierarchy. The network is also typically organized so as to include a Top agent, responsible for receiving input and initiating queries into the network. Agents representing the functionality of the system (the agents constructing their actuation sub-strings without reference to further agents) typically are the lowest order nodes (leaf agents) of the network.

A typical AAOSA network operates in two main phases: the interpretation phase (also called the claiming phase) and the delegation phase (also called the actuation phase). In the interpretation phase, an initiator agent (such as the Top agent) receives the input token sequence from a user Interaction agent and, by following the Top agent's policy conditions, queries its downchain agents whether the queried agent considers the input token sequence, or part of it, to be in its domain of responsibility. Each queried agent recursively determines whether it has an interpretation policy of its own that applies to the input token sequence, if necessary further querying its own further downchain agents in order to evaluate its policy conditions. The further agents eventually respond to such further queries, thereby allowing the first-queried agents to respond to the initiator agent. The recursive invocation of this procedure ultimately determines a path, or a set of paths, through the network from the initiator agent to one or more leaf agents. The path is represented by the claim(s) ultimately made by the initiator agent. After the appropriate paths through the network are determined, in the delegation phase, delegation messages are then transmitted down each determined path, in accordance with the action parts of winning policies, with each agent along the way taking any local action thereon and filling in with further action taken by the agents further down in the path. The local action involves building up segments of the actuation object, with each agent providing the word(s) or token(s) that its policies now know, by virtue of being in the delegation path, represent a proper interpretation of at least part of the user's intent. The resulting actuation object built up by the selected agents in the network is returned to the initiator agent as the output of the network. The initiator agent then typically forwards the actuation object to an Actuation agent, which evaluates the fields and field designators therein to issue a command or query to the back-end application and returns any response back to the user via the Interaction agent. In this way the intent of the user, as expressed in the input token string and interpreted by the agent network, is effected.

In order to provide a natural interaction it is desirable for natural language systems to support dialogues. In the past, dialoguing has been supported through the interpretation network of an AAOSA system as a hard-coded part of the interpretation phase of the network. In particular, the Interaction agent, after an input token sequence was interpreted by the agent network, would retain a copy of the winning claim. When new input arrived, if context was to be maintained, the Interaction agent would send the winning claim from the prior input into the interpretation network together with the new input. Then in the interpretation agents, whenever a policy made a claim, the agent class method would also retrieve from the previous winning claim the claims that were made by the policy in response to the previous input, and would re-make the same claims in addition to any new claims it could make on the new input. The claims re-made from the previous winning claim were treated as being of lower quality, so as to be superceded generally by any claims newly made on the new input. Thus consider an example system for a contact manager in which the agent network includes a First Name agent and a Last Name agent, both downchain of a Name agent. Dialogs such as the following were supported:

| user: | "Contact John" |
| --- | --- |
| system: | First Name agent claims 'John'. |
| user: | "Last name Smith" |
| system: | Last Name agent claims 'Smith' |

-continued

First Name agent repeats its prior claim on 'John'
Name agent combines the two claims to claim 'John Smith'

These approaches have been powerful, but also had a number of limitations. First, the repetition of prior claims was a hardcoded feature of the methods underlying the agent network. The designer of a given network had no control over the feature through the agent policy definitions. Not only did this limit flexibility, but also sometimes created undesirable behavior which had to be prevented through the use of additional policy conditions. Policies sometimes had to be written to re-interpret claims, including determining whether certain claims had been based on still-earlier input. In addition, in many systems part of the decision about what to include in the actuation object was made during the delegation phase, by the action part of policies, rather than in the interpretation phase. In that case the winning claim made in response to the prior input did not necessarily accurately reflect the actuation that actually resulted from the prior input. In some systems the Actuation agent, too, could modify the actuation in a manner that would not be reflected in the winning claim. Further, even though the entire prior winning claim was sent into the interpretation network with each new input token string, each agent made use of only its own prior claims. There was no easy way for an agent to refer to the prior claims made by other agents. Still further, the designer of the Actuation agent in some systems sometimes had to examine the winning claim object instead of only the actuation object representing the interpretation of the network. But since the winning claim object was a much more complex structure than the actuation object, this created a much greater knowledge burden on designers of Actuation agents than was desirable.

These limitations in the earlier dialoguing mechanisms made it difficult to support such features as replacing parameters of prior input, expressing dissatisfaction with the results of prior input, or expressly or implicitly discontinuing a dialog. A new approach to dialoguing is urgently required.

SUMMARY OF THE INVENTION

According to an aspect of the invention, roughly described, a natural language interpretation system develops its interpretation in response to user input, and also in dependence upon the interpretation, rather than the claims, made in response to prior input. In policy conditions, an agent can check whether any specified agent contributed to the prior interpretation and adjust its claiming of the present input accordingly. In policy actions, a policy or agent can reference the prior interpretation both for conditioning the policy's or agent's contribution to the current interpretation, and also for incorporating part or all of the prior interpretation in the policy's or agent's contribution to the current interpretation. A number of other manipulations relative to the prior interpretation are also available to individual interpretation policies or agents. The resulting system thus implements dialoging in a distributed manner as part of the various agents in the interpretation network, and allows much more flexibility to better respond in accordance with users' expectations.

BRIEF DESCRIPTION OF THE DRAWINGS

The invention will be described with respect to specific embodiments thereof, and reference will be made to the drawings, in which:

FIGS. 2, 3, 4, 6, 9, 10, 11 and 12 are diagrams of example agent networks.

FIGS. 5, 7 and 8 are screen shots illustrating fields in a policy, policy reference, and agent reference, respectively.

DETAILED DESCRIPTION

System Overview

Figure 1:
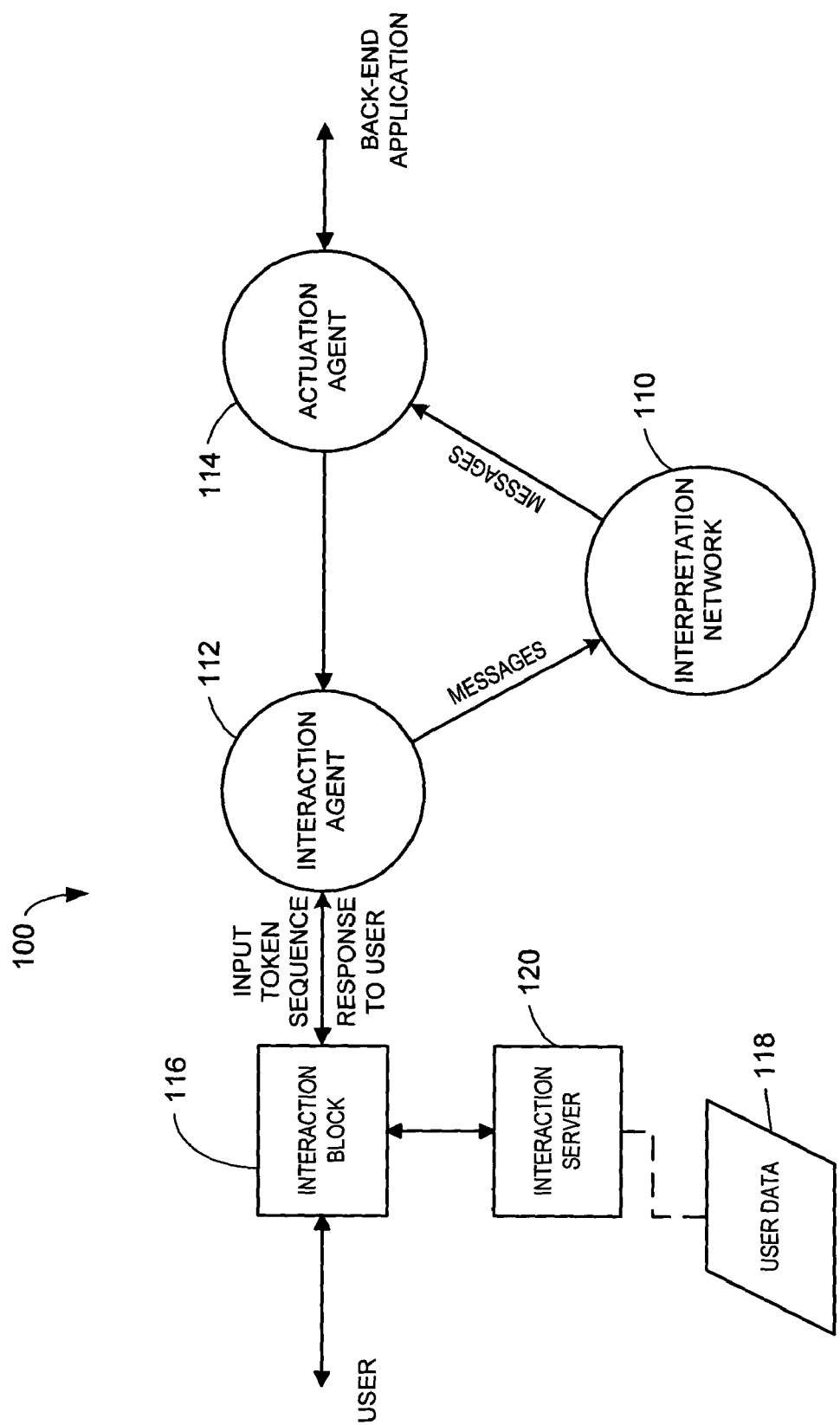
FIG. 1 is a functional block diagram overview of parts of a typical system incorporating the invention.

FIG. 1 is a functional block diagram overview of pertinent parts of a typical system 100 incorporating invention. It includes an interpretation network 110 which performs the natural language interpretation, an Interaction agent 112 that is responsible for user interaction, and an Actuation agent 114 that is responsible for communicating with the back-end application. The Interaction agent 112 receives commands from the user via an interaction block 116, and also generates replies back to the user via the same block. The interaction block 116 performs appropriate conversions for communicating with the user in the modality and via the transport that the user is using. The interaction block 116 queries an interaction server 120 for such information as the I/O modality being used by a particular user, and the user's logon information for the back-end application. Such information is stored in a user database shown in FIG. 1 as USER DATA 118.

The interpretation network 110 attempts to discern the intent of the user as evidenced by the input provided to it by the Interaction agent 112, and to generate actuation objects for the Actuation agent 114 that describe the functionality that the user is requesting. The Actuation agent 114 determines whether the interpretation described in the actuation object is sufficient to instruct the back-end application, and if so, it generates one or more commands for effecting the interpretation and forwards them toward the back-end application. In various embodiments the commands may be converted via another module (not shown) for transmission via the appropriate transport to the back-end application. The Actuation agent 114 also returns the actuation object to the Interaction agent 112 for further use as described hereinafter, along with any response from the back-end application. Interaction agent 112, interpretation network 110 and Actuation agent 114 are sometimes referred to collectively herein as the interpretation components of the system 100. Also as used herein, user input can include input of all kinds, including commands, queries, inquiries, and so on. All of these terms are used interchangeably herein. Also as used herein the term "object" is used in its broad sense to refer merely to a grouping of information. No particular structure is required.

The system 100 runs on a Natural Interaction Platform that includes all the modules shown in FIG. 1. Each instance of these components executes inside its own Java Virtual Machine (JVM), communicating with each other through RMI (Remote Method Invocation). Alternatively, in various installations some or all of the various components can execute together inside a single JVM.

The interpretation components of the system 100 are defined in the Opal file that was identified to the interaction server 120 at system startup. An Opal file is an XML document which defines certain properties of each of the agents in an agent network. The agents themselves are implemented as instances of java classes and subclasses, and the Opal file specifies, for each agent and among other things, the specific class or subclasses from which the agent is to be instantiated, which other agents each particular agent listens to for each particular kind of message, as well as (for most agents) a set of one or more interpretation policies which implement the interpretation task for which the particular agent is responsible. The Opal file is used by an Opal converter program at system startup time to instantiate the entire agent network, including Interaction agent 112, Actuation agent 114, and all the agents in the interpretation network 110. The interpretation policies in Opal files are written in accordance with a policy language. One such policy language is defined in the Dejima Policy Reference, Dejima Direct Platform Version 2.7.0, a copy of which is attached hereto in Appendix A. In addition, it will be understood that the Opal file uses standard XML coding, in which (among other things):

| | |
|---|---|
| ![CDATA[...]] | indicates that "..." is to be interpreted as Character data; |
| < | means "<" (left angle bracket) |
| > | means ">" (right angle bracket) |
| & | means "&" (ampersand) |
| ' | means "'" (apostrophe) |
| " | means """ (quotation mark) |

General Interpretation Flow

Figure 2:
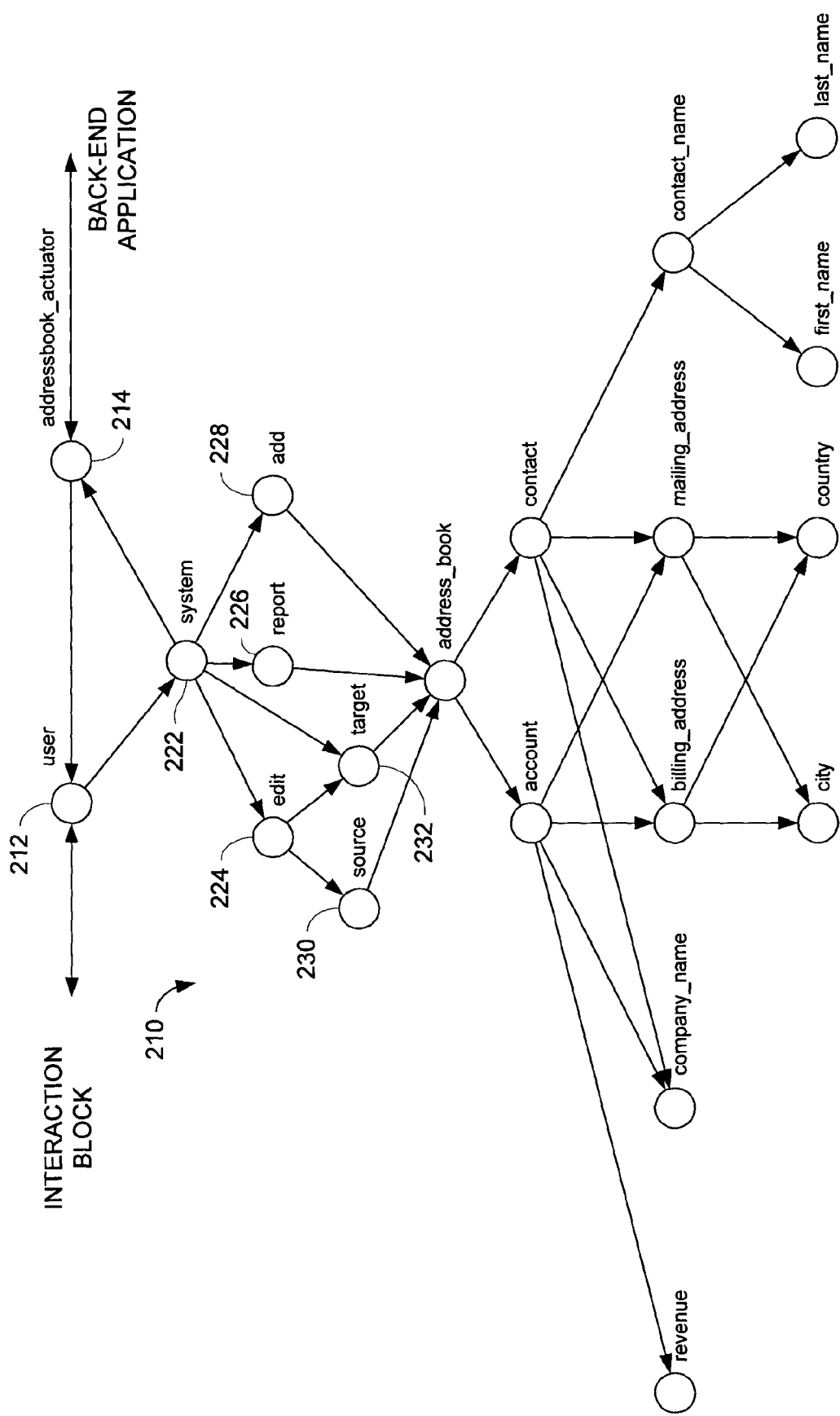

FIG. 2 is a diagram of an example AAOSA agent network, used for implementing a natural language interface to a back-end application that is designed for maintaining an address book. In this network, User agent 212 is the Interaction agent and Addressbook_Actuator agent 214 is the Actuation agent. All the remaining agents in FIG. 2 form an interpretation network 210. The Opal file defining the agent network of FIG. 2 is set forth in the addressBook.opal.xml.txt file in the CD-ROM appendix. The policies of the agents in FIG. 2, written in accordance with the Policy Reference in Appendix A, have also been extracted from the Opal file and presented in a more readable manner in the addressBookPolicies.txt file in the CD-ROM appendix.

When an input token sequence is ready, the interaction block 116 passes it to agent network 210 by calling the Process method of the User agent 212. Whenever the User agent 212 receives a token sequence, it initiates an interpretation attempt into the agent network by communicating the input token sequence, in an object of class "InitiateInterpretationMessage", to the Top agent of the network. It also passes a context object to the Top agent, containing (among other things) the actuation object that resulted from the immediately previous input in the present user session (if any). This is as distinguished from previous mechanisms, which would pass only the winning claim from the prior input, not the resulting interpretation. Whenever an agent receives a token sequence and context object, it first copies the previous actuation from the context object into the agent's own properties so that it may be referenced by interested policy conditions and actions. The agent then evaluates its policies.

In the network of FIG. 2, the Top agent is System agent 222. The Top agent contains one or more interpretation policies including, in a typical network, some policy conditions that do very little aside from referencing one or more other agents deeper in the network. System agent 222 in FIG. 2 contains seven interpretation policies, but for simplifying the present discussion, assume that it contains only the following four that do not refer to the previous actuation:

---

SYSTEM AGENT POLICIES
    edit_command:
        edit;

```
-continued report_command:
    report;
add_command:
    add;
dejima_interpretation:
    (report_command | edit command | add_command)+
    {action: report_command, edit_command, add_command};
```

As is typical for a Top agent, the policy conditions of the first three policies of System agent 222 do nothing more than reference the Edit, Report and Add agents 224, 226 and 228, respectively. Such policy conditions apply to the input token string if and only if the referenced agent can make a claim to at least part of the input token string. The fourth policy condition will make a claim for the agent if any of the first three policies made a claim. Agents that are referenced in the policies of a given agent are considered herein to be "downchain" of the given agent, and the given agent is considered to be "upchain" of each of the agents it references. Note that all policies include both a policy condition and a policy action. If the policy action is omitted in the Opal file, then a default action is assumed. The default action merely delegates actuation to the policies and/or agents that appear in the policy condition.

When an agent receives the input token sequence, after storing the prior actuation from the provided context object, it then looks in its policies for policy conditions that make reference to any downchain agents. If there are any, then the agent forwards the input token string to each of the downchain agents in an "IntepretItMessage" and awaits replies. In the embodiment of FIG. 2, the Edit, Report and Add agents 224, 226 and 228, respectively, are all referenced in the System agent's policy conditions and are therefore downchain of the System agent 222. Each agent downchain of the System agent 222 does the same upon receipt of an InterpretItMessage. When an agent has received all replies (or in certain embodiments, times out on all replies not yet received), the agent tests the input token sequence against the agent's policy conditions. The agent processes the input in order from the agent's first policy to its last policy. Each policy makes all the claims it can on the input. Subsequent policies in the agent can make reference to claims made by previously processed policies in the agent, as well as to claims made by downchain agents. After all policies have made their claims the agent uses a predetermined algorithm to select the "best" claim. If the best claim is one made from a non-grammatical condition (e.g. combo operator), then the sub-claims are also selected. The agent then returns the selected claim or claims to the agent's upchain agent in an object of class ClaimMessage. If the agent is not able to make any claims on the input, then the agent passes upchain an object of class NoClaimMessage. Agents in the present embodiment do not automatically re-make the claims they made in response to the previous input, although as explained below, the policy actions can cause that to occur explicitly.

Thus in the embodiment of FIG. 2, each of the agents downchain of the System agent 222 eventually will receive any claims made by its own downchain agents and will refer to such claims in the evaluation of its own policy conditions. Each such agent then will respond to the System agent 222 with either a ClaimMessage or a NoClaimMessage. If the System agent 222 receives only NoClaimMessages, then none of the four policies in the System agent (as simplified above) apply. If no policy applies, then no user-perceptible action is taken in response to the input.

The System agent 222 evaluates its own policy conditions in the same manner as other agents in the network, and each such policy again makes as many claims as it can on the input. But because the System agent 222 is the Top agent, it does not transmit any resulting claims (or NoClaims) to any further upchain agents. Instead, as the Top agent of a network, after selecting one or more "best" claim(s) in the manner described above, System agent 222 has the responsibility to delegate "actuation" to the agents and policies that made up the claim(s). This process, which is sometimes called "executing" the winning claim, takes place according to the "action" part of the winning policy or policies in the Top agent. The action part of a policy builds up an actuation string in a manner similar to that in which policy conditions build up the result of the condition, that is, by string operators and operands that can include words, numbers, symbols, actuation sub-strings already created by other policies within the same agent, and actuation sub-strings created by other downchain agents. Often the downchain agents referred to in the action part of a policy are the same agents referred to in the condition part of the policy. The actuation strings and sub-strings are contained in an actuation objects which, as will be seen, can contain other information as well. The action parts of policies can build up other parts of the actuation object in a manner similar to the building up of the actuation string.

In order to fill in the portions of an actuation object that need to be provided by downchain agents, the Top agent sends an object of class DelegationMessage to each downchain agent referenced in the action part of the winning policy(ies). In the embodiment of FIG. 2, the simplified version above of the System agent 222 might send delegation messages to one, two or all three of the Edit, Report and Add agents 224, 226 and 228. The actuation objects returned by these three agents are put together by the System agent 222 in the manner defined in the action part of the fourth policy, i.e. by concatenation. The resulting actuation object will be the output of the network. The DelegationMessage received by an agent includes a reference to the particular policy or policies of that agent which formed part of the winning claim. Upon receipt of such a message, therefore, the agent executes the action part of each of its policies that formed part of the winning claim, issuing DelegationMessages of its own to its own downchain neighbors as called for in the action part of such policies, and building up an actuation sub-objects for returning to the agent's upchain caller. Actuation sub-objects are passed to upchain agents in objects of class ActuationMessage, ultimately once again reaching the Top agent of the network (System agent 222). This agent then forwards the actuation object to the Actuation agent, Addressbook_Actuator agent 214.

The Addressbook_Actuator agent 214 evaluates the actuation object to determine whether it contains sufficient information to formulate one or more commands for the back-end application, and if so, transmits such commands toward the application. The Addressbook_Actuator agent 214 also creates a context object that includes the actuation object. If the actuation contained an ambiguity, then Addressbook_Actuator agent 214 also formulates a question to the user to resolve the ambiguity. It then returns the context object and any ambiguity resolution question to User agent 212 along with any response from the back-end application. User agent 212 forwards toward the user any response from the back-end application and any ambiguity resolution question, and stores the context object for returning to the interpretation network with the next user input.

Enhancements to Improve Dialoging

As mentioned, the standard policy language does not support dialoging in a highly flexible manner. In order to improve this capability, the embodiment described herein includes a number of enhancements. Some of the enhancements improve the ability of the agent network designer to write policy conditions that make reference to the prior history of the dialog. Other enhancements allow the designer to make use of the prior actuation when a policy action is making its contribution to the new actuation. Still other enhancements allow the designer to set attributes explicitly in the new actuation, which the Actuation agent will include in the context object returned to the Interaction agent for transmitting into the interpretation network with the next input token string. The enhancements are described in detail in the Policy Reference in Appendix A, and java source code to implement them is set forth in the class definitions included in the CD-ROM appendices.

Interpretation Phase Enhancements—Priority Assignment

One group of enhancements allow the agent network designer to set the priority of policy claims in dependence upon prior dialoging history. When a policy makes a claim on input, the claim is assigned a priority. A policy's priority is assigned to all claims made by that policy. Priority is a positive or negative number showing the precedence of the claim. Priorities are local to an agent, meaning that when an agent sends a claim to an upchain agent, the priority is reset to 0. The exception is priorities assigned for adding dialoging focus. These priorities are passed upchain with the claim.

When two claims merge the priority of the claim with the higher priority is assigned to the merged claim. Consider the following policies:

P1: 'aaa' {priority: +1}
P2: 'bb' {priority: 0}
P3: P1 & P2

Here the priority assigned to claims made by P3 will be +1.

Agents use a claim ordering criteria to choose the best claims to propagate up chain. In the default criteria, priority is second in importance behind claim coverage and in the present embodiment is the only criterion that can be set explicitly in the policy. Claim coverage is compared first: if one claim's focus includes that of a second claim, the first claim wins. But if two claims have equal coverage, then the one with a higher priority will win. Other criteria, considered only if coverage and priority are both equal, include connection weight, tokens distance, focus size, match restrictiveness, whether a claim includes a variable, input position, and claim creation sequence.

The agent network designer can assign either static or dynamic priorities to a policy explicitly. To assign a static priority, the designer specifies the number immediately after a "priority:" tag in the policy definition. To assign a dynamic priority, which depends on the evaluation of an expression, the designer first specifies the class containing a service method to be used. The following example assigns a priority by calling a recency( ) method in a FollowupPriority class:

p1: anAgent
{action: com.dejima.core.nlp.text.FollowupPriority: recency(anAgent)}

If no class is specified then a default class is used.

The designer can write his or her own service methods for use in the priority clause of a policy, merely by including it in the specified class. Any public method with the following signature can be created:

public int methodName(Claim claim, Context context, ActionElement a1, ActionElement a2, . . . )

Included in the CD-ROM appendix is a FollowupPriority class definition, which includes three example service methods useful for assigning dynamic priorities in dependence upon the prior dialoging history. The methods are recency, topicScope and isFollowupByDefault. Their usage is described below.

recency(x)

This service method returns the number of inputs leading to the last follow up where a policy (or an agent), x, contributed to the output. At this point it should be noted that the act of "contributing" to an actuation requires only that an operation be performed on the actuation, even if the operation happens to leave the actuation unchanged or a subsequent event un-does the operation. Thus the resulting actuation of the network might or might not ultimately include the contribution of a particular agent, even if the particular agent "contributed" to the actuation. In addition, a policy's "contribution" to an actuation might include delegating actuation to one or more other entities (such as other policies or other agents), and might include nothing other than such delegation.

An example showing how the recency(x) service method can be used in an agent's policies is as follows.

```
country: ('USA' | 'Japan'| 'UK' | 'France'};
    {action: '<country>', * , '</country>'};
city: ('San Jose' | 'Tokyo' |'London' | 'Paris')
    {action: '<city>', * , '</city>'};
mailing_address: ['mailing address'] & [city]& [country]
    .{action: '<mailingAddress>', city,
    country, '</mailingAddress>'};
billing_address: ['billing address'] & [city] & [country]
    {action: '<billingAddress>', city,
    country, '</billingAddress>'};
mailing_address_field: mailing_address
    {priority: recency(mailing_address))}
    {action: mailing_address};
billing_address_field: billing_address
    {priority: recency (billing_address)}
    {action: billing_address};
contact: ['contact'] & (billing_address_field,
    mailing_address_field)
    {action:
        '<contact>',
        billing_address_field, mailing_address_field,
        '</contact>'}
    {ambiguity action:
        '<contact><amb>'
        billing_address_field, mailing_address_field,
        '</amb></contact>'};
```

Recency is calculated during an example dialog as follows.

```
Initial values:
recency(billing_address) = 0
recency(mailing_address) = 0
After follow-up input 1: "Contact billing address San Jose",
recency(billing_address) = 1
recency(mailing_address) = 0
After follow-up input 2: "Paris",
recency(billing_address) = 2
recency(mailing_address) = 0
After follow-up input 3: "Mailing address Tokyo",
recency(billing_address) = 2
recency(mailing_address) = 3
Follow-up input 4: London!
```

| Input | Output using recency | Output when recency service method is not used in billing_address_field and mailing_address_field policies |
|---|---|---|
| "Contact billing address San Jose" | <contact><br><billingAddress><br><city>san jose</city><br></billingAddress><br></contact> | <contact><br><billingAddress><br><city>san jose</city><br></billingAddress><br></contact> |
| "Paris" | <contact><br><billingAddress><br><city>paris</city><br></billingAddress><br></contact> | <contact><br><amb><br><billingAddress><br><city>paris</city><br></billingAddress><br><mailingAddress><br><city>paris</city><br></mailingAddress><br></amb><br></contact> |
| "Mailing address Tokyo" | <contact><br><mailingAddress><br><city>tokyo</city><br></mailingAddress><br></contact> | <contact><br><mailingAddress><br><city>tokyo</city><br></mailingAddress></contact> |
| "London" | <contact><br><mailingAddress><br><city>london</city><br></mailingAddress><br></contact> | <contact><br><amb><br><billingAddress><city>london</city><br></billingAddress><br><mailingAddress><br><city>london</city><br></mailingAddress><br></amb><br></contact> | topicScope(x)

The topicScope(x) service method calculates how relevant a policy (or an agent), x, is to the topic of conversation. A policy/agent x is relevant if it is part of the current context's followup scope. If not relevant then the topicScope returns recency(x). Use of the topicScope(x) service method allows the agent network designer to give higher priority to the current topic of a dialog.

isFollowupByDefault(x, c)

The agent network designer can cause a "followupByDefault" flag to be set in an actuation object during actuation of a winning claim, by invoking a setFollowupByDefault(true) service method in the action part of a policy as described below. This flag is included in the context object returned by the Actuation agent to the Interaction agent, and is therefore available to policies for testing during the interpretation phase of the next user input. The isFollowupByDefault(x, c) service method returns a priority equal to the constant c if the followupByDefault flag in the current context object is true. Thus the followupByDefault flag allows the agent network designer to notify the network that the next input is most likely going to be a follow-up rather than a new topic, and the isFollowupByDefault(x, c) method allows the designer the ability to test the flag and the flexibility to change the network's interpretation of the next input in dependence upon it.

Interpretation Phase Enhancements—Checking Agent's Contribution to Prior Actuation As mentioned, each user input token sequence sent into the interpretation network for interpretation is accompanied in the present embodiment by a context object from which each recipient agent copies the prior actuation into the agent's own properties. The agent property used for this purpose is called 'previous_action'. In order to further improve dialoging behavior, the policy language allows the agent network designer to test this property to determine whether the prior actuation included a contribution by a particular agent. Since agents are preferably organized by semantic domains, this capability allows the designer to tailor an agent's claims depending on whether the network considered the prior input to include an aspect in a specified semantic domain.

The CheckPropertyCondition class, included in the CD-ROM appendix, allows a policy condition to check the value associated with any property of any agent. The syntax in the Opal policy language is:

<check (agent, property, key; value)>

When this syntax is encountered during the evaluation of a policy condition, the CheckPropertyCondition( ) method is called and a claim will be made only if the specified property of the specified agent is equal to the specified value. This condition is especially useful for such things as conditioning the agent's response on the current state of the back-end application. The 'agent' parameter is optional and defaults to the current agent.

When the value parameter is not provided the check condition makes a claim only if the specified agent property exists and has a non-null value assigned to it. This condition is especially useful to check the context, which by the time the policy condition is evaluated has been copied to the current agent's 'previous_action' property. The previous_action property maps in-scope policies and agents to their ultimate contribution to the final actuation object for the previous input by the same user in the same session. The check operator syntax used for checking for existence of a previous actuation associated with a policy, is:

<check('previous_action', p)> where p can be any in-scope policy. If the check operator is used in the condition of policy $p_n$ then the policy $p_n$ and all policies $p_1, p_2, \ldots, p_{n-1}$ declared before $p_n$ are in-scope. The check operator syntax used for checking for existence of a previous actuation associated with an agent, is:

<check('previous_action', a)> where a can be any in-scope agent. If the check operator is used in the agent $a_n$ then $a_n$ and all agents known to $a_n$ (linked to $a_n$ with a message link) are in-scope, including all upchain and downchain agents.

Figure 6:
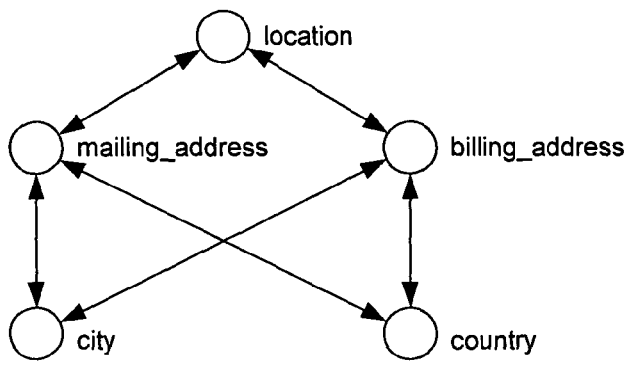

FIG. 6 is a simple agent network diagram useful for illustrating the check operator. In this network, the following policies are defined:

```
city agent:
    p1: 'san jose' | 'sunnyvale' {action: *}
    p2: p1+ {action: p1}
country agent:
    p1: 'USA' |'Japan'| 'France' | 'UK' {action: *}
    p2: p1+ {action: p1}
mailing address:
    p1: city & country & ['mailing']
        {action: '\nmailing: ',city,' ',country}
billing address:
    p1: city & country & ['billing']
        {action: '\nbilling: ',city,' ', country}
location:
    p1: billing,mailing
        {action: '\nlocation: ', billing, ' ', mailing}
```

The following actuation table describes the actuation strings that are generated by this network in response to various input token sequences:

|  | city | | country | | mailing address | billing address | location |
|---|---|---|---|---|---|---|---|
| input | p1 | p2 | p1 | p2 | p1 | p1 | p1 |
| 1. "billing address san jose USA" | san jose | san jose | USA | USA | — | billing: san jose USA | location: billing: san jose USA |
| 2. "billing address san jose sunnyvale USA" | san jose sunnyvale | san jose sunnyvale | USA | USA | — | billing: san jose sunnyvale USA | location: billing: san jose sunnyvale USA |
| 3. "San jose" | San jose | San jose | — | — | mailing: San jose | billing: San jose | location: billing: San jose mailing: San jose |

Check operators, if used in the above policies, would have the following values:

| interaction | check operator | result |
|---|---|---|
| 1 | <check ('previous_action', p1)> (declared in location agent) | true |
|  | <check ('previous_action', location)> (declared in location agent) | true |
|  | <check ('previous_action', billing_address)> (declared in location agent) | true |
|  | <check ('previous_action', mailing_address)> (declared in location agent) | false |
| 2 | <check ('previous_action', location)> (declared in billing_address agent) | true |
|  | <check ('previous_action', city)> (declared in billing_address agent) | true |
| 3 | <check ('previous_action', country)> (declared in location agent) | false |
|  | <check ('previous_action', billing_address)> (declared in location agent) | true |
|  | <check ('previous_action', mailing_address)> (declared in location agent) | true |

An example of the utility of the check existence operator in dialoging is given in the full System agent 222 (FIG. 2). This network includes Source and Target agents 230 and 232, respectively, for changes to be made in the address book. If the user requests a report after having performed an edit function, it is desired that the report be actuated with only the source, not the target. In order to effectuate this, the System agent 222 (not the simplified version discussed above) includes a "report_after_edit" policy as follows:

report_after_edit:
<check('previous_action', target)> & report
{action: removeContext(target), report};

In the policy condition, this policy checks whether the previous actuation included a contribution from the Target agent 232, since each agent's contribution to the actuation is identified by a key which is the name of the agent. If it did, and the Report agent 226 has made a claim on the current input, then the report_after_edit policy will make a claim on the current input. If the claim is part of the winning claim, then the action part of the policy invokes another service method, remove-Context() discussed below, to remove from the context for the remainder of the actuation phase for this agent, the contribution that the Target agent 232 had made to the prior actuation.

The action part also adds to the new actuation object the actuation object returned by the Report agent. The following example dialog can result:

| input: | "Change address of John to Mountain View. |
| system: | (notes there are numerous Johns and requests clarification) |
| input: | "Show those in California" |
| system: | "John X and John Y" |
| input: | "John X". |

Here the Report agent claimed the word "show" in the second input, and the System agent detected that this report request occurred after the edit request in the first input. Since the second input was a followup to the first (response to a clarification request), the System agent removed the target information from the context object before evaluating the reference to the Report agent, since the target information is not relevant to the report request.

Delegation Phase Enhancements—Service Methods in General

The output of each policy is an Actuation object. The Actuation class instantiated by a policy can be specified in the '{action: ... }' clause right after the 'action:' tag, as follows:
  p1: 'hello'
  {action:       com.dejima.core.nlp.text.XMLFollowupActuation: 'greetings'}

A default Actuation class is used if none is specified in the policy.

The designer can write his or her own service methods for use in the action (or ambiguityAction) clause of a policy, merely by including it in the Actuation class. Any public method with the proper signature can be used as a service method. There are two main types of service methods in the present embodiment, with different signature types: actuation manipulating methods and setter methods.

Delegation Phase Enhancements—Actuation manipulating Service Methods

Actuation manipulating methods have the following signature:
  void methodName(Claim networkClaim,
  Context context,
  ActionElement a1, ActionElement a2, ... )

where networkClaim is the claim selected by the agent network for actuation and a1, a2, ... are ActionElements. The context parameter contains, in addition to the previous actuation and a followupFocus, the current state of the dialog. In one embodiment, the only states supported are 'isFollowupByDefault'=yes or no. In another embodiment, or by user extension of the classes described herein, context can also take on other values such as 'continuation'. Actuation manipulating methods perform a function that either tests or changes either the actuation being built, or the context or the winning claim object as represented in the current agent's properties. An example of an actuation manipulating service method that is offered in the FollowupActuation class in the CD-ROM appendix, is the ifNotAmbiguous( ) method, defined as follows:

```
/**
* Only performs action when there's no ambiguity.
* @param networkClaim The winning claim of the agent network
    (chosen for actuation).
* @param context The context of the agent being actuated.
* @param action The action which should be added if networkClaim
    is not ambiguous.
*/
public void ifNotAmbiguous (Claim networkClaim, Context context,
    ActionElement action)
    {
    if (!networkClaim.hasInheritedAmbiguity( ))
    add (action);
    }
```

The ifNotAmbiguous( ) service method performs the specified action on the actuation object, only if the current claim is not ambiguous. The method is invoked in the agent policy language as in the following example:

p1: 'John' | 'Smith' {action: *}/* this policy claims any of the two first names: John or Smith*/
p2: 'Smith' | 'Brooks' {action *}/*this policy claims any of the two last names: Brooks or Smith*/
p3: p1,p2 {action: p1, p2}/*this policy claims either the first name (p1) or the last name (p2) or an ambiguity between first name and last name*/
p4: p3 {action: ifNotAmbiguous(p3)}

Here if the current winning claim has not been marked as containing an ambiguity, then the action part of policy p4 will add to the actuation object the action of policy p3.

Another example of an actuation manipulating service method offered in the FollowupActuation class in the CD-ROM appendix, is the removeContext( ) method, which removes all elements from the prior actuation, as represented in the context object in the current agent's properties, that had been contributed by a specified agent. It has the following definition:

```
/**
* Removes all elements created by the action from the context's
    previous actuation.<p>
* Note: This method relies on all child actuations to be an
    instance of Followup actuation.<p>
* Use to ignore part of the context created by a specific action
    for the rest of the actuation of the agent.
* @param networkClaim The winning claim of the agent network
    (chosen for actuation).
* @param context The context of the agent being actuated (not
    used in this method).
* @param action The action which it's previous actuation should
    be removed from the context.
* @throws IllegalArgumentException if the action is not an
    AgentActionElement or a PolicyActionElement
*/
public void removeContext (Claim networkClaim, Context context,
    ActionElement action)
{ if (!(action instanceof ReferenceActionElement))
        throw new IllegalArgumentException
            (makeExpectedReferenceActionError (action));
    if (context.getPreviousActuation ( ) instanceof
    FollowupActuation)
        ((FollowupActuation)
            context.getPreviousActuation( )).remove (action);
}
```

Other actuation manipulating service methods offered by the FollowupActuation class are as follows:

restart( )

Restarts the dialogue. Sets the previous actuation in the context to null and clears the previous input. This method is almost always used in the Top agent in the network.

An example of explicit dialogue restart:

```
explicitRestart: 'new query' | 'restart context'
    {action: restart ( ), 'dialogue restarted'};
Input: new query
Output: dialogue restarted
``` addPrevious(x)

The add service method adds the previous output of a policy/agent (x) to the new output. As an example, assume all the following policies are included in one System agent called "cities".

```
city:
    'san jose' | 'sunnyvale' | 'cupertino' | 'paris' | 'london'
    | 'tokyo'
    {action: *, ' '};
all_cities:
    city
    {action: addPrevious (cities), city};
```

The system will conduct the following dialog in response to the following inputs:

| input | output |
|---|---|
| san jose | san jose |
| Cupertino | san jose cupertino |
| paris | san jose Cupertino paris | replacePrevious(a, x)

Replaces the previous output of an agent (a) with the new output of a policy/agent (x). If policy/agent (x) output is empty then the previous output will be added. As an example, consider that the agents of the network shown in FIG. 10 have the following policies:

```
Location agent policies:
aLocation:
    city &| country
    {action: 'city: ', replacePrevious(city, city), '\ncountry',
        replaceprevious (country, country) };
City agent policies:
aCity:
    ('San Jose' | 'Sunnyvale' | 'Cupertino' | 'Paris' | 'Tokyo')
    (action: * .matched};
Country agent policies:
aCountry:
    ('USA' | 'England' | 'France' | 'Japan')
    (action: * .matched};
```

Then the following dialog can result:

| Input | Output | Note |
|---|---|---|
| San Jose | City: San Jose<br>Country: | New output of City agent added |
| USA | City: San Jose<br>Country: USA | Previous output of City agent is kept.<br>New Output of Country agent added. |
| Sunnyvale | City: Sunnyvale<br>Country: USA | Previous output of City agent replaced.<br>New Output of Country agent added. |

The following example illustrates replacePrevious( ) and addPrevious( ) with ambiguities. Assume the agent network in FIG. 11 has the following interpretation policies:

```
Cities agent policies:
    explicitRestart: 'new query' | 'restart context'
        {action: restart ( ), setInfo('context restart') };
    theCities:
        costarica, usa;
    allCities:
        theCities
        {action: replacePrevious(cities, theCities) };
costarica agent policies:
    countryName:
        'Costa Rica'
        {action: addPrevious (costarica) };
    cityNames:
        ('San jose' | 'Quepos')
        {action: * .matched};
    costaricaCities:
        [countryName] & cityNames
        {action: cityNames,'(Costa Rica) '};
usa agent policies:
    countryName:
        'USA'
        {action: addPrevious (usa)},
    cityNames:
        ('New York' | 'Washington' | 'San Jose')
        {action: * .matched};
    usaCities:
        [countryName] & cityNames
        {action: cityNames,'(USA) '};
```

Then the following dialog can result:

| Input | Output | Note |
|---|---|---|
| New York | New York (USA) | |
| USA | New York (USA) | addPrevious |

| Input | Output | Note |
|---|---|---|
| Quepos | Quepos (Costa Rica) | replacePrevious - replaces New York with Quepos |
| San Jose | San Jose (Costa Rica)<br>San Jose (USA) | replacePrevious - replaces Quepos with San Jose. The output is ambiguous. |
| Costa Rica | San Jose (Costa Rica) | addPrevious - resolves the ambiguity. |

The addPrevious method will not add the previous ambiguities if they are resolved by the new network claim, as shown in the following example. Referring to FIG. 11 again, assume the following policies:

```
Cities agent policies:
    explicitRestart: 'new query' | 'restart context'
        {action: restart ( ), setInfo('context restart')};
    theCities:
        costarica, usa
        {action:
            replaceprevious (costarica, costarica),
            replacePrevious (usa, usa)};
costarica agent policies: same as previous example.
usa agent policies: same as previous example.
```

Then the following dialog can result:

| Input | Output | Note |
|---|---|---|
| New York Quepos | New York (USA)<br>Quepos (Costa Rica) New York (USA) | the previous output of costarica is replaced. the previous output of usa is kept (no substitutes). |
| Washington | Quepos (Costa Rica)<br>Washington (USA) | the previous output of usa is replaced. the previous output of costarica is kept (no substitutes). |
| San Jose | San Jose (Costa Rica) San Jose (USA) | the previous outputs of usa and costarica are both replaced. |
| Costa Rica | San Jose (USA) | addPrevious - resolves the ambiguity. | clearContext( )

Clears the context. Sets the previous actuation in the context to null but does not clear the previous input. As an example, refer again to the network of FIG. 11 and assume it contains the following policies:

```
Cities agent policies:
    theCities:
        costarica, usa
        {action: replacePrevious (costarica, costarica),
            replacePrevious (usa, usa)};
    orCities:
        'or' theCities
        {action:
            addPrevious (cities), clearContext( ), ' or\n',
            theCities},
costarica agent policies: same as previous example.
usa agent policies: same as previous example.
```

Then the following dialog can occur:

| Input | Output |
|---|---|
| Quepos | New York (USA) |
| or New York | Quepos (Costa Rica) or New York (USA) |
| or Washington | Quepos (Costa Rica) or New York (USA) or Washington (USA) |

Delegation Phase Enhancements—Setter Service Methods

Setter methods have any of the following signatures:

void methodName(string str)

void methodName(Integer int)

void methodName(Boolean bool)

Setter service methods set tags, flags or other data on the actuation object being built, separately from the actuation string itself. An example actuation class that includes several setter service methods is the XMLFollowupActuation class in the CD-ROM appendix. These methods are intended to produce human readable results if the actuation object is passed through a toString( ) method, which converts the field names and values in an object to an XML document such that the value of each field is enclosed between XML tags equal to the field name. An example setter service method is setTag(string), which is defined in the class as follows:

```
/**
 * Set an XML tag. Tag will be used in the toString( ) method to
    surround the output string
 * with XML tag.
 * @param tag The XML tag to be used in the toString.
 */
public void setTag(String tag)
{
    this.tag = tag;
    if ((tag == null) || (tag.length( ) == 0))
    {
        startTag = null;
        endTag = null;
    }
    else
    {
        startTag = "<" + tag + ">\n";
        endTag = "</" + tag + ">\n";
        noChildTag = "<" + tag + "/>\n";
    }
}
```

A usage example of setTag(string) is as follows:

```
p1: 'tv' ['on']
{action:
    setTag('TV'), 'on'};
Input: tv on
Output (after toString( )): <TV>on</TV>
```

Other setter methods offered in the XMLFollowupActuation class are as follows.

setAmbiguityTag(String)

Used to set the ambiguity XML tag for the policy output. A usage example is as follows:

```
tv: ['tv'] 'on'
{action:
    setTag('TV'), 'on'};
vcr: ['vcr'] 'on'
{action:
    setTag('VCR'), 'on'};
homeEntertainment: tv,vcr
{action:
    setTag('HomeEntertainment'), tv, vcr}
{ambiguity action:
    setTag('HomeEntertainment'), setAmbiguityTag('Ambiguity'),
    tv, vcr};
Input: on
Output (after toString( )):
<HomeEntertainment>
    <Ambiguity><TV>on</TV><VCR>on</VCR></Ambiguity>
</HomeEntertainment>
``` addCData(x)

Used to set add a CDATA XML element anywhere in the output. The addCData parameter can be any action element (e.g. literal, *, *.matched, ?, service method, etc.). A usage example is as follows:

```
p1: 'tv' ['on']
{action:
    setTag('TV'), addCData('on')};
Input: tv on
Output (after toString( )): <TV><![CDATA[on]]></TV>
``` setShowInput(Boolean)

If showInput is set to true then the input will be added to the policy output. Default is false. The setInputTag service method is typically used to change the default input tag. The value of the showInput property can be used by the Actuation agent or the Interaction agent in deciding whether to show the user's input back to the user. A usage example:

```
p1: 'tv' ['on']
{action:
    setShowInput(true), setTag('TV'), 'on'};
Input: tv on
Output (after toString( )): <TV><input><![CDATA[tv
    on]]></input>on</TV>
``` setShowUnderstood(Boolean)

If showUnderstood is set to true then the part of the input understood by the agent network will be added to the policy output. Default is false. The setUnderstoodTag service method is used to change the default-understood tag. As with showInput, the value of showUnderstood can be used by an Actuation agent or an Interaction agent to determine whether to indicate to the user whether the input was understood by the interpretation network. A usage example:

```
p1: 'tv' ['on']
{action:
    setShowInput(true), setShowUnderstood(true), setTag ('TV'),
    'on'};
Input: tv on
Output (after toString( )):
```

```
<TV>
<input><![CDATA[tv on]]></input>
<understood><![CDATA[tv on]]></understood>
on
</TV>
``` setInfo(String)

Adds a specific information to the policy output. The setInfoTag service method should be used to change the default info tag. Usage example:

```
p1: ['blah']
{action:
    setShowInput(true), setInfo('Meaningless!') };
Input: sfgsdlfs
Output (after toString( )):
<input><![CDATA[sfgsdlfs]]></input>
<info><![CDATA[Meaningless!]]></info>
```

Revisiting the AddressBook Network

Returning to the interpretation network of FIG. 2, then, the operation of the network can now be understood by reference to the policies as set forth in the addressBookPolicies.txt file in the CD-ROM appendix. Roughly described, it can be seen that the System agent handles the input in one of the following ways:

Report/Edit/Add: If any of the underlying agents claim. If report is actuated as a follow-up to an edit command then the edit target will be removed from the context before actuation (however edit source will still be used).

Restart: If the input is "new", "reset" or "start over"

Keep context: Produces the same actuation as the previous one if none of the above holds.

The Edit agent 224 claims the input as an edit command if the input starts with keywords such as "edit" or "change". There are two parts to an edit command: a source, which refers to a record that should be edited, and a target, which refers to the new value of that record. For example, in case of the input "change the mailing address of contacts in San Jose to Sunnyvale", the source is "mailing address of contacts in San Jose" and the target is "Sunnyvale". An embodiment could check to make sure that the source and target are of the same type (e.g. if source is referring to a mailing address then the target should be a mailing address as well), but the present example does not make this check. Such a check could be added either to the Actuation Agent or to the policies of the Edit agent.

The Add agent 228 claims the input as an add command if the input starts with a keyword such as "add".

The Report agent handles the input in one of the following ways:

Continuation: If the input is considered a follow-up by default (if the previous input has been ambiguous or the context.isFollowupByDefault property is set).

OR: If the input starts with "or". In this case the previous actuation will be ORed with the new one.

Narrow down: If the input starts with keywords such as "and", "with", "and with", "in", "at", "which" or "whose".

Example:

"contacts with mailing address in san jose"
"and billing address in sunnyvale"
"whose account name is IBM"
"which have the first name: John"

The new input will narrow down the last ORed statement if narrow down is performed after OR.

"contacts with mailing address in san jose"
"or billing address in Sunnyvale"
"whose account name is IBM"

The system will search for (contacts with mailing address in san jose) OR (contacts with billing address Sunnyvale and account name IBM).

Correction: If the input starts with keywords such as "I meant", "I mean", "meant", "not mean", "not meant", or "not".

Example

"Contacts with mailing address in San Jose"
"I meant accounts"

The input is considered to be a correction only when the previous actuation is not compound (not ORed). Otherwise it is considered to be a new query.

Example

"Contacts with mailing address San Jose"
"Or billing address Sunnyvale"
"I meant accounts"

New query: If none of the above holds.

In the non-terminal agents (Address_book, Contact, Account, Mailing_address, Billing_address, Company_name, Contact_name), each has the following capabilities:

OR: The input is considered an OR if two objects are joined in the input by 'or' keyword (e.g. 'mailing address Sunnyvale or mailing address San Jose').

NOT correction: The input is considered a NOT correction if it starts with a keyword such as 'not', 'not meant', 'did not mean'.

SWITCH Correction (except for COMPANY_NAME and CONTACT_NAME). The input is considered a switch correction if it starts with any of the keywords 'meant', 'I meant' or 'I mean'.

In the terminal agents (Revenue, City, Country, First_name, Last_name), each has only the OR capability. The input is considered an OR if two objects are joined in the input by 'and' or 'or' keywords (e.g. 'Sunnyvale and San Jose').

Thus it can be seen that the availability of service methods in the actuation part of policies permits the designer to cause an agent to behave differently, and hopefully more in accord with user expectations, depending on the current state of the dialog. While the present embodiment supports only two states as mentioned above, several other states are believed to have utility in better refining agent behavior. A non-exclusive list of such states is:

None: The first input or an input sent after dialog time out.

New interaction: User refers to a new action and provides all the mandatory parameters.

Accumulate: User provides more parameters to a previous interaction.

Replace: User changes the values of the parameters in the previous interaction.

Trigger: User starts a new interaction but not all of the required parameters are provided. Optional parameters may appear.

Clarification: User clarifies what he or she meant (a followup to an ambiguous interaction).

Dissatisfaction: User is not satisfied with the interpretation made on the previous interaction.

Out of functionality: User is asking for an action outside the functionality of the system.

In a system that distinguishes among the above dialoging states, the agent network designer can design the interpretation policies according to the following guidelines:

If the system is in "none" state then the input is interpreted normally.

If the system is in "clarification" state then the network will first try to interpret the input as a clarification. If the interpretation is not successful then the state will change to new interaction and the input is re-interpreted.

If the system is in any other state then the input is assumed to be a follow up and a higher priority is given to the current topic.

The Actuation agent(s) then use the dialoguing rules to generate an output. The dialoguing rules are applied to do the following:

Map the interpretation made to an API and identify the missing parameters. The Actuation agent(s) then uses a rule table to:

Deduce the unknown parameters based on context (application characteristics and user and device profile).

Generate the appropriate prompt to ask for any parameters which could not be deduced.

Attached hereto as Appendix A is the Dejima Policy Reference, which describes the Opal policy language in more detail. Included on the accompanying CD-ROM appendix are addressBook.opal.txt, which contains the Opal file for the address book example discussed above, and addressBookPolicies.txt, which contains only the interpretation policies excerpted from the full Opal file. Also included is the Context.java class. Also included is the class hierarchy XMLFollowupActuation.java which extends FollowupActuation.java which extends BaseActuation.java which implements Actuation.java. Also included is the class hierarchy FollowupPriority.java which extends BasePriority.java which implements Priority.java, and CheckPropertyCondition.java which extends TerminalCondition.java which extends NLTPCondition.java. Also included is the class hierarchy AddressbookActuationAgent.java which extends ActuationAgent.java which extends AASAPAgent.java which extends StandardAgent.java which extends Agent.java.

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

APPENDIX A

Dejima Policy Reference

Introduction

Our technology is unique in the fact that we use a distributed architecture in which the distributed elements, (i.e., the agents) claim parts of the input in order to suggest actuations. This requires a declarative programming language (like PROLOG vs. procedural such as Java or BASIC) to define agent behavior through rules we call policies. Other declarative languages are not appropriate or simple or popular enough for us to make that extra effort to support them. As a lower level alternative, the API for subclassing agents using Java is available and should be open to expert developers who would rather directly code their agents than use our high-level language to describe them. We have named our high level declarative language Opal. The agents that can be programmed in Opal language are called AASAP agents (Adaptive Agent Software Architecture Platform).

The designer of a natural language interface using Dejima technology will:

1. Divide the software into its manageable sub-domain elements (i.e., agents),

2. Define which agents will be in direct communication with each other.

3. Devise interpretation policies for each agent by considering the input to the application from each agent's point of view to decide if this agent is responsible for processing all or parts of this input.

4. Process the interpretation output and format it to an output easily understood by the end user.

Figure 3:
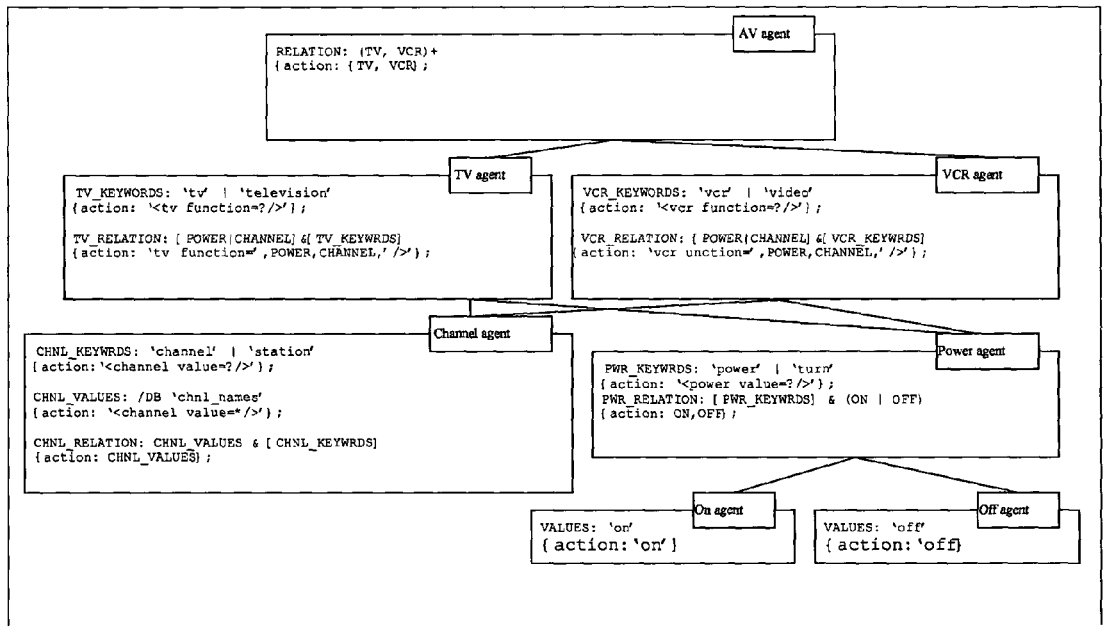

This reference describes the Opal language (step 3). You should refer to other documents to understand the other steps required in making a natural language interface using Dejima technology. See FIG. 3 for an example of a simplified agent network of a home entertainment network.

1 Policy and Claims

Claims are reasons for which an agent claims a role in dealing with a particular input. Agents claim responsibility for processing parts of the input. A policy is a rule that if triggered, will make a claim and propose actions that may be used if the claim is granted. A claim is made when the input is matched by a policy. A policy is made of patterns that can be matched to the input and/or operators that can be used to merge claims made on the input.

1.1 Subclaims

Figure 4:
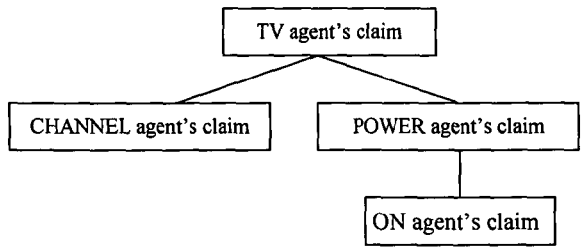

A claim may be built by putting together claims made by other policies or other agents. For example the TV_RELATION policy in the TV agent of the network depicted in FIG. 3 will make a claim on the input 'turn tv on' which is based on claims made by the POWER agent and the TV_KEYWRDS policy. The POWER agent's claim in turn is based on the ON agent's claim. We will refer to the TV_KEYWRDS, POWER and ON claims as sub-claims in the context of the TV agent's claim (FIG. 4).

1.2 Propagation of Claims

An AASAP agent uses its policies to process the input when it receives an initiate interpretation, interpretation or reinterpretation message. Agents process the input in order from first policy declared in the agent to the last policy. Each policy makes all the claims it can on the input. Following policies can access these claims. After all policies have made their claims the agent selects the best claim. If the best claim is made from a non-grammatical condition (e.g. ambiguity), then the sub-claims are also selected. The selected claims are handed up to upchain agents (i.e. using claim message).

1.3 Actuation of Claims

An Actuation is a standardized output. The actuation phase begins when the top AASAP agent selects its best claim. The top agent actuates the best claim using the action part of the policy that made that claim. The policy's action dictates whether the actuation of the claim should be delegated to other policies or agents. If the actuation is delegated to another agent a delegation message is sent to that agent. When an AASAP agent receives a delegation message for actuating a claim, it uses the policy responsible for making that claim to actuate it. Each policy either actuates the claim entirely or delegates parts of the actuation to other policies or agents responsible for making its sub-claims.

1.4 Overview of Policy Components

A policy has five components:

Name: Makes it possible to refer to the policy in Opal language.

Title: Makes it possible to refer to the policy in the interactions and menus.

Priority: Prioritizes the claim made by this policy.

Condition: Makes claims by processing the input. A condition can be:

Terminal: Atomic operands of Opal language.
References: Operands referring to claims made by other conditions.
Unary: A condition with only one operand.
Binary: A condition with two or more operand.

Action: Creates an action from a claim.

2 Claim

A claim quantifies how well an input matches a policy condition. The information associated with a claim includes:

2.1 Owner

Owner is the name of the policy, which has made the claim.

2.2 Focus

The parts of the input matched by the policy condition. Focus is represented using the character indexes of the input. (Characters in the input are indexed from 0). For example, focus [5 . . . 8] represents the word 'book' in the input 'Sell book'. The characters of the input that correspond to the token delimiters (for example, white space) are never considered part of the focus. Therefore, a policy condition that matched 'Sell' and 'book' would have focus [0 . . . 3, 5 . . . 8]. However, when there is no chance of confusion, this focus would be written as [0 . . . 8].

2.3 Priority

An integer between −1000 to +1000 showing the precedence of the claim. (For details on assigning priorities to policies, see the Policy Priority) Priorities are local to an agent. When an agent sends a claim to an upchain agent, the priority is reset to 0. (The exception is priorities assigned for adding dialoging focus. These priorities are passed upchain with the claim.) When two claims merge the priority of the claim with the higher priority is assigned to the merged claim. Consider the following policies:

P1: 'aaa' {priority: +1}
P2: 'bb' {priority: 0}
P3: P1 & P2

The priority assigned to claims made by P3 will be +1. Each claim also has a priority score. The priority score is 100% by default. But when two claims with different priority settings merge, the priority score becomes the percentage of the merged claim's focus that was made by the claim with higher priority. For example the priority score of the claim made by policy P3 in the example above would be 60%.

2.4 Ambiguity

A claim is said to be ambiguous if it contains two or more sub-claims with overlapping focuses. The ambiguity of the claim equals the number of ambiguous sub-claims found in the claim, including the claim itself.

2.5 Connection Weight

The sum of connection weights assigned to operators making the claim. Each operator has a predefined grammatical weight. The operators in ascending order of grammatical weight are:

1. Inexact matches: −1
2. No operators: 0
3. Plus (+): 100
4. And (&): +10,000
5. Ordered (<): +1,000,000
6. Adjacent (~): +100,000,000

EXAMPLE 1

Connection Weight for a Claim Made from Adjacent, Plus and Inexact Operators claim weight=100,000,000+100+(−1)=100000099

2.6 Tokens Distance

Indicates the relative closeness of the claimed parts of the input. Tokens distance is calculated by adding up the number of un-claimed tokens between claimed tokens. If a claim has marked 'Siamak' and 'Hodjat' on the input "Siamak is a Hodjat", its tokens distance is 2. A claim marking 'Sia' and 'Hodjat' on input "Siamak is a Hodjat", will also have a tokens distance of 2, because 'Sia' is part of the 'Siamak' token, but the same claim will have an tokens distance of 5 on the input "Siamak's family name is Hodjat" (Assuming the default USTokenizer is used). The following table shows how the tokens distance is calculated for different inputs claimed by the policy: 'aaaaa' & 'bbbbb'.

EXAMPLE 2

Computing Tokens Distance of Claims Made by 'aaaaa' & 'bbbbb' Condition on Different Inputs

| Input | Tokens distance |
| --- | --- |
| aaaaa bbbbb | 0 |
| aaaaa bbbbb | 0 |
| aaaaas bbbbb | 0 |
| Aaaaa cc bbbbb | 1 |
| Aaaaa cc dd bbbbb | 2 |
| Aaaaa's bbbbb | 2 |

Token distance is handled differently in the case of the ambiguity operator. See Ambiguity operator for details.

2.7 Variable

Variables mark parts of the input that are not claimed by other conditions in a policy. Variables are adjustable and the part they mark may vary as the claim is manipulated (see Variables).

3 Claim Ordering Criteria

Agents use a claim ordering criteria to choose the best claims to propagate up chain. The default criteria used to order the claims is given in this section, listed in the order in which they are considered when comparing two claims. Each criterion is checked only if none of the criteria above it would apply.

3.1 Coverage

A claim whose focus includes another claim's focus wins. If the focuses are equivalent, neither is considered to cover the other.

EXAMPLE 3

Comparing Claims on Input 'being John Malkovich'

| Claim 1 (C1) | | Claim 2 (C2) | | Coverage |
|---|---|---|---|---|
| String | Focus | String | Focus | comparison |
| 'Being John Malkovich' | [0 . . . 4] [6 . . . 9] [11 . . . 19] | 'Being' | [0 . . . 4] | C1 covers C2 |
| 'Being John' | [0 . . . 4] [6 . . . 9] | 'John Malkovich' | [6 . . . 9] [11 . . . 19] | C1 and C2 overlap |
| 'John' | [6 . . . 9] | 'Malkovich' | [11 . . . 19] | C1 and C2 are separate |

For example, consider the input 'Being John Malkovich' and two claims, one made on the whole input ('Being John Malkovich' with focus [0 . . . 4][6 . . . 9][11 . . . 19]) and the other made on 'John Malkovich' (with focus [6 . . . 9][11 . . . 19]). In this case the focus of the claim on the whole input includes the second claim and therefore wins. However, if two claims both had focus [0 . . . 4], the claims would be equivalent in terms of the coverage criterion.

3.2 Priority

A claim with a higher priority wins. When priorities are the same, the claim with the higher priority score wins. (See the Policy Components section on Priority for details on how priority and priority score are assigned.)

3.3 Connection Weight

A claim made by more grammatical operators and exactly matched operands wins (that is with smaller connection weight).

3.4 Tokens Distance

A claim with smaller tokens distance wins.

3.5 Focus Size

A claim with a larger focus wins. For example, a claim made on 'Sell Book and Buy Toy' with focus [0 . . . 3] [5 . . . 8], will win over a claim with focus [9 . . . 11][13 . . . 15]).

3.6 Match Restrictiveness

A claim using a more restrictive token matcher wins. The most restrictive token matcher is the exact token matcher, which has a restrictiveness of 100. The substring token matcher has a restrictiveness of 60.

3.7 Variable

When comparing two claims the claims with no variables is better than a claim with variables. If both claims have variables then the one with more, but smaller, variables is preferred to the one with fewer, but wider, variables (see variable condition).

3.8 Input Position

A claim, with a focus closer to the beginning of the input wins.

3.9 Claim Creation Sequence

A claim created later wins.

4 Synonym Table

Synonym table is a property of AASAP agents. Any class implementing the SynonymTableInterface may be assigned to an AASAPAgent (refer to SynonymTable interface). The FileBasedSynonymTable is a synonym table class provided with SDK2.5.

4.1 File Synonym Table

When the synonym file is set then a synonym table is loaded. More than one set of synonyms may be defined in a single synonym file. A new line character indicates the end of one synonym set and the beginning of the next. The first word in a synonym set is called the 'target' and must be followed by a colon (:). Synonyms for the target follow the colon in a comma-delimited list. The \ character is used as an escape character. A pound sign (#) is used to signify a comment.

EXAMPLE 4

Example Synonym File. This Example Contains Malformed Entries which would be Ignored when the Synonym File is Read

```
this is a comment. it will be ignored
#The empty lines will be ignored
#correct format but will be ignored because the same target
#appears again later
Comedy: comic, very funny
#comedy target appears again (this one would be used)
Comedy: funny, hilarious, very funny, extremely funny
#cyclic:
funny: comedy
hilarious: hilarious #weird but harmless (accepted)
Tragedy: #malformed! no synonyms
comic funny hilarious #malformed
comic: , funny #malformed (empty synonym)
    : funny #malformed (empty target)
very funny: funny #malformed (mutiple token targets)
  Horror : thriller #ok: this should be, ok.
#using escape characters
\: : \,,\##confusion synonyms part 1
\, : \:,\\\\,,\##confusing synonyms part 2
b4: before
1: 01, 001
```

EXAMPLE 5

Matching a Pattern and its Synonyms to Input

| Synonym table | Policy |
|---|---|
| t: a, a b | P1: 't' |

Input: t a b
Claims:
1. [2.4]
2. [2]
3. [0]

4.2 Accents in Synonym Table

Synonyms may have accents. The rule for matching accents in synonyms follows the matcher that is applied to the target in the terminal condition.

EXAMPLE 6

Matching Accented Words in Synonym Table

| Synonym table | Policy |
|---|---|
| t: é | P1: <exact ignoreAccent> 't' |

Input: e
Claims: [0]

But the target in the synonym table is only matched exactly and accents cannot be ignored.

EXAMPLE 7

An Accented Target in the Synonym Table, which does not Match Exactly to any Token Pattern in the Policy

| Synonym table | Policy |
|---|---|
| é: x | P1: <exact ignoreAccent> 'e' |

Input: x
Claims: —

EXAMPLE 8

An Accented Target in the Synonym Table, which Matches Exactly to any Token Pattern in the Policy

| Synonym table | Policy |
|---|---|
| é: x | P1: <exact ignoreAccent> 'e' |

Input: x
Claims: [0]

4.3 Noise Words in Synonyms

If a word is matched as a synonym it will not be considered a noise word (even if it appears in the noise or common files.

EXAMPLE 9

A Noise Word is Listed as a Synonym

Synonym table t: n
Policy

P1: /F 'X':0:('n')
File X t

Input: n
Claims: [0]

It is not recommended to have noise tokens in the synonym file because it is potentially confusing.

4.4 Multi Token Target (Illegal)

Multi token targets are not supported because of the potential confusion in using such tokens. If we would have a multi token target such as "very funny":

very funny: hilarious, comedy

Then the following policy:

P1: 'very funny'

Should match the input "comedy". But should comedy be considered as a synonym of "very funny" given the following policies?

P2: 'very'~'funny'

P3: 'very'<'funny'

P4: 'very' & 'funny'

P5: 'very'

P6: 'funny'

P7: P5~P6

P8: 'a very funny movie'

As it can be seen how and when synonyms should be considered for multi token targets is open to different interpretations and therefore this feature is not supported to avoid the possible confusion of its usage.

4.5 SynonymTable Interface

| | Method Summary |
|---|---|
| boolean | addSynonym(String target, String synonym) Adds a synonym to the list of synonyms of a target. Should return false if the synonym table does not support this method. |
| void | close( ) Releases the SynonymTable. |
| java.lang.String | getSourceName( ) Returns the source name of this SynonymTable. |
| java.util.List | getSynonyms(String target) Returns a List of Synonyms for a target. |
| java.lang.String | loadToString( ) The string representing the data source of this SynonymTable. Should return false if the synonym table does not support this method. |
| void | open(String sourceName) Opens the synonym table data source. |
| boolean | removeSynonym(String target, String synonym) Removes the synonym associated to a target. Should return false if the synonym table does not support this method. |
| boolean | removeSynonymList(String target) Removes the target and all synonyms associated with that target. Should return false if the synonym table does not support this method. |
| boolean | saveFromString(String newValues) Rewrites the synonyms in the data source by parsing a string of synonyms. Should return false if the synonym table does not support this method. |

5 Policy Components

5.1 Comments

Comments can go between the policy label and the condition or anywhere in the policy condition, or action fields.

EXAMPLE 10

A Commented Policy

P1:/*You can use this space for general comments about the policy*/
"
/*here is the condition:*/ 'example' /*comments may go anywhere*/
{action:
  'Comment example' /*a comment in the action field*/};

5.2 Name

Used to refer to the policy in the Opal language. A policy name is an unlimited series of capital letters ('A' to 'Z'), digits ('0' to '9') or under score ('_') that begins with a capital letter. Policy names should be unique within an agent. See FIG. 5 for an example of defining a policy name.

5.3 Attribute

If a policy is designated as private, all claims made by that policy are private and as such only visible to other policies of the owning agent. These claims are not passed up-chain to other agents. Private claims are only propagated outside of the owning agent when they are a part of another claim made by a public policy. In all other regards, the private policy acts in the same way as public policy. Examples of common usage are given below:

EXAMPLE 11

Common Private Policy Usage

PRIVATE:
'private'
{attribute: 'private' }
{action: *};
PUBLIC:
'public using a ' PRIVATE
{action: PRIVATE};
Input: public using a private
Result: private
Winning claim: PUBLIC
Claimed Input: public using a private
Input: private
Result: <no interpretation>
Winning claim: None. Although PRIVATE makes a claim, it is not propagated because it is a private policy.

EXAMPLE 12

Common Private Policy Usage

DESCRIPTION_TOKENS:
'famous' | 'popular' | 'well known'
{attribute: 'private' }
{action: *};
MOVIE:
DESCRIPTION_TOKENS 'movies'
{action: *};
ACTOR:
DESCRIPTION_TOKENS 'actors'
{action: *};
Input: show me famous actors
Result: famous actors
Winning claim: ACTOR
Claimed Input: famous actors
Input: show me popular cinemas
Result: <no interpretation>
Winning claim: None Any claim coming from a public policy results in a public claim, even in the case where the only claim from a public policy comes from a private policy. This includes results coming from comma and plus operators. Examples of these cases are shown below:

EXAMPLE 13

Public Policy Referring to a Private Policy

PRIVATE:
'private'
{attribute: 'private'}
{action: *};
PUBLIC:
PRIVATE
{action: PRIVATE};
Input: private
Result: private
Winning claim: PUBLIC
Claimed Input: private

EXAMPLE 14

Public Policy Referring to a Private Policy

PRIVATE:
'private'
{attribute: 'private'}
{action: *};
PUBLIC:
PRIVATE ['optional' ]
{action: PRIVATE};
Input: private
Result: private
Winning claim: PUBLIC
Claimed Input: private
Input: private optional
Result: private
Winning claim: PUBLIC
Claimed Input: private optional

EXAMPLE 15

Public Policy Referring to a Private Policy with Plus and Comma Operators

PRIVATE:
'private'
{attribute: 'private'}
{action: *};
PUBLIC:
(PRIVATE, DOWN_CHAINAGENT1, DOWNCHAINAGENT2)+
{action: PRIVATE, DOWN_CHAINAGENT1, DOWN-CHAINAGENT2};
Input: private
Result: private
Winning claim: PUBLIC
Claimed Input: private It is possible to use public policies inside private policies if desired (although not necessarily recommended). An example possible usage is:

EXAMPLE 16

A Public Policy in a Private Policy

PUBLIC_HELLO:
'hello'
{action: *};
PRIVATE_HELLO_WORLD:
HELLO 'world'
{attribute: 'private'}
{action: *};
PUBLIC_HELLO_WORLD_FROM_NICK:
HELLO_WORLD 'from nick'
{action: *};
PUBLIC_CATCH ALL:
(HELLO, HELLO_WORLD_FROM_NICK)+
{action: HELLO, HELLO_WORLD_FROM_NICK};
Input: hello
Result: hello
Winning claim: PUBLIC_HELLO
Claimed Input: hello
Input: hello world
Result: hello
Winning claim: PUBLIC_HELLO (since PRIVATE_HELLO_WORLD is private)
Claimed Input: hello
Input: hello world from nick
Result: hello world from nick
Winning claim: PUBLIC_HELLO_WORLD_FROM_NICK
Claimed Input: hello world from nick If a claim made by a private policy is not referenced by another public policy in the same agent, the claim is discarded. This will not be logged, as it is a valid situation and may occur frequently. A private claim will be designated as such when viewed by the debugger to allow users to see what claims are private, and hence not propagated outside the agent.

In summary, a claim made by a private policy will only ever be seen outside of the owning agent when it is part of a claim made by a public policy.

5.4 Priority

The priority assigned to a policy. A policy's priority is assigned to all claims made by that policy.

Of the criteria used to order the claim list, priority is the only one that can be set explicitly in the policy. Priority is the second criterion used when comparing two claims; coverage is compared first. If two claims are equal in terms of coverage, then the one with a higher priority will win. Therefore, priority provides the policy writer with a good amount of control over which policy should produce the winning claims.

A list is kept of all different priorities that were associated to sub-claims building up a claim. The focus of the sub-claims with the same priority will be added up and would be kept in the list.

EXAMPLE 17

The Priority List of Claims

P1: 'aaa' {priority: 1};
P2: 'bb' {priority: 2};
P3: 'cccc' {priority: 2};
P4: (A B) & C;
Input: "cccc aaa bb".

| Priority | 2 | 1 |
|---|---|---|
| Focus size | 5 ... 7 | [0 ... 3] [9 ... 12] |

The priority criterion of two claims will be compared in the following manner:

1. The claim with highest priority will be chosen as the better claim.
2. If both claims have the same highest priority then the coverage percentage of that priority is compared. The coverage percentage is the focus size of that priority divided by the total focus size of that claim. The claim that has the higher coverage percentage will be chosen as the better claim.
3. If both claims have the same coverage on their highest priority then that vector will be compared again from step 1 disregarding the highest priority.

Priority is used only for ordering the claim list of the agent containing the policy. When an agent passes a claim up chain, the priority of the claim is removed.

There are two different types of priorities that can be assigned to a policy: static and dynamic.

5.4.1 Static Priority Assignment

The default priority is 0. Priority can explicitly be set to any integer between −1,000,000 and +1,000,000 inclusive. A positive integer will give the claims made by the policy higher priority; a negative integer will give them lower priority.

EXAMPLE 18

Assigning Priority to a Policy

PRIORITY_EXAMPLE:
'Hello'
{priority: 2};

5.4.2 Dynamic Priority Assignment

The class used by a policy to assign a priority to a claim can be specified in the '{priority: . . . }' clause right after the 'priority:' tag.

EXAMPLE 19

Specifying the Priority Class in a Policy p1: anAgent
  {action: com.dejima.core.nlp.text.FollowupPriority: recency(anAgent)}

The default Priority class used by a policy (if no priority class is specified in the {priority: . . . } clause) is defined in the agent network OPAL under DejimaAgentNetworkDefaults tag:
  <Priority class="myPackage.MyClass" />

Any public method in the Priority class with the following signature can be used in the priority clause:

public int methodName(Claim claim, Context context, ActionElement a1, ActionElement a2, . . . )

EXAMPLE 20

Recency Service Method

```
/**
* Calculates how recent a policy or an agent has been previously actuated.
* Most recent is equal to the current follow-up count and the least recent is 0.
* @param claim The claim being evaluated.
* @param context The context of the agent network.
* @param action The ActionElement which is to be examined. The action should be either
* or a PolicyActionElement otherwise an IllegalArgumentException is thrown.
*/
      public int recency(Claim claim, Context context, ActionElement action)
      {
            List prevActs = null;
            if (context == null)
                  return 0;
            Actuation prevAct = context.getPreviousActuation( );
            if (prevAct == null)
                  return 0;
            if (action instanceof AgentActionElement)
                  prevActs = prevAct.find(((AgentActionElement)action).getTargetAgent ( ));
            else
            if (action instanceof PolicyActionElement)
                  prevActs = prevAct.find(((PolicyActionElement)action).getTargetPolicy( ));
            else
                  throw new IllegalArgumentException(makeExpectedPolicyActionError(action));
            int max = 0;
            if (prevActs 1 = null)
            {
                  for (int i=0; i<prevActs.size( ); i++)
                  {
                        int followupCount =
                              ((Actuation)prevActs.get(i)).getClaim( ).getInput( ).getFollowupNo( ) + 1;
                              if (followupCount > max)
                                    max = followupCount;
                  }
            }
            return max;
      }
```

5.5 FollowupPriority Class

FollowupPriority class is the default (and the only) priority assignment class provided with the DDPlatform. This class includes three service methods: recency, topicScope and isFollowupByDefault.

5.5.1 Recency(x)

This service method returns the number of inputs leading to the last follow up where a policy (or an agent), x, contributed to the output.

EXAMPLE 21

Recency Usage

```
country: ('USA'|'Japan'|'UK'|'France')
{action: '<country>', * ,'</country>'}
;
city: ('San Jose'|'Tokyo'|'London'|'Paris')
{action: '<city>', * ,'</city>'}
;
mailing_address: ['mailing address'] & [city] & [country]
      {action: '<mailingAddress>', city, country,'</mailingAddress>'}
;
billing_address: ['billing address'] & [city] & [country]
      {action: '<billingAddress>', city, country,'</billingAddress>'}
;
mailing_address_field: mailing_address
            {priority: recency(mailing_address))}
            {action: mailing_address}
;
```

-continued

```
billing_address_field: billing_address
            {priority: recency (billing_address)}
            {action: billing_address}
;
contact: [' contact' ] & (billing_address_field, mailing_address_field)
      {action:
            '<contact>',
            billing_address_field, mailing_address_field,
            ' </contact>' }
      {ambiguity action:
            ' <contact><amb>',
            billing_address_field, mailing_address_field,
            ' </amb></contact>' }
;
```

Rececy calculation examples:
recency(billing_address)=0
recency (mailing_address)=0
Input 1: Contact billing address San Jose.
recency (billing_address)=1
recency (mailing_address)=0
Input 2: Paris
recency (billing_address)=2
recency (mailing_address)=0
Input 3: Mailing address Tokyo
recency (billing_address)=2
recency (mailing_address)=3
Input 4: London!

| Input | Output using recency | output Not using recency service method in billing_address and mailing_address policies |
|---|---|---|
| Contact billing address San Jose Paris | \<contact\> \<billingAddress\> \<city\>san jose\</city\> \</billingAddress\> \</contact\> \<contact\> \<billingAddress\> \<city\>paris\</city\> \</billingAddress\> \</contact\> | \<contact\> \<billingAddress\> \<city\>san jose\</city\> \</billingAddress\> \</contact\> \<contact\> \<amb\> \<billingAddress\> \<city\>paris\</city\> \</billingAddress\> \<mailingAddress\> \<city\>paris\</city\> \</mailingAddress\> \</amb\> \</contact\> |
| Mailing address Tokyo London | \<contact\> \<mailingAddress\> \<city\>tokyo\</city\> \</mailingAddress\>\</contact\> \<contact\> \<mailingAddress\> \<city\>london\</city\> \</mailingAddress\>\</contact\> | \<contact\> \<mailingAddress\> \<city\>tokyo\</city\> \</mailingAddress\>\</contact\> \<contact\> \<amb\> \<billingAddress\> \<city\>london\</city\> \</billingAddress\> \<mailingAddress\> \<city\>london\</city\> \</mailingAddress\> \</amb\> \</contact\> |

5.5.2 topicScope(x)

Calculates how relevant a policy (or an agent), x, is to the topic of conversation. A policy/agent x is relevant if it is part of the context's followup focus. If not relevant then the topicScope returns recency(x).

5.5.3 isFollowupByDefault(x, c)

Returns a priority equal to the constant c if the input should be considered a followup by default.

An input is considered a followup by setting the followupByDefault flag in the Context class to true: Context.setFollowupByDefault(true).

5.6 Condition

Used to make claims from the input. Each condition returns a claim list for all of the claims it produces. There are four types of conditions: terminal, reference, unary and binary.

EXAMPLE 22

Defining Policy Condition

P1: 'vcr' | ('video tape' ['recorder']);

5.6.1 Terminal Condition

There are four types of terminal conditions:

1. Token Terminal: Predefined patterns retrieved from a string, a file or a database.

2. Number Terminal: Refers to claims made by other policies within the same agent.

3. Symbol Terminal: Refers to claims made by other agents.

4. Type Terminal: Refers to a part of the input not claimed.

5.6.1.1 Token

Tokens are identified based on the following parameters:

1. Alphabet: Defines letters as the normal token type. Example: Characters 'a' to 'z' define the English alphabet.
2. Number: Defines digits as the numeric token type.
3. Symbol: Defines special characters (i.e. not alpha or number) as the token type.
4. Delimiter: Defines what may separate tokens (e.g. white space, tabs, new line).
5. Tokenizer class: The class used to identify tokens based on the above parameters.

The above parameters are defined in properties/ParserParameters.xml. Whatever is not included as an alphabet, number or symbol is considered a delimiter by the tokenizer.

EXAMPLE 23

Defining Alphabet in ParserParameters.xml

\<Policy:Alphabet\>
\<Policy:CharacterRange lowerLimit="a" upperLimit="z" /\>
\<Policy:CharacterRange lowerLimit="A" upperLimit="Z" /\>
\<Policy:CharacterRange lowerLimit="　" upperLimit="￮" /\>
\</Policy:Alphabet\>

EXAMPLE 24

Defining Numerals in ParserParameters.xml

\<Policy:Numeric\>
\<Policy:CharacterRange lowerLimit="0" upperLimit="9" /\>
\</Policy: Numeric\>

EXAMPLE 25

Defining Symbols in ParserParameters.xml

\<Policy:Symbols\>
\<Policy:CharacterRange lowerLimit="!" upperLimit="/" /\>
\<Policy:CharacterRange lowerLimit=":" upperLimit="@" /\>
\<Policy:CharacterRange lowerLimit="[" upperLimit="`" /\>
\<Policy:CharacterRange lowerLimit="{" upperLimit="~" /\>
\</Policy: Symbols\>

Based on the above example, the symbol $ will be recognized as a symbol because it is in the range between "!" and "/". But the symbol £ will not be recognized because it is not in any of the defined ranges. For it to be recognized as a symbol a new range would have to be added to the symbol definition ("£" is the Unicode for £).

EXAMPLE 26

Recognizing the £ Sign

\<Policy:Symbols\>
. . .
\<Policy:CharacterRange lowerLimit="£" upperLimit="£" /\>
\</Policy:Symbols\>

Other than the above-mentioned parameters, customized tokenizer classes may introduce application or language dependent types. The custom tokenizer class should replace USTextTokenizer in ParserParameters.xml.

A token is any character or group of characters of the same type (e.g. alphabet, number) separated by delimiters or other tokens. Symbols are tokenized character by character.

EXAMPLE 27

Tokenizing

| Input | Tokens |
|---|---|
| John Smith | john (alphabet) |
|  | smith (alphabet) |
| 1,234.456,1 | 1 (number) |
|  | , (symbol) |
|  | 234.456 (number) |
|  | , (symbol) |
|  | 1 (number) |
| 1,000,000.0001 | 1,000,000.0001 (number) |
| ,1 | , (symbol) |
|  | 1 (number) |
| . . . 1 | . (symbol) |
|  | . (symbol) |
|  | 1 (number) |
| 1,23 | 1 (number) |
|  | , (symbol) |
|  | 23 (number) |
| 3com | 3 (number) |
|  | com (alphabet) |
| mp3 | mp3 (alphabet) |
| we are: "world's greatest" company | we (alphabet), |
|  | are (alphabet), |
|  | : (symbol), |
|  | " (symbol), |
|  | world (alphabet), |
|  | ' (symbol), |
|  | s (alphabet), |
|  | greatest (alphabet), |
|  | " (symbol), |
|  | company (alphabet) |

5.6.1.2 Token Terminals
  There are three types of token terminals:
  Strings
  Files (SF)
  Databases (/DB)

5.6.1.2.1 Strings ('String')
The string condition applies if tokens in the input match the tokens in the string or any of its synonyms (see Synonym Table). The tokens in the string condition are implicitly joined using the adjacent operator and each token is matched to the input using the default <exact, substring> match. See Token Condition on how each token is matched using <exact> and <substring>; see Adjacent Condition on how the adjacent operator works.

EXAMPLE 28

String Condition

P1: 'the book';
Input: 'bring the book home'
The condition applies and marks 'the book' as claimed
Input: 'the red book'
The condition will not apply because 'red' and 'book' are not adjacent in the input.
Input: 'the shoe'
The condition will not apply because the token 'book' does not match any tokens in the input.

The \ could be used as an escape character to refer to characters: \n, \r, \b, \t, \f, \ and '.

EXAMPLE 29

Using Special Characters in String Condition

P1: '\*'book'';
Input: a 'book'
The condition applies and will claim 'book'

EXAMPLE 30

Matching a String Based on Synonym Table

Synonym table assigned to the agent:
comic: comedy
--------------------------------------------------------------
P1: 'comic';
Input: 'comedy'
The condition applies.

EXAMPLE 31

Matching a String Based on Single Token Synonym

| Synonym table |
|---|
| t: a |
| Policies |
| P1: 't'; |
| P2: 'a'; |
| P3: 'ta'; |
| P4: 't'~'a'; |
| File X |
| t |
| a |
| ta |
| tt |

| Input | Claims |
|---|---|
| t | P1 |
| a | P1, P2 |
| tt | P1 |
| aa | P1, P2, P3, P4 |

EXAMPLE 32

Matching a String Based on Multi Token Synonym

| Synonym table |
|---|
| t: ab |
| Policies |
| P1: 't'; |
| P2: 'a'; |
| P3: 'ab'; |
| P4: 't'~'t'; |
| File X |
| t |
| a |

-continued

| | |
|---|---|
| ta | |
| tt | |

| Input | Claims |
|---|---|
| t | P1 |
| a | P2 |
| ta | P1, P2 |
| ab | P1, P2, P3 |
| tab | P1 (claims: [0], [2.4]), P2, P3, P4 |

EXAMPLE 33

Matching a String Based on Multi Token Synonym which Includes Target Token

| Synonym table |
|---|
| t: ta |

| Policies |
|---|
| P1: 't'; |
| P2: 'a'; |
| P3: 'ta'; |
| P4: 't'~'t; |

| File X |
|---|
| t |
| a |
| ta |
| tt |

| Input | Claims |
|---|---|
| t | P1 |
| a | P2 |
| ta | P1 (claims: [0], [0.2]), P2, P3 |
| tata | P1 (claims: [0], [0.2], [4], [4.6], P2, P3, P4 |

5.6.1.2.2 Files (/F)

The /F condition applies if part of the input matches one of the lines in a text file. By default, each line in the text file can make a claim if at least one of its non noise tokens with length greater than a minimum size (specified in the /F syntax) match the input. By using /F:LINE you can change the default behavior so each line in the text file would match only if the input matches the whole line.

Valid Syntax:

/F:LINE 'FileName.txt': minimum_token_size: 'Noise-Word.txt'

/F 'FileName.txt': minimum token size: 'NoiseWord.txt'

/F:LINE 'FileName.txt'

/F 'FileName.txt'

/F:LINE ('FileName.txt')

/F ('FileName.txt')

If no noise filename or minimum token size is specified, for backward compatibility the ParserParameters setting for common file named and token size should be used:

<Policy:CommonWords filename="common.txt" default-MaxLength="3" />

In order to support file conditions with no noise word and minimum token size associated with them the following syntax has also been added:

/F ('FileName.txt')

Optionally there would be syntax for providing the list of noise words as a list inside the policy condition rather than referring to an external file:

/F  'FileName.txt':minimum_token_size:('noiseword1', 'noiseword2', ... )

/DB 'FileName.spec':minimum_token_size: ("noiseword1", 'noiseword2', ... )

ParserParameter.xml could be used to change the default minimum length of noise tokens:

<Policy:Common Words filename="common.txt" minimumNonNoiseTokenSize="3" />

EXAMPLE 34

The /F Condition

| |
|---|
| MN.txt: |
| sixth sense |
| being john malkovich |
| the wall |
| P1:  /F 'MN.txt'; |
| Input: malkovich and sixth sense |
| The condition applies and two claims are made. |
| Those claims (in order), would mark the following: |
| 'sixth sense' |
| 'malkovich' |
| A claim will be made on only those input tokens that are in order. |

EXAMPLE 35

The /F Condition

| |
|---|
| MN.txt: |
| being john malkovich |
| P1:  /F 'MN.txt'; |
| Input: john malkovich |
| The condition applies and makes the claim: 'john malkovich' |

EXAMPLE 36

The /F Condition

| |
|---|
| MN.txt: |
| being john malkovich |
| P1:  /F 'MN.txt'; |
| Input: malkovich john |
| The condition applies and makes the claim: 'malkovich' (The claim on 'john' lost to the claim on 'malkovich'). |

The default behavior changes if /F:LINE would be used. If /F:LINE is used then all of the tokens in the file entry must appear with the same order and adjacency as in the input.

EXAMPLE 37

An Example if /F:LINE Condition not Making any Claims Because of Partial Match

MN.txt:
sixth sense

P1:   /F:LINE 'MN.txt';
Input: sense
The condition will not apply because 'sixth' does not appear in the input.

EXAMPLE 38

An Example if /F:LINE Condition not Making any Claims Because Tokens Matched are not in the Same Order MN.txt:
sixth sense P1:   /F:LINE 'MN.txt';
Input: sense sixth
The condition will not apply because 'sixth sense' does not appear in the input in the same order as in the file.

EXAMPLE 39

Example of /F:LINE Condition Making Claims

MN.txt:

MN.txt:
sixth sense

P1:   /F:LINE 'MN.txt';
Input: sixth a sense

The condition will not apply because 'sixth sense' is not adjacent in the input.

A noise file may be provided to modify the behavior of file conditions (/F). To prevent unwanted claims made by file conditions create a noise file. The noise file should contain a list of noise words (e.g. the, as, is).

EXAMPLE 40

Why we Need Noise File

Noise file not provided:

MN.txt:
sixth sense
being john malkovich
the wall

P1:   /F 'MN.txt';
Input: the movies in sunnyvale
The condition applies and one claim will be made on token 'the'.

EXAMPLE 41

How Noise Files Help

Noise file provided:

mn_noise.txt:
the
being

P1:   /F 'MN.txt':0:mn_noise.txt;
Input: the movies in sunnyvale
The condition will not apply.

The file condition ignores the common words only if they are not adjacent to a non-noise word.

EXAMPLE 42

Matching a File which has a Noise Word Assigned to it

Common file provided:
Condition: /F 'MN.txt':0:('the')
Input: the wall
The condition applies.

EXAMPLE 43

Matching a String in a File Based on Single Token Synonym

Synonym table t: a
Policies

P1: /F:X
P2: /F:LINE X
File X t
a
ta
tt

| Input | Claims |
|---|---|
| t | P1 (1st, 3rd and 4th rows), P2 (1st row) |
| a | P1 (all rows), P2: (1st and 2nd rows) |
| tt | P1 (1st, 3rd and 4th rows), P2 (1st and 4th rows) |
| aa | P1 (all rows), P2: (all rows) |

EXAMPLE 44

Matching a String Based on Multi Token Synonym

Synonym table t: ab
Policies

P5: /F:X
P6: /F:X:LINE
File X t
a

| | |
|---|---|
| ab | |
| tt | |

| Input | Claims |
|---|---|
| t | P1 (1st and 3rd rows), P2 (1st and 3rd rows) |
| a | P1 (2nd and 3rd rows), P2 (2nd row) |
| ta | P1 (all rows), P2 (1st and 2nd rows) |
| ab | P1 (all rows), P2 (1st, 2nd and 3rd rows) |
| tab | P1 (all rows), P2 (all rows) |

EXAMPLE 45

Matching a String Based on Multi Token Synonym which Includes Target Token

Synonym table t: ta
Policies

P1: /F'X':0:('n')
P2: /F:LINE'X',0,('n')
File X t
a
ta
tt

| Input | Claims |
|---|---|
| t | P1 (1st, 3rd and 4th rows), P2 (1st row) |
| a | P1 (2nd and 3rd rows) |
| ta | P1 (all rows), P2 (1st, 2nd and 3rd rows) |
| tata | P1 (all rows), P2 (all rows) |

EXAMPLE 46

Matching a String Based on Synonym with Noise Tokens

Synonym table t: n
Policies

P1: /F:X:0:('n')
P: /F:Y:0:('n')
File X tt
File Y tta

| Input | Claims |
|---|---|
| n | — |
| nt | P1 (claims 'nt'), P2 (claims 'nt') |
| nn | P1 (claims 'nn'), P2 (claims first 'nn') |
| tn | P1 (claims 'tn') |
| na | P2 (claims 'na') |

EXAMPLE 47

Multi Token Synonyms which Include Target and Noise Tokens

Synonym table t: nt
Policies

P1: /F:X:0:('n')
File X at

| Input | Claims |
|---|---|
| n | — |
| nt | P1 (claims 'nt') |
| ant | P1 (claims 'ant') |

EXAMPLE 48

Fuzzy Matching on Synonyms with Noise Tokens

Synonym table t: nnnn
Policies

P1: <fuzzy>/F X:0:('nnnn')
File X t t

| Input | Claims |
|---|---|
| nnn | P1 (claims 'nnn') |
| nnn t | P1 (claims 'nnn t') |
| nnn nnnn | P1 (claims ('nnn nnnn') |

5.6.1.2.3 Databases (/DB)

The /DB condition applies if part of the input matches one of the columns in a database.

Valid Syntax:

/DB 'SpecFileName.txt': minimum_token_size: 'Noise-word.txt'

/DB 'SpecFileName.txt'

/DB ('SpecFileName.txt')

If noise words are specified then those words will be ignored by the /DB condition. If no noise filename or minimum token size is specified the ParserParameters setting for common file named and token size should be used:

<Policy:CommonWords filename="common.txt" defaultMaxLength="3" />

In order to support file conditions with no noise word and minimum token size associated with them the following syntax has also been added:

/DB ('SpecFileName.txt')

Optionally there would be syntax for providing the list of noise words as a list inside the policy condition rather than referring to an external file:

/DB 'SpecFileName.txt':minimum_token_size: ('noiseword1', 'noiseword2', . . . )

ParserParameter.xml could be used to change the default noise file (common words file) and minimum length of noise tokens:

<Policy:CommonWords filename="common.txt" minimumNonNoiseTokenSize="3" />

A database spec file (in text format) should be provided for the /DB condition. This spec file should contain the following information:
1. JDBC driver
2. JDBC server location
3. Database name (or ODBC data source name)
4. Table name
5. Column name
6. Column type (Could be NUMBER or TEXT)
7. Login
8. Password The column type directly affects which SQL statement to be used:

Column type:
  NUMBER

SQL:
  SELECT <COLUMN_NAME> FROM <TABLE_NAME>
    WHERE <COLUMN_NAME> = <INPUT_TOKEN_NUMBER_VALUE>

Column type:
  Anything other than NUMBER

SQL:
  SELECT <COLUMN_NAME> FROM <TABLE_NAME>
    WHERE <COLUMN_NAME> LIKE '%<INPUT_TOKEN>%'.

EXAMPLE 49

Defining Spec File for JDBC Connection to Pointbase Using /DB

```
MS.spec:
com.pointbase.jdbc.jdbcUniversalDriver
jdbc:pointbase://192.168.0.26:1000/
movies
star
star_name
text
public
public
-------------------------------------------------
Condition: /DB 'MS.spec'
```

EXAMPLE 50

Defining Spec File for JDBC Connection to Microsoft Access Using /DB

```
MS.spec:
sun.jdbc.odbc.JdbcOdbcDriver
jdbc:odbc:
movies
star
star_name
text
public
public
-------------------------------------------------
Condition: /DB 'MS.spec'
```

Known Issue:
The token matchers (e.g. <exact>, <substring>, <fuzzy>) are not applicable to the /DB condition.

5.6.1.3 Number Terminal (/NUMBER)

The /NUMBER condition applies if a number token is found in the input (numbers are identified by the tokenizer, refer to token).

Valid Syntax:

/NUMBER

/NUMBER(theNumber)

/NUMBER (min, max, increment)

/NUMBER:CARD

/NUMBER:CARD (theNumber)

/NUMBER:CARD (min, max, increment)

/NUMBER:ORD

/NUMBER:ORD (theNumber)

/NUMBER:ORD (min, max, increment)

/NUMBER is a superset of /NUMBER:ORD and /NUMBER:CARD (so it will match what either of those match).

The /NUMBER:ORD
The theNumber could be any valid decimal number.
You can leave out the increment, the max and increment or the whole range specification. For cardinals (/NUMBER:CARD) the min, max and increment could be any real number (positive or negative) or the predefined +INF or −INF. For ordinals (/NUMBER:ORD) the min, max and increment could be any positive integer or the predefined +INF.

5.6.1.3.1 /NUMBER (theNumber)
Use this syntax to match a single number. Note that when using numbers in the policy condition no commas (for grouping purposes) or scientific notation is allowed.

| | |
|---|---|
| (P1: /NUMBER(1000) ) | valid syntax |
| (P1: /NUMBER(10.02)) | valid syntax |
| (P1: /NUMBER(1e2)) | invalid syntax |
| (P1: /NUMBER(1,000,000)) | invalid syntax |

5.6.1.3.2 /NUMBER(min, max)
min may be any real number or −INF (as negative infinity)
max may be any real number or +INF (as positive infinity)
Use /NUMBER(decimalNumber, +INF) to match anynumber>=decimalNumber
Use /NUMBER(−INF, decimalNumber) to match anynumber<=decimalNumber And
Use /NUMBER(min, max) to match min <=anynumber<=max 5.6.1.3.3 /NUMBER(min, max, Increment)
min may be any real number and −INF (as a negative infinity)
max may be any real number and +INF (as a negative infinity)
increment may be any real number. If it is a positive number min would be used as a starting point for applying increment, if it is a negative number max will be used for applying decrements.

In order words:
If increment >0 it is an increment (inc) and any number in this set will be matched:

{min, min+increment, min+2 increment, min+3 increment, ... <=max}

If increment <0 then any number in the following set will be matched:

{max, max+increment, max+2increment, max−3 increment, ... >=min}

Increment should be greater than zero and to minimize the affect of round off errors with dealing with increments, only a precision of "3" digits after the decimal point is supported for real value of increments.

Also note that if upperBound !=lowerBound+n* increment it won't be claimed when present in the input.

Example

/Number(1, 10, 2) will match 1, 3, 5, 7, 9 but not 10.
/Number(1, 10, −2) will match 10, 8, 6, 4, 2 but not 1.

///

5.6.1.3.4 /NUMBER Examples

| Policy Condition | User Input | Output * | Output *.number |
|---|---|---|---|
| "1234567" | 1234567 | 1234567 | 1234567 |
|  | 123456 | I23456 | 123456 |
| /NUMBER(1234567) | 1234567 | 1234567 | 1234567 |
|  | 123456 | UII | UII |
|  | 1,234,567 | 1,234,567 | 1234567 |
|  | 1.234.567 | UII | UII |
|  | 1234567.0 | 1234567.0 | 1234567 |
|  | 01234567 | 01234567 | 1234567 |
|  | +1234567 | +1234567 | 1234567 |
| /NUMBER(1000000) | 1,000,000 | 1,000,000 | 1000000 |
|  | 1,000,000.0 | 1,000,000.0 | 1000000 |
| /NUMBER(2) | 002 | 2 | 2 |
| /NUMBER(0.2) | .2 | 0.2 | 0.2 |
| /NUMBER(−0.2) | 0.2 | UII | UII |
|  | −0.2 | −0.2 | −0.2 |
|  | −.2 | −.2 | −0.2 |
| /NUMBER(1000) | 1000 1000.0 | 1000 1000.0 | 1000 1000 1000 |
|  | 1,000 | 1,000 |  |
| /NUMBER(10, 20) | 11.00 | 11.00 | 11 |
|  | 9.9 | UII | UII |
| /NUMBER(1, +INF) | 01 | 01 | 1 |
|  | 0 | UII | UII |
|  | 10.00 | 10.00 | 10 |
| /NUMBER(−INF, 1) | 1 | 1 | 1 |
|  | 0 | 0 | 0 |
|  | −100.02 | −100.2 | −100.2 |
| /NUMBER(1, 5, 1)+ | 0 1 2 3 3 2 4 5 9 | 1 2 3 4 5 | 1 2 3 4 5 |
|  | −2 | UII | UII |
| /NUMBER(−2, 2, 1) | −2 −1 0 1 2 | −2 −1 0 1 2 | −2 −1 0 1 2 |
|  | 1.2 | UII | UII |

5.6.1.3.5 /NUMBER:CARD Examples

| NUMBER CONDITION | User Input | Claim.Connection/Claim |
|---|---|---|
| /NUMBER:CARD | 1,200 | CLAIMED |
|  | 1,200$^{th}$ | NULL |
|  | 0023 | CLAIMED |
|  | 1$^{st}$ | NULL |
|  | 1nd | CLAIMED (1nd = 1 + nd) |
|  | 11$^{th}$ | Null |
| /NUMBER:CARD(12) | 0012 | CLAIMED |
|  | 12.100 | NULL |
|  | 12.00 | CLAIMED |
|  | 12$^{th}$ | CLAIMED |
| /NUMBER:CARD(12.1) | 12.100 | CLAIMED |
|  | 12.1st | CLAIMED (12.1 + st) |
|  | 12.1th | CLAIMED (12.1 + th) |
| /NUMBER:CARD(−13, −12) | 0012 | NULL |
|  | −13.1 | NULL |
|  | −13th | NULL |
|  | −13 | CLAIMED |
|  | −12 | CLAIMED |
|  | −12th | NULL |
|  | −12.1 | CLAIMED |
|  | −12.99 | CLAIMED |
| /NUMBER:CARD(1, 9, 2) | 1.2 | NULL |
|  | 3 | CLAIMED |
|  | 5 | CLAIMED |
|  | 7$^{th}$ | NULL |
|  | 8$^{th}$ | NULL |
| /NUMBER:CARD(0, +INF) | 1.2 | CLAIMED |
|  | 0 | CLAIMED |
|  | 0$^{th}$ | NULL |
|  | 9999 | CLAIMED |
|  | 99,999$^{th}$ | NULL |
| /NUMBER:CARD(−INF, 0) | −1.2 | CLAIMED |
|  | 0 | CLAIMED |
|  | 0$^{th}$ | NULL |
|  | −9999 | CLAIMED |
|  | −99,999th | NULL |
| /NUMBER:CARD(0, +INF, 1) | 1 | CLAIMED |
|  | 33$^{rd}$ | Null |
|  | 1.5 | Null |
|  | −1 | Null |
| /NUMBER:CARD(1, 10, −2) | 8 | CLAIMED |
|  | 6$^{th}$ | Null |
|  | 1$^{st}$ | Null |
|  | 3 | Null |

5.6.1.3.6 /NUMBER:ORD examples

| NUMBER CONDITION | User Input | Claim.Connection/Claim |
|---|---|---|
| /NUMBER:ORD | 1,200 | NULL |
|  | 1,200$^{th}$ | CLAIMED |
|  | 0023 | CLAIMED |
|  | 1$^{st}$ | CLAIMED |
|  | 1nd | NULL (1nd = 1 + nd) |
|  | 11$^{th}$ | CLAIMED |
|  | 11st | NULL (11st = 11 + st) |
| /NUMBER:ORD(12) | 0012 | NULL |
|  | 12.100 | NULL |
|  | 12.00 | NULL |
|  | 12$^{th}$ | CLAIMED |
|  | 12nd | NULL (12nd = 12 + nd) |
| /NUMBER:ORD(1, 9, 2) | 1.2 | NULL |
|  | 3 | NULL |
|  | 5 | NULL |
|  | 5$^{th}$ | CLAIMED |
|  | 7$^{th}$ | CLAIMED |
|  | 8$^{th}$ | NULL |
| /NUMBER:ORD(0, +INF) | 1$^{st}$ | CLAIMED |
|  | 0 | NULL |
|  | 0$^{th}$ | CLAIMED |
|  | 9999$^{th}$ | CLAIMED |
|  | 9,999$^{th}$ | CLAIMED |
| /NUMBER:CARD(0, +INF, 1) | 1 | Null |
|  | 33$^{rd}$ | CLAIMED |
|  | 1.5 | Null |
|  | −1 | Null |

5.6.1.4 Symbol Terminal (/SYMBOL)

The /SYMBOL condition claims a single symbol in the input (numbers are identified by the tokenizer, refer to Token).

EXAMPLE 51

Symbol Terminal

Condition: /SYMBOL
Input: '@'
The condition applies and the symbol @ will be claimed.

EXAMPLE 52

Symbol Terminal

Condition: /SYMBOL
Input: '#@%'
The condition applies and the symbol # will be claimed.

5.6.1.5 Token Type Terminal (/TOKEN)

Using this operator requires changing the default tokenizer. Lets say that a new tokenizer is written that recognizes email addresses which is called EmailTextTokenizer. In order to take advantage of this tokenizer you should:

1. Put EmailTextTokenizer.class in the classpath.
2. Replace USTextTokenizer with EmailTextTokenizer in the ParserParameters.xml:

```
<Policy:Tokenizer
className="com.dejima.core.nlp.text.EmailTextTokenizer"
/>

<!-- replaced by EmailTextTokenizer for testing /TOKEN

<Policy:Tokenizer
className="com.dejima.core.nlp.text.USTextTokenizer" />

-->
```

If so the new token type may be claimed using a policy such as the following:
P1: /TOKEN('email'){action: *};

EXAMPLE 53

The Code Used as an Email Tokenizer

```
package com.dejima.core.nlp.text;
import java.util.LinkedList;
public class EmailTextTokenizer
            extends USTextTokenizer
{
/**
 * Tokenizes using the alphabet and numeric provided as parameters.
 *
 * Recorgnizes email tokens in format xxx@yyy.zzz
 *          where xxx can be any combination of words, numbers, and
symbols
 *          yyy and zzz are words only.
 *
 * @param data The character string data.
 * @param alphabet should be an array of couples showing the lower and
upper
 *    ranges of characters in the alphabet. Example: {'a', 'z', 'A', 'Z'}.
 * @param numeric should be an array of couples showing the lower and
upper
 * (ranges of digits that are are numeric. Example: {'0', '9'}.
 * @param symbol should be an array of couples showing the lower and
upper
 * ranges of characters used as symbols. Example: {'—', '—'}.
 * @param hashFunction Function used to make a hash value for tokens.
This might
 * be used by matchers for inexact matching.
 * @param commons The provider of common tokens.
 * @return An array of TextTokens
 */
    public TextToken[ ] tokenize(String data,
                    char[ ] alphabet,
                    char[ ] numeric,
                    char[ ] symbol,
                    HashFunction hashFunction,
                    TokenProvider commons)
    {
```

```
// get all the tokens
TextToken[ ] tokens = super.tokenize(data, alphabet, numeric,
                symbol, hashFunction, commons);
// combine the email-related tokens
int numberOfTokens = tokens.length;
LinkedList tempTokens = new LinkedList( );
for (int i = 0; i < numberOfTokens; i++)
{
    if (tokens[i].getToken( ).equals("@")
        && i > 0
        && i < numberOfTokens − 3
        && tokens[i+2].getToken( ).equals("."))
    {
String newToken = " ";
        TextToken lastToken = null, outToken = null;
boolean checkLastToken = true;
        while (checkLastToken)
        {
            lastToken = (TextToken)tempTokens.getLast( );
            newToken = lastToken.getToken( ) + newToken;
            tempTokens.removeLast( );
            outToken = lastToken;
            // needs to get the remaining last token if
            // there are no spaces between it and the one just
            // removed from tempTokens.
            if (tempTokens.size( ) > 0)
            {
                lastToken = (TextToken)tempTokens.getLast( );
                checkLastToken = isConnected(lastToken,
outToken);
            }
            else
                checkLastToken = false;
        }
        // attach the tokens: @yyy.zzz
    newToken = newToken + "@" + tokens[i+1].getToken( ) + "." +
    tokens[i+3].getToken( );;
        // add the new email token to the list
        tempTokens.addLast (
            new TextToken(newToken,
                    new TokenType("email"),
                    outToken.getFocus( ).getLowestFocus( ),
                    hashFunction));
        i += 3;
    }
    else
    {
        tempTokens.addLast(tokens[i]);
    }
}
// convert vector to array
int newTokensSize = tempTokens.size( );
TextToken[ ] newTokens = new TextToken[newTokensSize];
for (int i = 0; i < newTokensSize; i++)
{
    newTokens[i] = (TextToken)tempTokens.get(i);
}
return newTokens;
}
/**
 * check if the specified two tokens have space in between
 */
private boolean isConnected(TextToken first, TextToken second)
{
    return second.getFocus( ).getLowestFocus( ) −
        first.getFocus( ).getHighestFocus( ) == 1;
}
}
```

5.6.1.6 Check Condition (<check (agent, property, key; value)>)

agent (optional): The agent address that its property is to be checked. This parameter is optional. If omitted then an agent "checks" its own property.

property: The name of the property to be checked.

key (optional): The key to the property. Used to check mapped properties. Key can be a String or any in-scope agent or policy. In-scope agent of the owning agent a is the agent a itself and any agent linked to a. In-scope policy of an owning policy p is the owning policy p itself or any policy declared before p.

value (optional): the property will be compared to this value. Will check the existence of a property if not provided.

5.6.1.6.1 Check Value (<check (agent, property, key; value)>)

When the value parameter is provided the check condition makes a claim only if an agent's property is equal to that specific value. This condition is especially useful for the AASAP agents to know about the state of the application or device. For example the TV agent in a TV/AV interface could use the <check> condition to know if the TV is on. If the TV is on and the user says 'power on' then the TV agent could generate the proper response.

The methods that should be sub-classed for this purpose are summarized in the following table:

|  | methods | Check message |
|---|---|---|
| Data Property | public void set( ChainIdentifier chainID, String propertyName, Object propertyValue) Object get ( ChainIdentifier chainID, String propertyName) | <check (agent, property; value)> |
| Data Store Property | public void set( ChainIdentifier chainID, String propertyName, String propertyKey, Object propertyValue) public Object get( ChainIdentifier chainID, String propertyName, String propertyKey) | <check (agent, property, key; value)> |

All AASAP agents have a STATE property that can be checked (STATE is a basic property).

EXAMPLE 54

Check Condition

P1: 'open'
{action: 'door openned',set(DOOR, 'STATE', ' '; 'OPEN')},
P2: <check(DOOR, 'STATE', ' '; 'OPEN')>'open'
{action: 'door is already open!'}
Input: 'open'
If the state of the door is open then policy P2 applies. When actuated it would reply with: 'door is already open!'

The check condition can be session dependant. So state variables specific to a user could be defined and accessed through the check condition as well. See Set and Get for related information.

5.6.1.6.2 Check Existence (<check (agent, property, key)>)

When the value parameter is not provided the check condition makes a claim only if an agent property exists and has a non-null value assigned to it. This condition is especially useful to check the context for previous actions of policies or agents. All AASAP agents have a previous_action property that can be checked at actuation phase. The previous_action property maps in-scope policies and agents to what they contributed in the actuation phase for the previous input (by the same user in the same session).

The check operator syntax used for checking for existence of an actuation associated with a policy in the interaction context will be:

<check('previous_action', p)>

Where p can be any in-scope policy. If the check operator is used in the condition of policy $p_n$, then the policy $p_n$ and all policies $p_1, p_2, \ldots, p_{n-1}$ declared before $p_n$ are in-scope.

$p_1$: . . .

$p_2$: . . .

. . .

$p_n$: . . . <check('previous_action', p)>

The check operator syntax used for checking for existence of an actuation associated with an agent in the interaction context is:

<check('previous_action', a)>

Where a can be any in-scope agent. If the check operator is used in the agent $a_n$ then $a_n$ and all agents known to $a_n$ (linked to an with a message link) are in-scope. In FIG. 6, the in-scope agents of the mailing_address agent are mailing_address, city, country and location.

EXAMPLE 55

Consider the Following Policies for the Network of the Above Example city agent:
p1: 'san jose' | 'sunnyvale' {action: *}
p2: p1+ {action: p1}
country agent:
p1: 'USA' | 'Japan'| 'France'| 'UK' {action: *}
p2: p1+ {action: p1}
mailing_address:
   p1: city & country & ['mailing']
      {action: '\nmailing: ',city,'',country}
billing_address:
   p1: city & country & ['billing']
      {action: '\nbilling: ',city,'', country}
location:
   p1: billing,mailing
      {action: '\nlocation: ', billing,'', mailing}

Actuation table:

| interaction | input | city p1 | p2 | country p1 | p2 | mailing address p1 | billing address p1 | location p1 |
|---|---|---|---|---|---|---|---|---|
| 1 | billing address san jose USA | san jose | san jose | USA | USA | — | billing: san jose USA | location: billing: san jose USA |
| 2 | billing address san jose sunnyvale USA | san jose sunny- vale | san jose sunnyvale | USA | USA | — | billing: san jose sunnyvale USA | location: billing: san jose sunnyvale USA |
| 3 | San jose | San jose | San jose | — | — | mailing: San jose | billing: San jose | location: billing: San jose mailing: San jose |

The following table shows the return value of check operators if used in the policies.

| interaction | check operator | result |
|---|---|---|
| 1 | <check ('previous_action', p1)> (declared in location agent) | true |
|   | <check ('previous_action', location)> (declared in location agent) | true |
|   | <check ('previous_action', billing_address)> (declared in location agent) | true |
|   | <check ('previous_action', mailing_address)> (declared in location agent) | false |
| 2 | <check ('previous_action', location)> (declared in billing address agent) | true |
|   | <check ('previous_action, city)> (declared in billing address agent) | true |
| 3 | <check (previous_action', country)> (declared in location agent) | false |
|   | <check ('previous_action', billing_address)> (declared in location agent) | true |
|   | <check (previous_action, mailing_address)> (declared in location agent) | true |

Referring to other context information 5.6.2 Reference Conditions 5.6.2.1 Policy Reference (P)

You can use the name of another policy in a condition statement if the policy referenced appears before it in the list. The Policy Reference condition applies if the other policy has claims. See FIG. 7.

A policy action element will cause an actuation of the referenced policy only if the referenced policy has contributed to a claim that is being actuated.

EXAMPLE 56

Referencing a Policy not Contributing to the Claim being Actuated (P1 Policy Will Never be Actuated by P2)

P1:
'a'
{action: *};
P2:
'b'
{action: P1};

5.6.2.2 Agent Reference (A)

The Agent Reference condition applies if the referenced agent has claims. The referenced agent must be a listener to the agent that owns the policy. See FIG. 8.

An agent is referred to using its address. An agent address has the following format:

agent-instance-name . agent-class @ domain

An agent could be referred to only if it's agent-instant-name would be an unlimited[1] series of capital letters ('A' to 'Z'), digits ('0' to '9') or under score ('_') that begins with a capital letter.

EXAMPLE 57

Agent Reference Using Complete Agent Address

P1:
DOWN.com.MySubClassedAASAP@x
{action: DOWN.com.MySubClasseAASAP@x};

All agents in the same domain may be referred to using only the agent-instance-name. By default all agents are made in domain x.

EXAMPLE 58

Agent Reference Using Instance Name

P1:
DOWN
{action: DOWN};

Note that you are allowed to have more than one agent with the same instance name in your domain but you may not reference them by name from any agent that is directly connected to both.

[1] The SDK may impose some limitations on the number of characters in a policy name An agent action element will cause a delegation message to be delivered to the referenced agent only if the referenced agent has contributed to a claim that is being actuated.

EXAMPLE 59

Referencing an Agent not Contributing to the Claim being Actuated (DOWN Agent Will not Receive a Delegation Message)

P1:
'volume'
{action: DOWN};
In the case where more than one claim is made by a referenced agent all claims will be merged (in ascending order of the focus index) before delegation.

EXAMPLE 60

Referencing an Agent which has More than One Claim in the Claim being Actuated

DOWN agent policies:
P1:
  'down'
  {action: '<down/>'}
P2:
  'low'
  {action: '<low/>'}
CATCH:
  (P1|P2)+
  {action: P1, P2}
VOLUME agent policies:
P1:
  DOWN
  {action: DOWN}
Input: low and down
Output: <low/><down/>

5.6.2.3 Variables (?)
Variables behave and generate claims according to the following rules:
Rule 1: If the variable condition is bound by tokens on both sides of the condition, then all the tokens found between the boundary tokens are considered to be part of the variable and are added to the policy's claim. This type of variable condition is also known as a fixed variable condition.

EXAMPLE 61

Variable Condition Bound from Both Sides

P1: 'in' ? 'folder';
Input: in my java folder
The variable condition in the P1 claim is 'bound from the left by in' and from the right by 'folder'. Therefore, "my java" is identified as the variable part of the input and is added to the claim's focus.
Rule 2: If the variable condition is bound on only one side (either the left or the right), then the leftmost/rightmost token of the variable part of the input is added to the policy's claim. The variable part of the input is also referred to as a left/right "adjustable" variable.

EXAMPLE 62

Variable Condition Bound from One Side

P1: 'in' ?;
Input: in java folder
In this case the variable is bound on the left by the 'in' token and the variable part is identified as "right adjustable". Per our rule, the "java folder" string is marked as the variable part of the input and "java" is added to the claim focus.
Rule 3: If a claim with a right (or left) adjustable variable is merged with another claim that does not have a variable part, then the variable part of the claim is adjusted by include all of the tokens found up to the beginning of the next claim focus.

EXAMPLE 63

Merging Variable Claims with Claims Containing No Variable Part

P1: 'a' ?;
P2: 'b';
P3: P1<P2;
Input: a x y z b r
In this case, P1's subclaim variable part consists of the string "x y z" and its focus consists of "a" and "x" (second rule applies). When merged, P3's focus consists of 'a', 'x' and 'b'.
Claim list processing is performed as described in the policy reference. The variable length will be checked only after the appropriate checks for coverage, priority, ambiguity, connection weight, tokens distance, focus size and restrictiveness.
If the variable condition does not mark any of the input, no claims are made.

EXAMPLE 64

No Claims are Made when the Input Contains No Variable Parts

P1: 'in' ? 'folder';
Input: in folder
The variable condition does not mark any of the input and no claim is generated.

EXAMPLE 65

Another Example of how No Claims are Made when the Input Contains No Variable Parts P1: 'in' ?;
Input: folders that are in
The variable condition does not mark any of the input and no claim is generated.
When comparing two claims, any claims with no variables are selected over claims with variables.

EXAMPLE 66

Claims without Variables Win Over Claims with Variables

P1: 'a' ?;
P2: 'a' 'b';
Input: a b
In this case, P2 wins over P1.
If two claims contain variables, then the claim with the greater number of variables wins.

EXAMPLE 67

Claims with a Greater Number of Variables Win

P1: 'a' ? 'b' ? 'c';
P2: 'a' ? 'c';
Input: a x b y c
In this example, P1 will be selected over P2.
If two claims have the same number of variables, then the claim with the smaller variable length wins

EXAMPLE 68

Claims with Smaller Variable Length Wins

P1: 'a' ? 'b';
P2: 'c' ? 'd';
Input: a x b c j k d
In this example, P1 is selected as it has the smallest variable length.
You can assign a name to a variable condition. A named variable condition consists of the variable operator followed by a semicolon and the variable name. For example, [?:First] is a valid variable name. References to variable names are only valid within the actions of the policy where the variables are declared.

EXAMPLE 69

Named Variables

P1: 'a' ?:A
 {action:?:A};
P2: P1 'b' ?:A
 {action:?:A};
Input: a x b y
In this example, P2 will be selected as the best claim and the result of the actuation consists of 'y'.
The use of cascading variables is illegal and its behavior is undefined and not supported.

EXAMPLE 70

Cascading Variables

P1: 'in' ???;
The use of unbound variable conditions is illegal and its behavior is undefined and not supported.

EXAMPLE 71

Unbound Variables

P1: ?;

5.6.3 Unary Conditions:
Unary condition is an operation on one operand. There are six basic unary conditions:
Optional
Exists
Token matching
Plus
Tag 5.6.3.1 Optional Condition [Operand]
This condition will always make a claim. The claim made depends on the operand. If the operand has a claim, then the optional condition makes the same claims as the operand. If the operand has no claims the optional condition claims null, an empty claim with a focus of zero.

EXAMPLE 72

Optional Condition

P1: ['actor'] 'john malkovich';
Input: actor john malkovich
The condition applies and makes the following claims:
'actor john malkovich'
'john malkovich'
Input: john malkovich
The condition applies and makes one claim:
'john malkovich'
Policies should not be written in a way that they could make a null claim. For example, the following policies are not supported (although the SDK would not prevent them from being written):

EXAMPLE 73

Policy Conditions that should be Avoided

P1: ['a'];
P2: ['a']|['b'];
P3: ['a' & 'b'];
Each of the above policies makes a null claim regardless of the input. An example of the behavior that would result:

EXAMPLE 74

Avoiding Null Claims

P1: ['a']
P2: P1 & 'b'
Input: b
P2 makes a claim on 'b' with no reference to the null claim made by P1 and with a connection weight of 0 (the & operator will be ignored when calculating the connection weight).

5.6.3.2 Exists Condition <Exists> Operand
Checks to see if the operand has claims. If this is true, then the <exists> condition will make a null claim (an empty claim). If this is false, then the <exists> condition will not make a claim.

EXAMPLE 75

Exists Condition

P1: 'starring'<exists>"redford"
Input: starring redford
The condition applies, and claims 'starring'.
P1 condition will make the claim only if the word 'starring' appears in the input adjacent to claim(s) made by the token terminal 'redford'.
Input: starring
The condition will not apply.
If binary conditions such as adjacent, and (&), ordered (<) and ambiguity (,) appear in the same policy as the <exists> condition, then they behave as if the <exists> condition is making claims on the input. For example:

EXAMPLE 76

Exists Condition

P1: 'aaa'<exists>'aaa'
Input: aaa aaa
The condition applies and marks the first 'aaa' ([0 . . . 2]) as its claim.
Input: aaa
The condition will not apply, as there is no 'aaa' appears in the input before another 'aaa'.
Note that the scope of the <exists> condition is only the policy in which it appears.

EXAMPLE 77

Exists Condition

P1: 'aaa'<exists>'aaa'
P2: P1 'aaa'
Input: aaa aaa
The P2 condition applies and marks the first and second 'aaa' ([0 . . . 2][4 . . . 6]) as its claim.
Policies should not be written in a way that they could claim null. For example, the following policies are not supported (although the SDK would not prevent them from being written):

EXAMPLE 78

Policies that should be Avoided

P1: <exists>'a'
P2: ['a' ] & <exists>'b'
P3: <exists> ('a' & 'b')
Each of the above policies makes a null claim regardless of the input. An example of the bizarre behavior that would result is:

EXAMPLE 79

Policy Conditions that should be Avoided

P1: <exists>'a'
P2: P1 & 'b'
Input: b
P2 will make a claim on 'b' with no reference to the null claim made by P1 and with a connection weight of 0 (the & operator will be ignored when calculating the connection weight).
When using <exists>, an agent is checking against a part of the input that it is not going to claim. Therefore the agent must be aware of parts of the input that are possibly another agent's responsibility. This is against the agent oriented programming style where an agent should only care about its own domain and should not worry about other domains. Therefore <exists> should always be avoided if possible. There is usually a better way to write the policies or configure the agent network to avoid the usage of <exists>.

5.6.3.3 Token Matching Condition
This unary operator defines the type of token matching applied to any terminal condition (e.g. literals, /F, /DB).
There are 5 types of token matching:

<exact>

<substing>

<numeric>

<fuzzy>

Multiple matchers may be listed and applied to a terminal condition or an expression of terminal conditions (see Applying matchers). The default matchers that will be used on terminal conditions can be changed in the ParserParameter.xml file (see ParserParameter support and ignoring accents), and the ignoreAccent directive may be used along with each matcher to ignore accents when comparing characters (see Ignoring accents).

5.6.3.3.1 <exact>
An input token matches a terminal token only if they are the same length and all of their characters are exactly the same.

EXAMPLE 80

<exact> Condition

P1:
Condition: <exact>'malkovich'
Input: 'malkovic'
Claim: malkovic
The condition will not apply.

5.6.3.3.2 <substring>
Two tokens match only if there is an exact match or:
a) Both tokens are larger than 3 characters (this number can be changed in ParserParameters.xml).
b) The first characters in the token must have an 80% match. This percentage can be changed in ParserParameters.xml
If the size of input token getting matched is less than the size of the pattern, the input token will be claimed, otherwise only the matched part of the input token gets claimed.

EXAMPLE 81

Substring Matching a Longer Pattern

P1: <substring> 'malkovich'
Input: 'malkovic'
The condition applies (note that the length of user input is less than the pattern's)
Claim: malkovic

EXAMPLE 82

Substring Matching a Shorter Pattern

P1: <substring> 'malkovich'
Input: 'malkovichab'
The condition applies (note that the length of user input is greater than the pattern's).
Claim: malkovich

EXAMPLE 83

When Substring Wont Match Because of Threshold

P1: <substring>'malkovich'
Input: 'malkovi'
The condition will not apply because it does not satisfy the 80% match.
Claim: N/A

EXAMPLE 84

Substring does not a Pattern with Different First Character

P1: <substring>'malkovich'
Input: 'alkovich'
The condition will not apply because the starting characters do not match.
Claim: N/A 5.6.3.3.3 <numeric>

The <numeric> matching condition is an improvement to the <exact> matcher to match numeric tokens more flexibly. That is for example to have the input 12.0 match the policy 12. This matching condition is specially useful for matching entries in a file.

EXAMPLE 85

Applying the <numeric> Match to a String Condition

P1: <exact> '12' {action: *};
P2: <exact> '12' {action: *};
P3: /NUMBER(12) {action: *}
Input: 12.0
Claim: 12 will be claimed by P2 and P3 but P1 wont make any claims.
Output: 12.0
Note that in this case P2 and P3 behave exactly the same.

EXAMPLE 86

Applying the <Numeric> Match to a File

```
number.txt:
12
```

```
P1: <exact> /F 'number.txt' {action: *};
P2: <numeric> /F 'number.txt' {action: *}
Input: 12.0
Claim: 12 will be claimed by P2 but P1 wont make any claims.
Output: 12.0
Note that in this case P2 and P3 behave exactly the same.
```

5.6.3.3.4 <fuzzy>

The <fuzzy> matching condition is used to apply one or more fuzzy matchers to a literal, file or database terminal condition. The <fuzzy> match condition syntax is:

<fuzzy:Matcher1(threshold),
   Matcher2(thrshold),
   Matcher3(thrshold), . . .
>

Each matcher listed in a <fuzzy> condition is a name of a class that implements FuzzyStringComparer interface (explained later in this document). Duplicates are not checked so it is possible to add the same matcher more than once. The threshold should be a percent value (0-100), which specifies the least similarity between the source and pattern string that will be considered to be a match. The similarity between a source and a pattern string is the match score calculated by the matchers.

EXAMPLE 87

Using the Edit Distance Fuzzy Matching with a Threshold of 70%

P1:
<fuzzy:com.dejima.core.nlp.text.matcher.EditDistance (70)> 'Malkovich';

EXAMPLE 88

Using Edit Distance and Soundex Matchers

P1:
<fuzzy:com.dejima.core.nlp.text.matcher.EditDistance (70), com.dejima.core.nlp.text.matcher.Soundex(60)> 'Malkovich';
Specifying the threshold for each matcher is optional. Matchers will have a default threshold built in that will be used if the threshold is not specified:
<fuzzy:Matcher1,
Matcher2,
Matcher3,
. . . >

EXAMPLE 89

Using the Edit Distance Matcher without Specifying a Threshold. In this Case the Default Threshold (75) Will be Used P1:
<fuzzy:com.dejima.core.nlp.text.matcher.EditDistance> 'Malkovich';
If the class name used in the <fuzzy> condition is not found then the class is looked up in the com.dejima.core.nlp.text.matcher package. An exception will be thrown if the class is not found there either.

EXAMPLE 90

Using the Edit Distance Matcher without Specifying the Package

P1:
<fuzzy: EditDistance(90)>'Malkovich';

EXAMPLE 91

Using Two Fuzzy Matchers without Specifying the Package or the Threshold

P1: <fuzzy: EditDistance, Soundex> 'Malkovich';
If a token is not matched exactly then all matchers listed in the <fuzzy> condition will be applied. The match with highest score is picked if more than one fuzzy matcher would match. If more than one matcher generates the highest similarity score then it does not make a difference which matcher is picked (the score, the matched pattern and all other attributes of the claim generated will be the same).
If the match score is less than 100 then the claim will have an INEXACT connection weight.
If no matchers were listed in the <fuzzy> condition then the default fuzzy matcher will be used. The default fuzzy matcher will be read from the ParserParameter.xml (explained in next chapter). If there were no defaults set in the ParserParameter then RestrictedEditDistance with a threshold of 75 would be used (explanation on why this algorithm was chosen and how it works is given later in this document).

EXAMPLE 92

Using Fuzzy Matching Condition without Specifying any Matchers

P1: <fuzzy>'Malkovich';

5.6.3.3.4.1 Comparing Exact and Inexact Matches

The connection weight and the similarity score will be used to compare exact and inexact matches. All claims made by any fuzzy matcher will have a connection weight of INEXACT which will be less than NO_CONNECTION and more than LOOSE connection (i.e. ADJACENT>ORDERED> AND>NO_CONNECTION>INEXACT>LOOSE). Claims with the same inexact matches will be compared based on their match similarity score (match similarity score of all exact matches will be 100). Match similarity score will be part of every claim.

5.6.3.3.4.2 API Definition 5.6.3.3.4.2.1 FuzzyStringComparer Interface public interface FuzzyStringComparer The interface for all fuzzy string comparers (e.g. EditDistance, RestrictedEditDistance and Soundex)

Usage in FuzzyMatcher: All classes implementing FuzzyStringComparer can be added to the FuzzyMatcher class (the classes should have an empty constructor if they are to be added by name). FuzzyMatcher class will call the compare method to compare tokens of the input with the tokens in the policies (e.g. literals, files and databases). FuzzyMatcher will filter out the comparisons that have a similarity score less than a threshold specified for each FuzzyStringComparer implementer.

| Field Summary | |
| --- | --- |
| final static int | DEFAULT_THRESHOLD |
| | The default threshold used when threshold is not specified in the constructor (75). |
| final static int | MAX_THRESHOLD |
| | The maximum threshold (100). |

| Method Summary | |
| --- | --- |
| int | compare(String source, String pattern) |
| | Compares the source string to the pattern string and returns the similarity score (an integer between 0 and MAX_THRESHOLD). |
| int | getThreshold() |
| | Returns the threshold. |
| void | setThreshold(int newThreshold) |
| | Sets the threshold. |

5.6.3.3.4.2.2 FuzzyStringComparerBase Class public abstract class FuzzyStringComparerBase implements FuzzyStringComparer The base class for all fuzzy string comparers (e.g. EditDistance, RestrictedEditDistance and Soundex). All classes subclassing FuzzyStringComparer may be added to the FuzzyMatcher class (the classes should have an empty constructor if they are to be added by name).

FuzzyMatcher class will call the compare method to compare tokens of the input with the tokens in the policies (e.g. literals, files and databases). FuzzyMatcher will filter out the comparisons that have a similarity score less than a threshold specified for each FuzzyStringComparerBase subclass.

subclassed: always

| Constructor Summary |
| --- |
| FuzzyStringComparerBase() |
|    Constructs a new FuzzyStringComparerBase with a default threshold equal to DEFAULT_THRESHOLD. |
| FuzzyStringComparerBase(int threshold) |
|    Constructs a new FuzzyStringComparerBase with a specific threshold. |

| Method Summary | |
| --- | --- |
| int | compare(String source, String pattern) |
| | Compares the source string to the pattern string and returns the similarity score (0 or MAX_THRESHOLD). |
| int | getThreshold() |
| | Returns the threshold. |
| void | setThreshold(int newThreshold) |
| | Sets the threshold to a new value (the new value should be an integer between 0 and MAX_THRESHOLD or an IllegalArgumentException will be thrown). |

5.6.3.3.4.2.3 EditDistance Class public class EditDistance extends FuzzyStringComparerBase This algorithm compares two words based on keystrokes required to change one word to another. Each character insertion, deletion or overwritting is considered one keystroke.

| Constructor Summary |
| --- |
| EditDistance() |
|    Constructs a new EditDistance with the DEFAULT_THRESHOLD. |
| EditDistance(int threshold) |
|    Constructs a new EditDistance with a specific threshold. |

| Method Summary | |
| --- | --- |
| int | compare(String source, String pattern) |
| | Uses the edit distance between two words to compute their similarity score. |
| int | distance(String source, String pattern) |
| | The edit distance of two strings s and t of length m and n respectively can be computed by computing edit(m, n) using the recurrence shown below: |
| | $edit(0,0) = 0$ |
| | $edit(i,0) = i$ |
| | $edit(0,j) = j$ |
| | $edit(i,j) = \min[edit(i-1, j) + 1, edit(i, j-1) + 1, edit(i-1, j-1) + equal(si, tj)$ |
| | The function equal(a,b) is 0 if a and b are equal and it is 1 if they are not. |
| String | toString() |
| | The string representation of this comparer. |

5.6.3.3.4.2.4 Restricted Edit Distance

Restricted Edit Distance is the same as Edit Distance in all respects except the following:

1. Restricted Edit Distance assigns a distance of one to transpositions. (transpositions have a distance of two in Edit Distance).
2. Restricted Edit Distance will return a score of zero when two words don't have the same first character or when their distance is more than one character (one insertion, deletion, change or transposition).

The restrictions imposed make the compare method of RestrictedEditDistance faster than EditDistance.

5.6.3.3.4.2.5 Soundex

The following summarizes the Soundex algorithm:

Soundex codes begin with the first letter of the words followed by a three-digit code that represents the first three remaining consonants. Zeros will be added to names that do not have enough letters to be coded.
Soundex Coding Guide (Consonants that sound alike have the same code)
1—B, P, F, V
2—C, S, G, J, K, Q, X, Z
3—D, T
4—L
5—M, N
6—R The letters A, E, I, O, U, Y, H, and W are not coded.

5.6.3.3.5 Changing the Default Matchers in ParserParameter.XML 5.6.3.3.5.1 Declaring the Default Token Matchers Available default token matchers are now: exact, substring and fuzzy. The default token matchers are used on any token condition (literals, files or database) with no token matchers assigned to it. The document type definition of the XML used for declaring default token matchers are:

<!ELEMENT Policy:TokenMatchers (Policy:TokenMatcher*)>

<!ELEMENT Policy:TokenMatcher EMPTY>

<!ATTLIST Policy:TokenMatcher type (exact|substring|fuzzy) #REQUIRED>

EXAMPLE 93

Declaring the Default Token Matchers in the ParserParameter.xml

<Policy:TokenMatchers/>
<Policy:TokenMatcher type="exact" />
<Policy:TokenMatcher type="substring" />
<Policy:TokenMatcher type="fuzzy" />
</Policy:TokenMatchers>

The usage of fast as TokenMathcer's value will be deprecated.

<!ATTLIST Policy:TokenMatchers value (fast|flexible) #IMPLIED>

The following lines in the ParserParameter.xml will declare the default token matchers which is identical to <TokenMatchers value=fast/>.
<Policy:TokenMatchers>
<Policy:TokenMatcher type="exact" />
<Policy:TokenMatcher type="substring" />
</Policy:TokenMatchers>

5.6.3.3.5.2 Changing the Default Fuzzy Matchers

One or more fuzzy string comparers may be assigned to the default fuzzy matcher. The default fuzzy matcher will be used on all conditions that a fuzzy matcher is applied but the fuzzy string comparers are not specified. In other words there is a fuzzy tag without a list of fuzzy matchers (e.g. the policy is "<fuzzy> 'a'" instead of <fuzzy:Soundex(60) 'a'").

EXAMPLE 94

Fuzzy Token Matcher Definition in ParserParameter.xml

<Policy:FuzzyMatchers>
<Policy:FuzzyComparer
    className="EditDistance"
    threshold="90"
/>
<Policy:FuzzyComparer
    className="Soundex"
    threshold="60"
/>
</Policy:FuzzyMatchers>

Example policy that will use the fuzzy matchers declared here: <fuzzy> 'occasional'

EXAMPLE 95

Switching on the Edit Distance to be the Default Fuzzy Matching

ParserParameter.xml
---------------------------------------
<Policy:FuzzyMatchers>
<Policy:FuzzyComparer
    className="EditDistance"
    threshold="90"
/>
<Policy:FuzzyComparer
    className="Soundex"
    threshold="60"
/>
</Policy:FuzzyMatchers>
Agent policies:
---------------
P1: 'occasional'
P2: <fuzzy> 'occasional'
Explanation: EditDistance and Soundex matcher will be used on P2.

5.6.3.3.6 Ignoring Accents

Ignoring of accents is specified by adding a new optional parameter to all existing matchers. If this parameter is not specified, the matchers work in the normal manner. The usage of the parameter is shown below:

EXAMPLE 96

Ignoring Accents in Matchers

<exact ignoreAccent>
<substring ignoreAccent>
<fuzzy ignoreAccent>
<fuzzy ignoreAccent: EditDistance, Soundex>
<ordinal ignoreAccent>

Note that the ignoring of accents is applied to all fuzzy matchers in the fuzzy matcher list. Ignoring of accents can also be applied to default matchers in ParserParameters.xml, as shown below.

EXAMPLE 97

Declaring the Default Token Matchers in the ParserParameters.xml

<Policy:TokenMatchers/>
<Policy:TokenMatcher                           type="exact"
    parameter="ignoreAccent" />
<Policy:TokenMatcher                           type="substring"
    parameter="ignoreAccent" />
<Policy:TokenMatcher                           type="fuzzy"
    parameter="ignoreAccent" />
<Policy:TokenMatcher                           type="ordinal"
parameter="ignoreAccent" />
</Policy:TokenMatchers>

The accents that are to be ignored are specified in ParserParameters.xml as shown below:

EXAMPLE 98

Defining Accents to Ignore in ParserParameters.xml

```
<Policy:Accents>
<Policy:Accent character="a" lowerLimit="à" upperLimit="å" />
<Policy:Accent character="c" lowerLimit="ç" upperLimit="ç" />
<Policy:Accent character="e" lowerLimit="è" upperLimit="ë" />
<Policy:Accent character="i" lowerLimit="ì" upperLimit="ï" />
<Policy:Accent character="n" lowerLimit="ñ" upperLimit="ñ" />
<Policy:Accent character="o" lowerLimit="ò" upperLimit="ö" />
<Policy:Accent character="o" lowerLimit="ø" upperLimit="ø" />
<Policy:Accent character="u" lowerLimit="ù" upperLimit="ü" />
<Policy:Accent character="y" lowerLimit="ý" upperLimit="ý" />
<Policy:Accent character="y" lowerLimit="ÿ" upperLimit="ÿ" />
</Policy:Accents>
```

The above example specifies the character to be mapped to, and the range of characters that are mapped to that character. Note that multiple ranges for the same character are allowed. Note also that uppercase characters do not need to be specified because tokens in the core are converted to lowercase in a locale specific manner.

By default, Parser Parameters will specify mappings for accented characters from Unicode Latin-1 Supplement. These can be modified at any point if required.

It should be noted that for the ignoring of accents to work correctly, the alphabet in the ParserParameters.xml must be defined to include the Unicode for the accented characters.

The recommended additional Latin character Unicode sets include: Latin-1 Supplement, Latin Extended-A, and Latin Extended-B. The Unicode for these sets will be included in the standard ParserParameters.xml by default, as shown in Example 2 below.

EXAMPLE 99

Declaring the Default Alphabet in the ParserParameters.xml

```
<Policy:Alphabet>
<Policy:CharacterRange lowerLimit="a" upperLimit="z" />
<Policy:CharacterRange lowerLimit="A" upperLimit="Z" />
<Policy:CharacterRange lowerLimit="#x00c0;" upperLimit="ȳ" />
<Policy:CharacterRange lowerLimit="　" upperLimit="￮" />
</Policy:Alphabet>
```

The character coding used when reading files also becomes important when handling accents. The encoding scheme can now be set in ParserParameters:

EXAMPLE 100

Declaring the Default Alphabet in the ParserParameters.xml

```
<!-- CharacterEncoding
encoding: the character encoding used to read information
    from files. This string is used when constructing
the Java InputStreamReader. For information on character
    encoding see the JavaDoc for this class. If an
<accent> matcher is used, the encoding type will need to be
    set appropriately
-->
<Policy:CharacterEncoding encoding="UTF-16" />
```

5.6.3.3.7 Applying Matchers

More than one token matching might be used to match terminal tokens. The matching will then be applied to the tokens one by one. If the first matching does not make a claim, the next matching in the list will be used.

EXAMPLE 101

Applying Multiple Matchers

P1: <exact, substring>'malkovich';
Input: 'being john malkovic'
The condition applies, and marks the following:
'malkovic' (substring match)
Note that the default matcher is defined in ParserParameter (see ParserParameter support)

Token matching types can be applied to file terminals (which changes their default matchings).

EXAMPLE 102

Matching Types Applied to File Terminals

---

MN.txt:
sixth sense
being john malkovich
the wall

P1:   <exact, substring> /F 'MN.txt';
Input: malkovich and sixth sense
The condition applies and only one claim will be made:
'sixth sense'

---

It is permissible to specify a matcher to be applied to an expression that consists entirely of terminal conditions, regardless of the operators and parentheses used to form them. Note that expressions with non-terminal conditions (such as agent or policy names) will cause a warning if specified

EXAMPLE 103

Applying Matchers to an Expression

P1: <exact> ('actor named' < ('john malkovic'|'bruce willis'));
Input #1: actor named bruce willis
The condition applies as it matches all tokens exactly.
Input #2: actor named bruce wilis
The condition does not apply as it does not match all tokens exactly.

EXAMPLE 104

Applying Token Matchers to an Expression Consisting Non Terminal Conditions (Illegal Usage)

P1: <exact> (ACTOR_NAME <'john malkovic');
Illegal usage, ACTOR_NAME is an agent reference not a terminal condition.

Each token matching type has a value, which shows how restrictive it is. The restrictive-ness value is a constant, predefined heuristically:

Exact (100)

Substig (60)

5.6.3.4 Plus Condition (+):

The plus condition makes new claims by merging subsets of the claims made by the operand. Specifically, each claim made by the plus condition is the result of merging claims that form a maximal disjoint subset of the set of claims made by the operand. Two claims are said to be disjoint if their focuses do not overlap (that is, the intersection of their focuses is null). A set of claims is disjoint if every claim in the set is disjoint to every other claim in the set. A set is maximal if it is not a subset of any other set.

EXAMPLE 105

+ Condition

```
MN.txt:
sixth sense
being john malkovich
```

```
Policy without plus condition:

P1: (/F 'MN.txt');
Input: 'being john malkovich and 'sixth sense'
The condition will apply and will make two claims.
The claims (in order) will mark the following:
    1. 'being john malkovich'
    2. 'sixth sense'
Policy with plus condition:

P1: (/F 'MN.txt')+;
Input: 'being john malkovich and 'sixth sense'
The operand makes the two claims above. The disjoint
subsets of the operand claims are {1} (the set
containing Claim 1), {2} (the set containing Claim 2),
and {1, 2} (the set containing Claims 1 and 2). The
sets {1} and {2} are not maximal because they are
subsets of {1, 2}. Therefore, the plus condition will
make a claim by merging Claims 1 and 2. The claim will
mark the following:
'being john malkovich' , 'sixth sense'
```

EXAMPLE 106

+ Condition

```
MN.txt:
fifth sense
sixth sense
being john malkovich
```

```
P1: (/F 'MN.txt')+;
Input = 'being john malkovich and sixth sense'
The condition will apply and will make two claims. The
claims (in order) will mark the following:
    1. 'being john malkovich' , 'sixth sense'
    2. 'being john malkovich' , 'sense'
```

Note that a claim is not made by combining the operands's claims on 'sixth sense' and 'sense' because the two claims are not disjoint. Another way to look at this is that merging these two claims would make an ambiguity. The plus condition is not allowed to make new claims that have ambiguities.

A policy condition should not reference a plus condition.

EXAMPLE 107

Policies Containing Plus Conditions should not in General be Referenced by Other Policies. The Plus Condition does not Generate all Possible Inner-Products AB: 'a b'
C: 'c'
CD: 'c d'
P1: (AB|C)+
PLUS: (P1CD)+
0 2 4 6
Input: a b c d
claims made by P1 plus operand:
1. AB: a b [0 . . . 2]
2. C: c [4]
3. CD: c d [4 . . . 6]]
maximal disjoint subsets for AB and C:
{1,2}
claims made by P1:
1. (AB, C): a b c [0 . . . 2 . . . 4]—best claim made by P1
Note that P1 does not propagage claims made by AB and C individually because the claims are each individually subsets of the maximal disjoint subset (1,2).
claims made by PLUS:
1. (AB, C): a b c [0 . . . 2 . . . 4]
2. CD: c d [2 . . . 4]—best claim made by PLUS

EXAMPLE 108

An Example of Referencing Plus Conditions in a Policy that Might go Unnoticed

P1: 'a' 'b'+
Here the plus condition is actually being referenced by the adjacent condition.

The plus operator generates claims that may have loose connections. When an agent selects one of these as the best claim and sends it upchain, the propagation mechanism additionally sends the set of firm subclaims upchain too. Therefore, the upchain agent receives the claim with the loose connection and all of the firm subclaims, which do not have loose connections. If the upchain agent selects the claim with the loose connection as the best connection, the process is repeated. It is in this way that multiple claims can be sent upchain by an agent that does not contain a policy with the plus operator.

The propagation mechanism will be changed such that if the claim being propagated has a loose connection, the claim itself will not be sent upchain. Instead only the set of firm subclaims will be sent upchain. The upchain agent will receive only claims without loose connections. Therefore, it will itself only be able to send a single best claim upchain unless it has itself a policy that contains a plus operator and can therefore generate claims with a loose connection.

The following examples illustrate how this affects claim propagation.

EXAMPLE 109

Propagation of Claims Made by the Plus Condition: Current Behavior

```
Agent1::
P1: Agent2;
Agent2::
A: 'a';
PLUS: (A)+
Input: a a
Claims made by A:      a [0]
                       a [2]
Claims made by PLUS: a a [0.2] - loose connection
Claims sent upchain by Agent2:    a    a  [0.2]  - best claim
                                  a       [0]    - firm subclaim
                                  a       [2]    - firm subclaim
Claims made by P1:     a      [0]
                       a      [2]
                       a   a  [0.2] - loose connection
Claims sent upchain by Agent1:    a    a  [0.2]  - best claim
                                  a       [0]    - firm subclaim
                                  a       [2]    - firm subclaim
```

EXAMPLE 110

Propagation of Claims Made by the Plus Condition: New Behavior

```
Agent1::
P1: Agent2;
Agent2::
A: 'a';
PLUS: (A)+
Input: a a
Claims made by A:      a [0]
                       a [2]
Claims made by PLUS: a a [0.2] - loose connection
claims sent upchain by Agent2:    a [0] - firm subclaim
                                  a [2] - firm subclaim
Claims made by P1:     a [0]
                       a [2]
Claims sent upchain by Agent1: a [0]
```

Note that only the firm subclaims of the best claim of Agent2 are sent upchain. Since policy P1 of Agent1 does not have a plus operator, it will only send its best claim upchain. In this case, the best claim is 'a '[0].

EXAMPLE 111

Propagation of Claims Made by the Plus Condition: New Behavior

```
Agent1::
P1: (Agent2)+;
Agent2::
A: 'a';
PLUS: (A)+;
Input: a a
Claims made by PLUS: a a [0.2]
Claims made by PLUS: a a [0.2] - loose connection
Claims sent upchain by Agent2:    a [0] - firm subclaim
                                  a [2] - firm subclaim
```

-continued
```
Claims made by P1: a a [0.2] - loose connection
Claims sent upchain by Agent1:    a [0] - firm subclaim
                                  a [2] - firm subclaim
```

In this case, since P1 uses the plus operator, the two claims made by its operand are combined into a claim that has a loose connection. Since this is the best claim, and it has a loose connection, only its firm subclaims will be sent upchain.

The plus condition's performance slows down when the input gets big.

EXAMPLE 112

Plus Condition Performance Issue

P1: 'a';
P2: P1+;
Input: 'a a a a a a a a a a a a a a a a a a a a a a a a a a a a a a a a a a a a a a a a a a a a a a a a a a a a a a a a a a a a a a a a a a a a a a a a a a a a a a a a a a a a a a a a a'

5.6.4 Binary Conditions

Binary conditions merge claims made by two operands at the left and the right of a binary operator. There are two types of binary conditions atomic and combinational.

5.6.4.1 Atomic Conditions 5.6.4.1 OR Condition (Operand1|Operand2):

This condition applies only if at least one of the left or one of the right operands has claims.

EXAMPLE 113

| Condition

P1: 'willis' | 'malkovich';
Input: 'willis'
The condition applies, and claims willis as the input.
Input: 'Willis or malkovich'
The condition applies, and makes two claims.
The claims (in order) would mark the following:
'malkovich'
'willis'

5.6.4.1.2 AND Condition (Operand1 & Operand2):

This condition applies only if both left and right operands have claims.

EXAMPLE 114

AND Condition

P1: 'john' & 'malkovich';
Input: 'malkovich whose first name is john'
The condition applies and marks the following:
'malkovich' 'john'.
Input: 'john'
The condition will not apply.

It is not recommended to make a reference to a policy which combines claims using PLUS in the AND condition (e.g. P1: ('a','b') & 'c').

5.6.4.1.3 ORDERED Condition (Operand1<Operand2):

This condition applies only if both left and right operands have claims and the part of the input claimed by the left operand comes before the part of input claimed by right operand.

EXAMPLE 115

ORDERED Condition

P1: 'john'<'malkovich';
Input: 'john whose family name malkovich'
The condition applies and claims 'john' and 'malkovich'.
Input: 'malkovich whose first name is john'
The condition will not apply.

It is not recommended to make a reference to a policy which combines claims using PLUS operators in the ORDERED condition (e.g. P1: ('a','b')<'c').

5.6.4.1.4 ADJACENT Condition (Operand1~Operand2):

This condition applies only if both left and right operands have claims, and the left operand claim is immediately adjacent to the right operands claim.

The claims made by left and right operands are merged, the resulting claim will be accepted only if the tokens distance of the merged claim is 0.

EXAMPLE 116

ADJACENT Condition

P1: 'john' 'malkovich';
Input: 'john malkovich'
The condition applies and claims the whole input.
Input: 'john smith malkovich'
The condition will not apply. As the tokens distance of the merged claim is 1.

It is not recommended to make a reference to a policy which combines claims using PLUS operators in the ADJACENT condition (e.g. P1: ('a','b') 'c').

5.6.4.1.5 AMBIGUITY condition (Operand1::Operand2):

This condition joins the left and right operands if they would make an ambiguous claim.

EXAMPLE 117

Usage of Ambiguity Condition

P1: 'a';
P2: 'a';
P3: P1 :: P2;
Input: 'a'
P3 will make a claim:
'a' (with an ambiguity between P1 and p2)

Note: This is the only condition that can make ambiguous claims.

Two claims will be ambiguous if
1. They are joined using an ambiguity operator (comma)
2. They have the same priority
3. They overlap but do not have the same focus, OR, they have the same focus and connection weight.

So if a claim has higher priority than another claim then they wont be merged as an ambiguous claim.

EXAMPLE 118

When Priority Prevents Ambiguity

P1: 'a';
P2: 'a' {priority: 1};
P3: P1::P2;
Input: a
The result will not be ambiguous because the priority of the claim made by policy P2 is higher than the priority of policy P1. So no claims will be made.

EXAMPLE 119

When Connection Weight Prevents Ambiguity. The Column with Header P1::P2 Shows the Best Claim Generated by the Ambiguity Condition. Ambiguous Means that P1 and P2 Claims were Joined to Make an Ambiguous Claim

| input | P1 | P2 | P1, P2 |
| --- | --- | --- | --- |
| a | a | a | ambiguous |
| a b | a & b | a~b | P2 |
| a b c | a & (b~c) | a~(b~c) | P2 |
| a b c | (a&b)~c | a~(b&c) | ambiguous |
| a b | a&b | b~c | ambiguous |
| a b c d | (a&b)~c | b~(c&d) | ambiguous |

The tokens distance of a claim made by an ambiguity condition is not calculated directly from the focus of the claim (see tokens distance in Claim). Instead it is calculated as the sum of the tokens distance of the sub-claims. For example, if P1 claims 'cat' and 'mouse' on the input 'cat dog mouse' and P2 claims 'dog', the token distance of (P1, P2) will be 1, whereas the tokens distance of (P1 & P2) will be 0. If P1 claims 'cat' on the input 'cat and dog' and P2 claims 'dog', the tokens distance of (P1,P2) will be 0, whereas the tokens distance of (P1 & P2) will be 1.

5.6.4.1.6 MINUS Condition (Operand1-Operand2):

The binary minus operator removes all claims from the first operand claim list that are equivalent to claims in the second operand claim list. The minus operator supports policy and agent references. Examples of usage are given below.

EXAMPLE 120

Usage of the Minus Operator

P1: 'a'-('a' 'b');
Input: a a b
   0 2 4
Claim list: a [0], a [2]
Note that the right-hand operand does not make any claims equivalent to claims made by the left-hand operand.

EXAMPLE 121

Usage of the Minus Operator

P1: 'a'~'b'-'a';
Input: a a b
   0 2 4
Claim list: a[2], b[4]

Note that the right-hand operand does not make any claims equivalent to claims made by the left-hand operand.

EXAMPLE 122

Usage of the Minus Operator with Files

P1: /F MovieNames.txt –'harrison ford'
Input: harrison ford
Claim list: no claims
Input: harrison
Claims: harrison
Note: the claim from the file is 'harrison ford', which is why the second input returns 'harrison'.

EXAMPLE 123

Usage of the Minus Operator with Policy References

P1: 'a' & ('b' | 'c');
P2: 'a' & ('b' | 'd');
P: P1 – P2;
Input: a b a d
     0 2 4 6
Claims made by P1:  a b[0 2]
                         a c[0 4]
Claims made by P2:  a b[0 2]
                         a d[0 6]
Claims made by P:   a c[0 4]

EXAMPLE 124

Usage of the Minus Operator with Substring

P1: <exact> 'aaaabbbbcccc';
P2: <substring>'aaaabbbbccccd';
P3: P2–P1;
Input: aaaabbbbcccc
Claims made by P3: none In terms of operator precedence, the minus operator comes between the 'or and 'and' operators, resulting in a precedence in ascending order of 'or', 'minus', 'and'.

EXAMPLE 125

Operator Precedence: Minus and '|'

P1: 'b'–'a'|'c';
P2: ('b'–'a')|'c';
P3: 'b'–('a'|'c');
Input: c
P2 will make a claim on c.
P3 will not make any claims.
P1 is equivalent to P2.

EXAMPLE 126

Operator Precedence: Minus and "&"

P1: 'x' & 'y'–'y';
P2: ('x' & 'y')–'y';
P3: 'x' & ('y'–'y');
Input: x y
0 2
P2 will make a claim on 'x y'.
P3 will not make any claims
P1 is equivalent to P2. .

The combination of the variable operator and the minus operator is not recommended. The behavior of the combination is shown in the example below.

EXAMPLE 127

Variable Operator

P1: 'a' ?
P2: 'a' 'x'
P3: P1–P2
Input: a x
   0 2
Claims made by P3: none
Input: a x y
Claims made by P3: none (the variable operator will claim the 'x', and hence P1 and P2 make equivalent claims).

The minus operator allows precise and clear definitions of negation. These are given below.

1. all a's if there are no b's ("and not"): 'a'–('a' & <exists>'b')
2. all b's if there are no a's ("and not"): 'b'–('b' & <exists>'a')
3. all a's not followed by a 'b' ("adjacent not"): 'a'–('a'<exists>'b')
4. all b's not preceded by an 'a' ("adjacent not"): 'b'–(<exists>'a' 'b')

EXAMPLE 128

Usage of the "and not" Operator

P1: 'a'–('a' & <exists>'b');
Input: a a b
Claim list: no claims

EXAMPLE 129

Usage of the "Adjacent not" Operator

P1: 'a'–('a'<exists>'b');
Input: a a b
0 2 4
Claim list: a[0]

EXAMPLE 130

Usage of the "Adjacent not" Operator

P1: 'b'–(<exists>'a' 'b')
Input: a a b
Claim list: no claims 5.6.4.2 Combinational Conditions (Operand1 op1 op2 Operand2)

Combinational conditions are made are made by cascading atomic conditions.

5.6.4.2.1 Repeat Condition
   (operand1~^operand2),
   (operand1<^operand2)
   and (operand1 & ^operand2)

This condition is used to repeat applying the AND (&), ORDERED (<) or adjacent operators. The following table is given to help understand what each repeat operator means:

| Repeat operator | What it means |
|---|---|
| A&^B | A&B&B&B&B... |
| A<^B | A<B<B<B<B... |
| A^B | A B B B B B... |

EXAMPLE 131

Using Adjacent Condition to Claim 'and' Conjunctions

P1: 'book,'|'toy'|'shirt';
P2: P1 'and' P1;
Input: 'book and toy and shirt'
Condition P2 applies, making three claims: 1—'book and toy' 2—'toy and shirt'.
Now consider replacing P2's condition:

EXAMPLE 132

Using Repeat Condition to Claim 'and' Conjunctions

P2: P1^('and' P1);
Condition P2 applies and makes three claims: 1—'book and toy and shirt' 2—'book and toy' 3-'toy and shirt'

EXAMPLE 133

Using &^ Condition

P1: 'a' &^ 'b'
Input: 'b b a b b b'
Condition P1 applies and makes the claim 'b b a b b b b':

EXAMPLE 134

Using <^ Condition

P1: 'a'<^ 'b'
Input: 'b b a b b b'
Condition P1 applies and makes the claim 'a b b b':

EXAMPLE 135

Using ~^ Condition

P1:'a' ^ 'b'
Input: 'b b a b b b'
Condition P1 applies and makes the claim 'a b b b'
Note that ^ is equivalent to ~^

5.6.4.2.2 Computational Explosion

Computational explosion occurs in operators with processing time exponential to the number of claims they process. Currently there are two such operators: &^ and <^.

You should use the ComputationalExplostion threshold to prevent long process time.

&^ and <^ will not process a claim list with a size greater than or equal to the ComputationalExplosion threshold. The threshold should be set to the maximum number of claims that will cause computational explosion. The following table shows the approximate process time of claim lists on a Pentium III machine:

| Claim list size | Process time (mili sec) |
|---|---|
| 2 | 20 |
| 3 | 20 |
| 4 | 40 |
| 5 | 70 |
| 6 | 80 |
| 7 | 120 |
| 8 | 270 |
| 9 | 771 |
| 10 | 2333 |
| 11 | 11887 |
| 12 | 59415 |
| 13 | 275577 |

When the system detects a computational explosion it will mark the claims produced as timed out and will log a warning message.

The default ComputationalExplostion threshold is set to 12. The threshold can be changed by modifying network OPAL file. Look under DejimaAgentNetworkDefaults tag for:

<Policy:ComputationalExplosion threshold="12" />

5.6.4.2.3 Comma (Operand1, Operand2)

Comma operator is a combination of the Ambiguity condition and the Or condition.

operand1, operand2

Is equal to:

(operand1::operand2)|operand1|operand2

You can also use comma (operand1, operand2) as a shortcut for operand1::|operand2.

5.6.4.2.4 Other Combinations
(Operand1&|Operand2), (Operand1<Operand2), (Operand1~|Operand2)

The following table is given to help understand what each combinational operator means:

| Operator | What it means |
|---|---|
| A&|B | (A&B)|A|B |
| A<|B | (A<B)|A|B |
| A~|B | (A~B)|A|B |

6 Actions

Actions create the actuation message by translating a claim to a standard format for processing by the backend system (e.g. an object containing XML).

6.1 Action Types

6.1.1 Action

An unambiguous action to be carried out.

EXAMPLE 136

Example of Actions

TV: ['TV'] 'on'
{action: 'TV ON!'};
VCR: ['VCR'] 'on'
{action: 'VCR ON!'};
HOME_ENTERTAINMENT: TV,VCR
{action: TV, VCR};

Input: TV on and VCR off
Output: TV ON! VCR ON!

6.1.2 Ambiguity Action

The action that will be carried out when there is an ambiguity (overlapping subclaims) in the claim. The sub claims, which caused the ambiguity, would be actuated normally and their actuations would be put together to make the ambiguity choices.

For example, lets say the TV and VCR policies would have an overlapping claim that has been put together by HOME_ENTERTAINMENT policy:

EXAMPLE 137

Ambiguity

```
TV: ['TV'] 'on'
{action: '<TV value=on />'};
VCR: ['VCR'] 'on'
{action: <VCR value=on />};
HOME_ENTERTAINMENT: TV,VCR
{action: {TV, VCR}
{ambiguity action: '<amb>', TV, VCR, </amb>};
Input: ON!
Output: <amb><TV value=on/><VCR value=on/></amb>
Input: TV on!
Output: <TV value=on />
```

EXAMPLE 138

More than One Ambiguity

```
TV: ['TV'] 'on'
{action: '<TV value=on />'};
VCR: ['VCR'] 'on'
{action: <VCR value=on />};
HOME_ENTERTAINMENT: TV,VCR
{action: {TV, VCR}
{ambiguity action:
   '<homeEntertainment><amb>', TV,
   VCR, </amb></homeEntertainment>};
LIGHT: ['light'] 'on'
action: '<room><LIGHT value=on /></room>'}
ROOM: HOME_ENTERTAINMENT, LIGHT
{action: { HOME_ENTERTAINMENT, LIGHT }
{ambiguity action:
'<amb>', HOME_ENTERTAINMENT, LIGHT, </amb>};
Input: ON!
Output:
  <amb>
    <homeEntertainment>
      <amb>
        <TV value=on/>
        <VCR value=on/>
      </amb>
    </homeEntertainment>
    <room>
      <LIGHT value=on />
    </room>
  </amb>
```

6.2 Action Building Blocks

Each field in the action forms (e.g. action, ambiguity action) is created using variety of building blocks. When actuated, each building block generates an output. These outputs are put together to make the final action. Building blocks can be a String, a Star or a Variable.

6.2.1 Strings

Outputs any information entered in quotes.

EXAMPLE 139

String Action Block

P1:
  'bruce willis'
    {action: 'You asked for a movie star'};
  Input: bruce willis P1 will make a claim. If the claim would be delegated to policy P1 then the action would be: 'You asked for a movie star'.

6.2.2 Star(*)

Returns the part of the input that was claimed by the policy.

EXAMPLE 140

Star Action Block

P1:
  'bruce willis'
    {action: *};
  Input: bruce willis

P1 will make a claim. If the claim would be delegated to policy P1 then the action would be: 'bruce willis'.

6.2.3 *.number

Returns the part of the input that was claimed as a number.

EXAMPLE 141

Example of *.Number Usage on a Policy which Claims Numbers Using a /NUMBER Condition

| Policy Condition | User Input | Output * | Output *.number |
|---|---|---|---|
| "1234567" | 1234567 | 1234567 | 1234567 |
|  | 123456 | 123456 | 123456 |
| /NUMBER(1234567) | 1234567 | 1234567 | 1234567 |
|  | 123456 |  |  |
|  | 1,234,567 | 1,234,567 | 1234567 |
|  | 1.234.567 |  |  |
|  | 1234567.0 | 1234567.0 | 1234567 |
|  | 01234567 | 01234567 | 1234567 |
|  | +1234567 | +1234567 | 1234567 |
| /NUMBER(1000000) | 1,000,000 | 1,000,000 | 1000000 |
|  | 1,000,000.0 | 1,000,000.0 | 1000000 |
| /NUMBER(2) | 002 | 2 | 2 |

-continued

| Policy Condition | User Input | Output * | Output *.number |
|---|---|---|---|
| /NUMBER(0.2) | .2 | 0.2 | 0.2 |
| /NUMBER(−0.2) | 0.2 | UII | UII |
|  | −0.2 | −0.2 | −0.2 |
|  | −.2 | −.2 | −0.2 |
| /NUMBER(1000) | 1000 1000.0 1,000 | 1000 1000.0 1,000 | 1000 1000 1000 |
| /NUMBER(10, 20) | 11.00 | 11.00 | 11 |
|  | 9.9 |  |  |
| /NUMBER(1, +INF) | 01 | 01 | 1 |
|  | 0 |  |  |
|  | 10.00 | 10.00 | 10 |
| /NUMBER(−INF, 1) | 1 | 1 | 1 |
|  | 0 | 0 | 0 |
|  | −100.02 | −100.2 | −100.2 |
| /NUMBER(1, 5, 1)+ | 012332459 | 12345 | 12345 |
|  | −2 |  |  |
| /NUMBER(−2, 2, 1) | −2−1012 | −2−1012 | −2−1012 |
|  | 1.2 |  |  |

EXAMPLE 142

Example of *.Number Usage on a Policy which Claims Numbers Using a <Numeric> /F Condition

| Policy Condition | User Input | Output * | Output *.number |
|---|---|---|---|
| <numeric> /F:NUMBER 'numberValue.txt' | 1234567 | 1234567 | 1234567 |
| 1234567 | 123456 |  |  |
| 2 | 1,234,567 | 1,234,567 | 1234567 |
| 0.1 | 1.234.567 |  |  |
| −0.2 | 1234567.0 | 1234567.0 | 1234567 |
| 1000 | 01234567 | 01234567 | 1234567 |
|  | +1234567 | 12345678 | 1234567 |
|  | 002 | 2 | 2 |
|  | .1 | .1 | 0.1 |
|  | 0.2 |  |  |
|  | −0.2 | −0.2 | −0.2 |
|  | −.2 | −.2 | −0.2 |
|  | 1000 1000.0 1,000 | 1000.0 | 1000 |

EXAMPLE 143

Example of *.Number Usage on a Policy which Claims Numbers Using a /DB Condition on a Numeric Column

| Policy Condition | User Input | Output * | Output *.number |
|---|---|---|---|
| /DB:NUMBER 'MS.spec' | 1234567 | 1234567 | 1234567 |
| MS.spec | 123456 |  |  |
| sun.jdbc.odbc.JdbcOdbcDriver | 1,234,567 | 1,234,567 | 1234567 |
| dbc:odbc: | 1.234.567 |  |  |
| myMovie | 1234567.0 | 1234567.0 | 1234567 |
| Movie | 01234567 | 01234567 | 1234567 |
| price | +1234567 | ? | ? |
| NUMBER | 002 | 2 | 2 |
| Price field | .1 | .1 | 0.1 |
| 1234567 | 0.2 | UII | UII |
| 2 | −0.2 | −0.2 | −0.2 |
| 0.1 | −.2 |  |  |
| −0.2 | 1000 1000.0 1,000 | 1000.0 | 1000 |
| 1000 |  |  |  |

? Some databases don't allow +1234567 in the number field.

6.2.4 *.matched

Return the pattern that matched the input. The * and *.matched will be the same if the input is matched exactly. Note that *.matched outputs will have the same coverage as *. When more than one token are part of the claim then the *.matched output will be a cascade of all tokens separated by a blank.

EXAMPLE 144

An Example of how the *.Matched could be Used in a Policy

P1: <fuzzy> ('thriller')
{action:
'<MOVIE_TYPE><', *.matched, '>', *, '<\', *.matched, '></MOVIE_TYPE>'};
Input: "thriler"
Response:
<interaction>
<MOVIE_TYPE><Thriller>thriler</Thriller></MOVIE_TYPE>
</interaction>

6.2.5 *.score

Returns the similarity score of the claim(s). Note that *.score outputs will have the same coverage as *. When more than one token are part of the claim then the *.score output will be a cascade of all tokens in the claim separated by a blank.

EXAMPLE 145

Example Usage of *.score

P1:
'newark'
   {action: 'city=newark'};
P2:
<fuzzy>'newarc', <fuzzy>'sunnyvale'
   {action: 'input=(',*,') matched=(',*.matched,') score= (',*.score,')'};

| Input | Expected |
|---|---|
| newarc | input= (newarc) matched= (newarc) score= (100) |
| newark | city=newark |
| newark sunnyvale | input= (newark sunnyvale) matched= (newarc sunnyvale) score= (83 100) |

6.2.6 *.target

Return the synonym table target pattern that matched the input if synonym table is used, otherwise it will return the same as *.matched. Note that *.target outputs will have the same coverage as *. When more than one token are part of the claim then the *.target output will be a cascade of all tokens separated by a blank.

EXAMPLE 146

Example Usage of *.target

Synonym file:
Comedy: funny, hilarious, very funny, extremely funny
P1:
<fuzzy>'comedy'
   {action: 'claimed [',*,'] based on [',*.target,'] matched [',*.matched,']'}

| Input | Claims |
|---|---|
| comedy | claimed [comedy] matched [comedy] based on [comedy] |
| hilarious | claimed [hilarious] matched [hilarious] based on [comedy] |
| very funny | claimed [very funny] matched [very funny] based on [comedy] |
| hilarious | claimed [hilarius] based on [comedy] matched [hilarious] |
| very funy | claimed [very funy] based on [comedy] matched [very funny] |
| comdy | claimed [comdy] based on [comedy] matched [comedy] |
| very | Unable to interpret input |

6.2.7 Variable (?)

Shows which part of the input was marked as a variable in the claim. The variable action corresponds to the variable condition in the policy with the same name.

EXAMPLE 147

Variable Action Block

P1: 'starring' ?:MOVIESTAR
   {action:
   'who is the movie star ',
?:MOVIESTAR, 'you are looking for?'};
Input: starring redford
P1 will make a claim. If the claim would be delegated to policy P1 then the action would be:
Who is the movie star redford you are looking for?
Note: It is recommended to always use names with variables. However, this is how multiple unnamed variables are handled:

EXAMPLE 148

Not Recommended Usage

P1: 'send email from' ? 'to' ?
   {action: ?};
Input: send email from Siamak to Kristi
P1 will make a claim. If the claim would be delegated to policy P1 then the action would be: Siamak Kristi
Note: The Variable action trims the leading and trailing delimiters, but other delimiters are considered to be part of the variable. Multiple variables are trimmed after they are combined.

EXAMPLE 149

Variable Trimmings

P1: 'being' ? '.'
   {action: 'var:',?,'.'};
Input: being john malkovich.
P1 will make a claim. If the claim would be delegated to policy P1 then the action would be: var:john malkovich.

6.2.8 Policy Reference

Used to reference an action part of another policy.

EXAMPLE 150

Policy Reference Action Block

P1:
'bruce willis'
   {action: '<movie-star=', *, '</>'};
P2:
'starring' P1
   {action: P1};
Input: starring bruce willis
P1 will make a claim. If the claim would be delegated to policy P2 then the action would be delegated to P1.
(the final result would be <movie-star=bruce willis</>)

6.2.9 Agent Reference

Used when the action part of another agent should be used to build this element. FIG. 9 illustrates the following network:
(In VOLUME agent)
P1: DOWN {action: '<volume=',DOWN,'/>'};
(In Down Agent)
P1: 'down' {action: 'down'}}
Here if the Input is 'down', then Policy P1 in VOLUME agent makes a claim. If the claim were delegated to this policy then the action would be delegated to DOWN agent (the final result would be <volume=down</>).

6.2.10 Set (<set (targetAgent, property, key; value)>)

targetAgent (optional): The agent address that its property is to be set. This parameter is optional. If omitted then an agent "sets" its own property.
property: The name of the property to be set.

key (optional): The key to the property. Used to check mapped properties. Key can be a String or any in-scope agent or policy. In-scope agent of the owning agent a is the agent a itself and any agent linked to a. In-scope policy of an owning policy p is the owning policy p itself or any policy declared before p.

value: the property will be set to this value.

If the targetAgent name is provided then the action sends a Set message to the targetAgent, to set the value of targetAgent's property to a specific value.

EXAMPLE 151

Set Action Block action: set(CLOCK, 'TIME'; '12:30')

6.2.11 Get (<get (targetAgent, property, key)>)

targetAgent (optional): The agent address that its property is to be fetched. This parameter is optional. If omitted then an agent "gets" its own property.

property: The name of the property to be fetched.

key (optional): The key to the property. Used to check mapped properties. Key can be a String or any in-scope agent or policy. In-scope agent of the owning agent a is the agent a itself and any agent linked to a. In-scope policy of an owning policy p is the owning policy p itself or any policy declared before p.

If the targetAgent name is provided then the action sends a Get message to the targetAgent, and adds the value replied by that agent to the actuation.

EXAMPLE 152

Get Action Block action: get(CLOCK, 'TIME')

6.2.12 Service Methods

The output of each policy is an Actuation object. The Actuation class instantiated by a policy can be specified in the '{action: . . . }' clause right after the 'action:' tag.

EXAMPLE 153

Specifying the Actuation Object Used in a Policy Action p1: 'hello'
{action: com.dejima.core.nlp.text.XMLFollowupActuation: 'greetings'}

The default Actuation class used instantiated by a policy (if no actuation class is specified in the {action: . . . } clause) is defined in the agent network OPAL under DejimaAgentNetworkDefaults tag:

<Actuation class="myPackage.MyClass" />

Any public method in the Actuation class, which follows a specific signature, can be used in the policy action. There are two main types of service methods (with different signature types): actuation manipulating methods and setter methods.

6.2.12.1 Actuation Manipulating Methods

The actuation manipulating methods signatures is as follows:

void methodName(Claim networkClaim,
    Context context,
    ActionElement a1, ActionElement a2, . . . )

Where the networkClaim is the claim selected by the agent network for actuation, the context is the Context saved from the previous interaction of the agent network and a1, a2, are ActionElements.

EXAMPLE 154

Service Methods Taking Actuation Arguments p1: 'hello'
p2: [p1] 'John'
p3: [p1] 'Nick'
p4: p2, p3
p5: p4
{action: ifNotAmbiguous (p4)}

Where the ifNotAmbiguous is a method in the FollowupActuation class:

public FollowupActuation

```
{
    ...
    /**
     * Only performs action when there's no ambiguity.
     * @param networkClaim The claim propogated to the up chain
     * agents by the agent invoking this service method. Note
     * that the propogated claim (or parts of it) might not be chosen in
     * the winning claim of the agent network.
     * @param context The context of the agent being actuated (not
     * used in this method).
     * @param action The action which should be added if
     * networkClaim is not ambiguous.
     */
    public void ifNotAmbiguous(
                Claim networkClaim,
                Context context,
                ActionElement action)
    {
        if (!networkClaim.hasInheritedAmbiguity( ))
            add(action);
    }
    ...
}
```

6.2.12.2 Setter Methods

The setter method signature can be any of:

void methodName(String str)

void methodName(Integer int)

void methodName(Boolean bool)

EXAMPLE 155

Setter Service Method Example

```
/**
 * Set an XML tag. Tag will be used in the toString( ) method to
 * surround the output string with XML tag.
 * @param tag The XML tag to be used in the toString.
 */
public void setTag(String tag)
{
    this.tag = tag;
    if ((tag == null) || (tag.length( ) == 0))
    {
        startTag = null;
        endTag = null;
    }
    else
    {
        startTag = "<" + tag + ">\n";
        endTag = "</" + tag + ">\n";
```

-continued

```
            noChildTag = "<" + tag + "/>\n";
        }
}
```

6.2.12.3 Actuation Classes Provided with the DDPlatform

6.2.12.3.1 FollowupActuation Class

The following service methods are provided in the FollowupActuation class.

6.2.12.3.1.1 Restart

Restarts the dialogue. Sets the previous actuation in the context to null and clears the previous input. This method is almost always used in the top agent in the network.

EXAMPLE 156

Explicit Dialogue Restart

```
explicitRestart: 'new query' | 'restart context'
        {action: restart( ), 'dialogue restarted'}
;
Input: new query
Output: dialogue restartedd
```

6.2.12.3.1.2 addPrevious syntax: addPrevious(x)

The add service method adds the previous output of a policy/agent (x) to the new output.

EXAMPLE 157

The addPrevious Service Method

All these policies have to be compiled in one system agent called "cities".

```
city:
    'san jose' | 'sunnyvale' | 'cupertino' | 'paris' | 'london' | 'tokyo'
        {action: *, ' '}
;
all_cities:
    city
        {action: addPrevious(cities), city}
;
```

| input | output |
|---|---|
| san jose | san jose |
| Cupertino | san jose cupertino |
| paris | san jose Cupertino paris |

6.2.12.3.1.3 replacePrevious syntax: replacePrevious(a, x)

Figure 10:
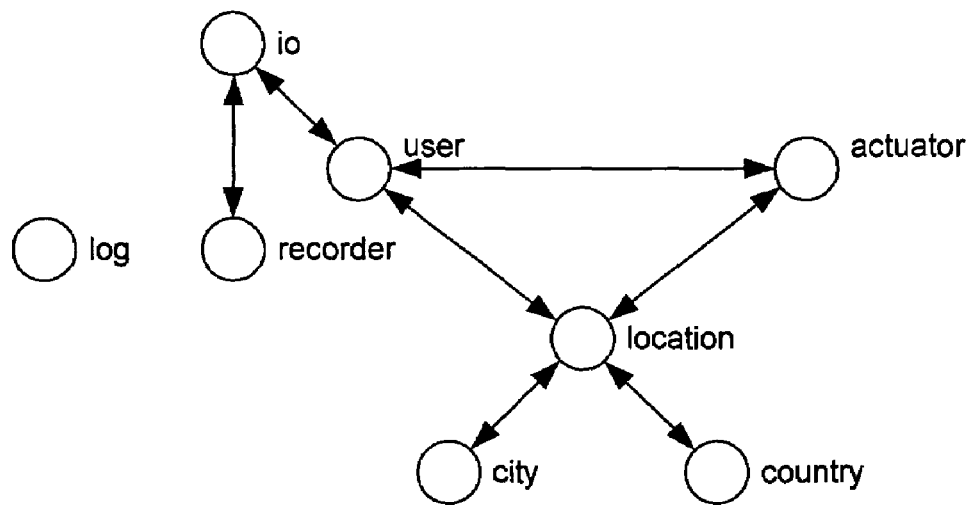

Replaces the previous output of an agent (a) with the new output of a policy/agent (x). If policy/agent (x) output is empty then the previous output will be added. Referring to FIG. 10, here is an example of the replacePrevious service method:

Location agent policies:

```
aLocation:
    city &| country
        {action: 'city: ', replacePrevious(city, city) ,
                '\ncountry', replacePrevious(country, country)}
;
City agent policies:
aCity:
    ('San jose' | 'Sunnyvale' | 'Cupertino' | 'Paris' | 'Tokyo')
        {action: *.matched}
;
Country agent policies:
aCountry:
    ('USA' | 'England' | 'France' | 'Japan')
        {action: *.matched}
;
```

| Input | Output | Note |
|---|---|---|
| San Jose | City: San Jose<br>Country: | New output of City agent added |
| USA | City: San Jose<br>Country: USA | Previous output of City agent is kept.<br>New Output of Country agent added. |
| Sunnyvale | City: Sunnyvale<br>Country: USA | Previous output of City agent replaced.<br>New Output of Country agent added. |

Figure 11:
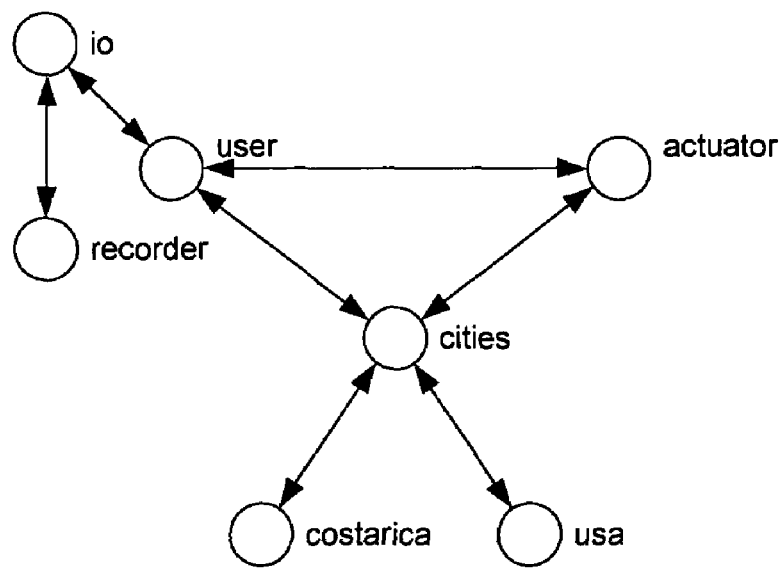

Referring to FIG. 11, here is an example of replacePrevious, addPrevious and ambiguities.

Cities Agent Policies:

```
explicitRestart: 'new query' | restart context'
        {action: restart( ), setInfo('context restart')}
;
theCities:
    costarica, usa
;
allCities:
    theCities
        {action: replacePrevious(cities, theCities)}
;
costarica agent policies:
countryName:
    'Costa Rica'
        {action: addPrevious(costarica)}
;
cityNames:
    ('San jose'| 'Quepos')
        {action: *.matched}
;
costaricaCities:
    [countryName] & cityNames
        {action: cityNames,' (Costa Rica) '}
;
usa agent policies:
countryName:
    'USA'
        {action: addPrevious(usa)}
;
cityNames:
    ('New York' | 'Washington' | 'San Jose')
        {action: *.matched}
;
usaCities:
    [countryName] & cityNames
        {action: cityNames,' (USA) '}
;
```

| Input | Output | Note |
|---|---|---|
| New York | New York (USA) | |
| USA | New York (USA) | addPrevious |
| Quepos | Quepos (Costa Rica) | replacePrevious - replaces New York with Quepos |
| San Jose | San Jose (Costa Rica) San Jose (USA) | replacePrevious - replaces Quepos with San Jose. The output is ambiguous. |
| Costa Rica | San Jose (Costa Rica) | addPrevious resolves the ambiguity. |

The addPrevious method will not add the previous ambiguities if they are resolved by the new network claim (see following example, referring back to FIG. 11).

Cities Agent Policies:

```
explicitRestart: 'new query' | 'restart context'
                {action: restart( ), setInfo('context restart')}
;
theCities:
       costarica, usa
              {action:
                     replacePrevious(costarica, costarica),
                     replacePrevious(usa, usa)}
;
``` costarica agent policies: same as previous example.
usa agent policies: same as previous example.

| Input | Output | Note |
|---|---|---|
| New York | New York (USA) | |
| Quepos | Quepos (Costa Rica) New York (USA) | the previous output of costarica is replaced. the previous output of usa is kept (no substitutes) |
| Washington | Quepos (Costa Rica) Washington (USA) | the previous output of usa is replaced. the previous output of costarica is kept (no substitutes) |
| San Jose | San Jose (Costa Rica) San Jose (USA) | the previous outputs of usa and costarica are both replaced. |
| Costa Rica | San Jose (USA) | addPrevious - resolves the ambiguity. |

6.2.12.3.1.4 removeContext(x)

Removes all elements created by an agent/policy (x) from the context.

EXAMPLE 158 removeContext Example

Cities Agent Policies:

```
explicitRestart: 'new query' | 'restart context'
                {action: restart( ), setInfo('context restart')}
;
theCities:
       costarica, usa
              {action: replacePrevious(costarica, costarica),
                      replacePrevious(usa, usa)}
;
removeCostarica:
```

```
       'remove' costarica
              {action:
                     removeContext(costarica), addPrevious(cities), ' (removed Costa Rica)'}
;
removeUSA:
       'remove' usa
              {action:
                     removeContext(usa), addPrevious (cities), ' (removed USA)'}
;
``` costarica agent policies: same as previous example.
usa agent policies: same as previous example.

| Input | Output |
|---|---|
| New York | New York (USA) |
| Quepos | Quepos (Costa Rica) New York (USA) |
| Remove USA | Quepos (Costa Rica) (removed USA) |
| San Jose | San Jose (Costa Rica) San Jose (USA) |
| Remove Costa Rica | San Jose (USA) (removed Costa Rica) |

6.2.12.3.1.5 removeContext(x)

Removes all elements created by an agent/policy (x) from the context.

EXAMPLE 159 removeContext Example

Cities Agent Policies:

```
theCities:
       costarica, usa
              {action: replacePrevious(costarica, costarica),
                      replacePrevious(usa, usa)}
;
removeCostarica:
       'remove' costarica
              {action:
                     removeContext(costarica), addPrevious(cities), ' (removed Costa Rica)'}
;
removeUSA:
       'remove' usa
              {action:
                     removeContext(usa), addPrevious(cities), ' (removed USA)'}
;
``` costarica agent policies: same as previous example.
usa agent policies: same as previous example.

| Input | Output |
|---|---|
| New York | New York (USA) |
| Quepos | Quepos (Costa Rica) New York (USA) |
| Remove USA | Quepos (Costa Rica) (removed USA) |
| San Jose | San Jose (Costa Rica) San Jose (USA) |
| Remove Costa Rica | New York (USA) (removed Costa Rica) |

6.2.12.3.1.6 clearContext( )

Clears the context. Sets the previous actuation in the context to null but does not clear the previous input.

EXAMPLE 160 removeContext Example

Cities Agent Policies:

```
theCities:
    costarica, usa
        {action: replacePrevious(costarica, costarica),
            replacePrevious(usa, usa)}
;
orCities:
    'or' theCities
        {action:
            addPrevious(cities), clearContext( ), ' or\n', theCities}
;
``` costarica agent policies: same as previous example.
usa agent policies: same as previous example.

| Input | Output |
|---|---|
| Quepos | New York (USA) |
| or New York | Quepos (Costa Rica) or New York (USA) |
| or Washington | Quepos (Costa Rica) or New York (USA) or Washington (USA) |

6.2.12.3.2 XMLFollowup Class

The following service methods are provided in the XMLFollowupActuation class.

6.2.12.3.2.1 setTag(String)

Use to set an XML tag for the policy output.

EXAMPLE 161

Example of setTag

```
p1: 'tv' ['on']
{action:
    setTag('TV'), 'on'};
Input: tv on
Output: <TV>on</TV>
```

6.2.12.3.2.2 setAmbiguityTag(String)

Use to set the ambiguity XML tag for the policy output.

EXAMPLE 162

Example of setAmbiguityTag

```
tv: ['tv'] 'on'
{action:
    setTag('TV'), 'on'};
vcr: ['vcr'] 'on'
{action:
    setTag('VCR'), 'on'};
homeEntertainment: tv,vcr
{action:
    setTag('HomeEntertainment'), tv, vcr}
{ambiguity action:
    setTag('HomeEntertainment'), setAmbiguityTag('Ambiguity'), tv, vcr};
Input: on
Output:
<HomeEntertainment>
<Ambiguity><TV>on</TV><VCR>on</VCR></Ambiguity>
</HomeEntertainment>
```

6.2.12.3.2.3 addCData(x)

Use to set add a CDATA XML element anywhere in the output. The addCData parameter can be any action element (e.g. literal, *, *.matched, ?, service method, etc.)

EXAMPLE 163

Example of addCData

```
p1: 'tv' ['on']
{action:
    setTag('TV'), addCData('on')};
Input: tv on
Output: <TV><![CDATA[on]]></TV>
```

6.2.12.3.2.4 setShowInput(Boolean)

If showInput is set to true then the input will be added to the policy output. Default is false. The setInputTag service method should be used to change the default input tag.

EXAMPLE 164

Example of showInput

```
p1: 'tv' ['on']
{action:
    setShowInput(true), setTag('TV'), 'on'};
Input: tv on
Output: <TV>input><![CDATA[tv on]]></input>on</TV>
```

6.2.12.3.2.5 setShowUnderstood(Boolean)

If showUnderstood is set to true then the part of the input understood by the agent network will be added to the policy output. Default is false. The setUnderstoodTag service method should be used to change the default-understood tag.

EXAMPLE 165

Example of showUnderstood

```
p1: 'tv' ['on']
{action:
    setShowInput(true), setShowUnderstood(true), setTag('TV'), 'on'};
Input: tv on
Output:
<TV>
<input><![CDATA[tv on]]></input>
<understood><![CDATA[tv on]]></understood>
on
</TV>
```

6.2.12.3.2.6 setInfo(String)

Adds a specific information to the policy output. The setInfoTag service method should be used to change the default info tag.

EXAMPLE 166

Example of setInfo

```
p1: ['blah']
{action:
    setShowInput(true), setInfo('Meaningless!') };
Input: sfgsdlfs
Output:
<input><![CDATA[sfgsdlfs]]></input>
<info><![CDATA[Meaningless!]]></info>
```

7 Precedence Table

The Opal language guarantees that the operands of operators appear to be evaluated in a specific evaluation order, namely, from left to right.

| Precedence | Operator type | Operator |
|---|---|---|
| 0 | Terminals and references | 'string' /NUMBER, /SYMBOL, /TYPE, /F, /DB, /IDB, <check(...)>, AGENT reference, POLICY reference, ?, ... |
| 1 | Brackets | (operand) [operand] operand+ |
| 2 | Unary | <exists> operand <check...> |
| 3 | Binary adjacent | operand1 operand2 operand1 ^ operand2 |
| 4 | Binary ordered | operand1 < operand2 operand1 <^ operand2 |
| 5 | Binary and | operand1 & operand2 opernad1 &^ operand2 |
| 6 | Binary or | operand1 \| operand2 |
| 7 | Binary ambiguity | operand1 , operand2 |
| 8 | Unary tag | <tag:...> operand <check tag:...> operan |

Notes: It is generally a good idea to use parentheses liberally in expressions involving mixed operators to avoid operator precedence problems. Even if the operator precedence seems clear to you, it might not be to others.

8 Comparing Different Fuzzy Matchers

Comparison table for matching a long word ('occasional')

| Source | Edit Distance (75%) | Restricted EditDistance (75%) | Soundex (75%) |
|---|---|---|---|
| Occasional | 100 | 100 | 100 |
| One character missing | | | |
| Ccasional | 90 | 90 | 0 |
| Ocasional | 90 | 90 | 60 |
| Occsional | 90 | 90 | 0 |
| Occaional | 90 | 90 | 0 |
| Occasonal | 90 | 90 | 60 |
| Occasinal | 90 | 90 | 60 |
| Occasioal | 90 | 90 | 0 |
| Occasionl | 90 | 90 | 60 |
| Occasiona | 90 | 90 | 60 |
| One extra character | | | |
| Qoccasional | 90 | 90 | 60 |
| Ocaccasional | 90 | 90 | 60 |
| Occasionall | 90 | 90 | 60 |
| Loccasional | 90 | 90 | 0 |
| Coccasional | 90 | 90 | 0 |
| Occaesional | 90 | 90 | 60 |
| Occaisional | 90 | 90 | 60 |
| Occasionnal | 90 | 90 | 60 |
| Occasionmal | 90 | 90 | 60 |
| Ocfasional | 90 | 90 | 0 |
| Occashional | 90 | 90 | 60 |
| One changed character | | | |
| Accasional | 90 | 90 | 0 |
| Oscasional | 90 | 90 | 0 |
| Ockasional | 90 | 90 | 60 |
| Occesional | 90 | 90 | 60 |
| Occazional | 90 | 90 | 60 |
| Occasyonal | 90 | 90 | 60 |
| Occaseonal | 90 | 90 | 60 |
| Occasiomal | 90 | 90 | 60 |
| Occasionak | 90 | 90 | 60 |
| One missing and one extra character typos | | | |
| Ccnasional | 80 | 0 | 0 |
| Occkaional | 80 | 0 | 0 |
| Occsionmal | 80 | 0 | 0 |
| Occaiyonal | 80 | 0 | 0 |
| Occaesonal | 80 | 0 | 60 |
| Occassinal | 80 | 0 | 60 |
| Occcasioal | 80 | 0 | 0 |
| Occpasionl | 80 | 0 | 0 |
| Occashiona | 80 | 0 | 60 |
| One extra and one changed character | | | |
| Oockasional | 80 | 0 | 60 |
| Occoazional | 80 | 0 | 60 |
| Eccasionall | 80 | 0 | 0 |
| Loccasional | 80 | 0 | 0 |
| Coccasyonal | 80 | 0 | 0 |
| Occaesionak | 80 | 0 | 60 |
| Occaisiomal | 80 | 0 | 60 |
| Occesionnal | 80 | 0 | 60 |
| Okcasionmal | 80 | 0 | 60 |
| Ocyashional | 80 | 0 | 60 |
| Two missing characters | | | |
| Casional | 80 | 0 | 0 |
| Ocasonal | 80 | 0 | 60 |
| Occsionl | 80 | 0 | 0 |
| Occional | 80 | 0 | 0 |
| Occasnal | 80 | 0 | 60 |
| Occasial | 80 | 0 | 0 |
| Occasioa | 80 | 0 | 0 |
| Occasonl | 80 | 0 | 60 |
| Occasioa | 80 | 0 | 0 |
| Two extra characters | | | |
| Qoccassional | 80 | 0 | 60 |
| Occccasional | 80 | 0 | 60 |
| Occasironall | 80 | 0 | 0 |
| Loccasioneal | 80 | 0 | 0 |
| occamasional | 80 | 0 | 0 |
| Occaesiomnal | 80 | 0 | 60 |
| Occaesihional | 80 | 0 | 60 |
| Occasilonnal | 80 | 0 | 0 |
| Occasionmaly | 80 | 0 | 60 |
| Occashitonal | 80 | 0 | 0 |

-continued

| Source | Edit Distance (75%) | Restricted EditDistance (75%) | Soundex (75%) |
|---|---|---|---|
| Two changed character | | | |
| Accamional | 80 | 0 | 0 |
| Ospasional | 80 | 0 | 0 |
| Ocknsional | 80 | 0 | 0 |
| Occesyonal | 80 | 0 | 60 |
| Occaziopal | 80 | 0 | 0 |
| Occasyanal | 80 | 0 | 60 |
| Occaseonax | 80 | 0 | 0 |
| Occasiomil | 80 | 0 | 0 |
| Occanonak | 80 | 0 | 0 |
| One extra, one changed and one missing character | | | |
| Oockaional | 70 | 0 | 0 |
| Occcazioal | 70 | 0 | 0 |
| Eccasonall | 70 | 0 | 0 |
| Locasionae | 70 | 0 | 0 |
| Cocasyonal | 70 | 0 | 0 |
| Occaesioak | 70 | 0 | 0 |
| Coalsiomal | 70 | 0 | 0 |
| Occejonnal | 70 | 0 | 0 |
| Okcasinmal | 70 | 0 | 60 |
| Ocyashionl | 70 | 0 | 0 |
| Transposed character(s) | | | |
| Occasionla | 80 | 90 | 60 |
| occasional | 80 | 90 | 60 |
| cocasional | 80 | 0 | 0 |
| occiasionla | 60 | 0 | 60 |

Comparison Table for Matching Short Words

Note: The values for Editex may not be correct and are provided just to give a feeling of how Editex and Edit Distance differ.

| Source | Pattern | Edit Distance (75%) | Restricted EditDistance (75%) | Soundex (75%) |
|---|---|---|---|---|
| a | b | 0 (d = 1) | 0 | 0 |
| a | a | 100 (d = 0) | 100 | 100 |
| Blue | Blue | 100 (d = 0) | 100 | 100 |
| Blue | Lue | 75 (d = 1) | 0 | 0 |
| Blue | Ble | 75 (d = 1) | 75 | 60 |
| Blue | Blu | 75 (d = 1) | 75 | 60 |
| Blue | Black | 0 (d = 3) | 0 | 0 |
| Blue | e | 25 (d = 3) | 0 | 0 |
| Blue | Bool | 0 (d = 3) | 0 | 60 |
| Lue | Blue | 75 (d = 1) | 0 | 0 |
| Ble | Blue | 75 (d = 1) | 75 | 60 |
| Blu | Blue | 75 (d = 1) | 75 | 60 |
| Black | Blue | 0 (d = 3) | 0 | 0 |
| e | Blue | 25 (d = 3) | 0 | 0 |
| Bool | Blue | 0 (d = 3) | 0 | 60 |

9 Writing Policies to Resolve Ambiguities in Follow-Ups

Figure 12:
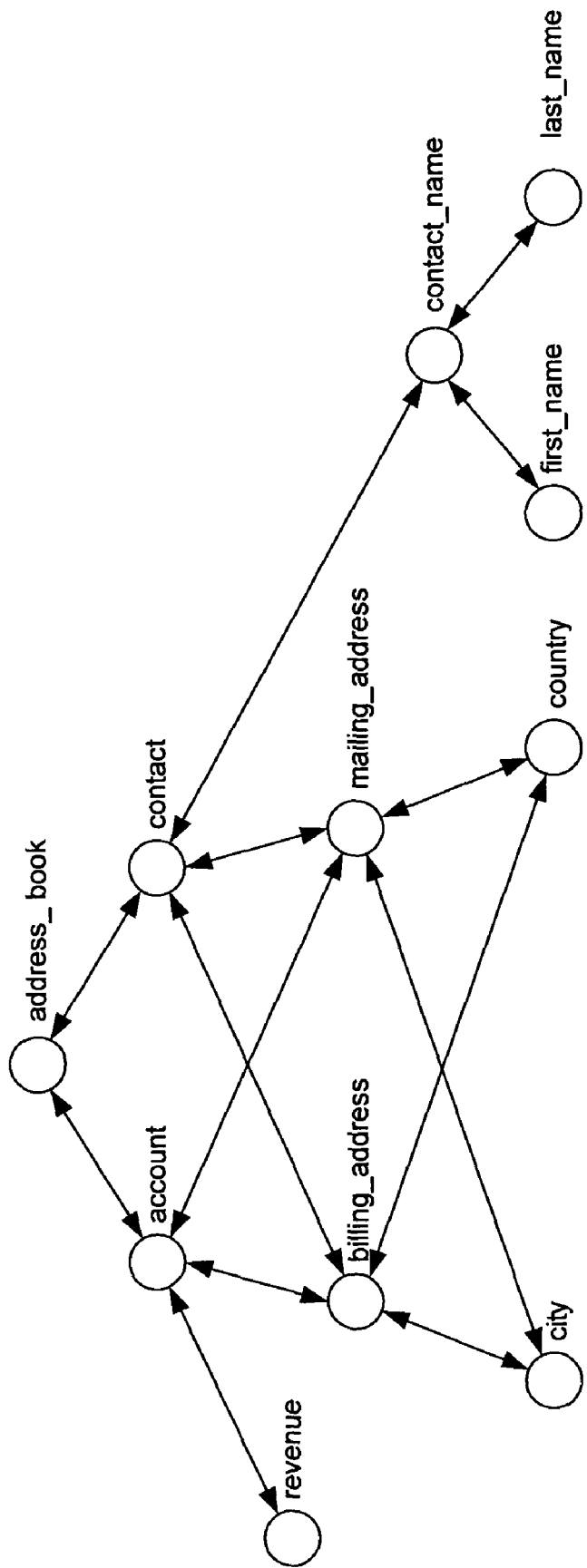

The purpose of this section is to give an idea of how the agent policies should be written so ambiguities could be resolved in follow ups. For purposes of this section we will use an address book application. The address book has contact and account fields where both contacts and accounts can have a billing address and a mailing address. Take the agent network and agent policies shown in FIG. 12.

Have a policy that uniquely (unambiguously) identifies the agent for it's immediate up-chain agents. For example in the case of the address book application the account agent will need a policy claiming keywords not shared by it's peers (e.g. contact). We will call this policy the keywords policy. The account agents claim wont cause ambiguity in its up-chains (e.g. agent address) if it would include a claim by its keyword policy. This policy needs to have the highest priority so it would be chosen over the other policies.

account_kwd:
  'account'
  {priority: 1000000}
    {action: addPrevious(account)};

Assign higher priority to those down-chain agents, which are the topic of current conversation. (the recency and topic-Scope priority service methods can be used for this purpose). For example in case of the account agent you need two policies, one for billing_address and one for mailing address.

mailing_address_policy:
  mailing_address
  {priority: recency(mailing_address))}
    {attributes: 'private'} {action: mailing_address};
  billing_address_policy:
  billing_address
  {priority: recency (billing_address)}
    {attributes: 'private' } {action: billing_address};

Use service methods to combine the previous actuations with the new actuations. The service methods used should not add a previous actuation that caused an ambiguity to the current actuation if the new claim on the input would resolve that ambiguity. For example the replacePrevious service method can be used for this purpose.

account_fields:
    (mailing_address_policy , billing_address_policy)
    {action:
        method: replacePrevious(billing_address_policy),
        method: replacePrevious(mailing_address_policy) }
    {ambiguity action:
        setAmbiguityTag('amb'),
        billing_address_policy,
        mailing_address_policy
    };

The invention claimed is:

1. A method for natural language interpretation, for use with a backend
   application and with provided input token sequences, comprising the steps of:
   developing a first interpretation in response to a first input token sequence;
   representing said first interpretation in a first object; and
   developing a second interpretation in response to a second input token sequence, including the step of consulting the first interpretation represented in the first object,
   wherein said step of developing a second interpretation comprises the step of forwarding said second input token sequence and said first object toward an agent network,
   wherein said agent network comprises a plurality of agents arranged in a network, each of said agents having at least one interpretation policy having a policy condition and a policy action associated with the condition,
   wherein said step of developing a second interpretation comprises the step of each of said interpretation policies making a claim on at least part of said second token sequence if the condition of the interpretation policy is satisfied, and executing the associated policy action in response to determination that the claim is at least part of a winning claim,
   and wherein a particular one of said interpretation policies includes a policy condition, the satisfaction of which depends on said first interpretation.

2. A method according to claim 1, wherein said steps of developing an
interpretation each comprise the step of developing an interpretation in a distributed manner.

3. A method according to claim 1, wherein said step of developing a second interpretation comprises the step of forwarding said second input token sequence and said first object toward a distributed parser of natural language input.

4. A method according to claim 1, wherein said step of developing a second interpretation policy further comprises the step of a particular one of said agents that includes said particular interpretation policy, referring to a downchain one of said agents in evaluating the policy condition of said particular interpretation policy.

5. A method according to claim 1, wherein said agent network comprises a plurality of agents arranged in a network, each of said agents having at least one interpretation policy having a policy condition and a policy action associated with the condition,
wherein said step of developing a second interpretation comprises the step of each of said interpretation policies making a claim on at least part of said second token sequence if the condition of the interpretation policy is satisfied, and executing the associated policy action in response to determination that the claim is at least part of a winning claim,
and wherein a particular one of said interpretation policies includes a policy action that depends on said first interpretation.

6. A method for natural language interpretation, for use with a network of agents including different first and second agents, for use further with a back-end application and with provided input token sequences, comprising the steps of the network of agents:
developing a first interpretation in response to a first input token sequence, including at least one of said agents contributing to said first interpretation; and
developing a second interpretation in response to a second input token sequence, including said first agent determining whether said first interpretation includes a contribution from said second agent,
wherein said agent network comprises a plurality of agents arranged in a network, each of said agents having at least one interpretation policy having a policy condition and a policy action associated with the condition, said first agent including a particular one of said interpretation policies,
wherein said step of developing a second interpretation comprises the step of each of said interpretation policies making a claim on at least part of said second token sequence if the condition of the interpretation policy is satisfied, and executing the associated policy action in response to determination that the claim is at least part of a winning claim,
and wherein said particular interpretation policy includes a policy condition, the satisfaction of which depends on whether said first interpretation includes a contribution from said second agent.

7. A method according to claim 6, wherein said step of developing a second interpretation further comprises the step of said first agent referring to a downchain one of said agents in evaluating the policy condition of said particular interpretation policy.

8. Natural language interpretation apparatus, for use in developing interpretations for forwarding toward a back-end application, of input token sequences provided to the interpretation apparatus, comprising data processing hardware programmed to execute a plurality of agents arranged in a network, each of said agents having at least one interpretation policy, each of said interpretation policies having a policy condition and making a claim if the policy condition is satisfied, each of said interpretation policies further contributing to an actuation object representing an interpretation of an input token sequence in response to determination that a claim made by the interpretation policy is at least part of a winning claim,
wherein one of said policy conditions makes reference to a token sequence provided to the agent in response to the input token sequence,
and wherein at least a subject one of said interpretation policies makes reference to a representation of the interpretation of said apparatus in response to a prior input token sequence.

9. Apparatus according to claim 8, wherein at least one of said policy conditions makes reference to a claim made by one of said agents which is downchain of the agent having the policy condition.

10. Apparatus according to claim 8, wherein a particular one of said agents has a particular interpretation policy having a particular policy condition that refers to a downchain one of said agents,
wherein the contribution to said actuation object by said particular interpretation policy includes at least partial delegation to said downchain agent.

11. Apparatus according to claim 8, wherein the contribution to said actuation object by a particular one of said interpretation policies consists of delegation to at least one of said interpretation policies other than said particular interpretation policy.

12. Apparatus according to claim 8, further comprising an interaction entity providing said input token sequences toward said network,
wherein said interaction entity provides toward said network, in conjunction with said input token sequences, a representation of the interpretation of said apparatus in response to said prior input token sequence.

13. Apparatus according to claim 12, wherein said subject interpretation policy is in a subject one of said agents,
wherein said subject agent is operable to, in response to receipt of a token sequence and in conjunction therewith a representation of the interpretation of said apparatus in response to said prior input token sequence, update properties of said subject agent to include said representation,
and wherein said reference made by said subject interpretation policy to a representation of the interpretation of said apparatus in response to a prior input token sequence, includes testing said properties of said subject agent.

14. Apparatus according to claim 12, further comprising an actuation entity, said network providing said actuation object toward said back-end application via said actuation entity,
wherein said actuation entity is operable to forward the interpretation in said actuation object toward said interaction entity, as said representation of the interpretation of said apparatus in response to said prior input token sequence.

15. Apparatus according to claim 14, wherein said actuation entity is operable further to, in at least some circumstances, assert commands toward said back-end application in response to actuation objects received from said network.

16. Apparatus according to claim 8, wherein the reference made by said subject interpretation policy to a representation of the interpretation of said apparatus in response to a prior input token sequence, comprises conditioning said subject interpretation policy on whether any contribution by a referenced one of said agents is included in said interpretation of said apparatus in response to said prior input token sequence.

17. Apparatus according to claim 16, wherein said subject interpretation policy is in a subject one of said agents different from said referenced agent.

18. Apparatus according to claim 8, wherein said network further includes an additional agent.

19. Natural language interpretation apparatus, for use in developing interpretations for forwarding toward a back-end application, of input token sequences provided to the interpretation apparatus,
   comprising data processing hardware programmed to execute a plurality of agents arranged in a network and responsive to an input token sequence, at least a subset of said agents each having at least one interpretation policy, each of said interpretation policies having a policy condition and an associated policy action,
   each given one of said interpretation policies making a claim in response to receipt by the agent containing the given interpretation policy of a token sequence if the condition of the given interpretation policy is satisfied,
   each given one of said interpretation policies further contributing to an actuation object representing an interpretation of an input token sequence in response to determination that a claim made by the given interpretation policy is at least part of a winning claim,
   and wherein for at least a subject one of said interpretation policies, when it makes a contribution to an actuation object, the contribution it makes differs depending on the interpretation of said apparatus in response to a prior input token sequence.

20. Apparatus according to claim 19, wherein a particular one of said policy conditions makes reference to a claim made by one of said agents which is downchain of the agent having the particular policy condition.

21. Apparatus according to claim 19, wherein a particular one of said agents has a particular interpretation policy having a particular policy condition that refers to a downchain one of said agents,
   wherein the contribution to said actuation object by said particular interpretation policy includes at least partial delegation to said downchain agent.

22. Apparatus according to claim 19, wherein the contribution to said actuation object by a particular one of said interpretation policies consists of delegation to at least one other one of said interpretation policies.

23. Apparatus according to claim 19, further comprising an interaction entity providing said input token sequences toward said network,
   wherein said interaction entity provides toward said network, in conjunction with said input token sequences, a representation of the interpretation of said apparatus in response to said prior input token sequence.

24. Apparatus according to claim 23, wherein said function of the interpretation of said apparatus in response to a prior input token sequence is a function of said representation provided by said interaction entity.

25. Apparatus according to claim 23, wherein said subject interpretation policy is in a subject one of said agents,
   wherein said subject agent is operable to, in response to receipt of a token sequence and in conjunction therewith a representation of the interpretation of said apparatus in response to said prior input token sequence, update properties of said subject agent to include said representation,
   and wherein said function of the interpretation of said apparatus in response to a prior input token sequence is a function of said representation as present in the properties of said subject agent.

26. Apparatus according to claim 23, further comprising an actuation entity, said network providing said actuation object toward said back-end application via said actuation entity,
   wherein said actuation entity is operable to forward the interpretation in said actuation object toward said interaction entity, as said representation of the interpretation of said apparatus in response to said prior input token sequence.

27. Apparatus according to claim 26, wherein said actuation entity is further operable to assert commands toward said back-end application in response to actuation objects received from said network.

28. Apparatus according to claim 19, wherein said network further includes an additional agent.

* * * * *